(12) United States Patent
Ornes et al.

(10) Patent No.: US 7,263,097 B1
(45) Date of Patent: Aug. 28, 2007

(54) PROGRAMMABLY SLICEABLE SWITCH-FABRIC UNIT AND METHODS OF USE

(75) Inventors: Matthew D. Ornes, Madison, WI (US); Christopher I. W. Norrie, San Jose, CA (US); Gene K. Chui, Campbell, CA (US); Onchuen (Daryn) Lau, Saratoga, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 984 days.

(21) Appl. No.: 09/997,478

(22) Filed: Nov. 26, 2001

(51) Int. Cl.
*H04Q 11/00* (2006.01)
(52) U.S. Cl. .................................... 370/386; 370/392
(58) Field of Classification Search ................ 370/378, 370/380, 381, 386, 387, 388, 389, 392
See application file for complete search history.

(56) References Cited

U.S. PATENT DOCUMENTS 5,550,816 A * 8/1996 Hardwick et al. .......... 370/397
6,693,904 B1 * 2/2004 McKenzie et al. .......... 370/387

* cited by examiner

*Primary Examiner*—Huy D. Vu
*Assistant Examiner*—Christine Ng
(74) *Attorney, Agent, or Firm*—MacPherson, Kwok, et al.; Greg T. Warder

(57) ABSTRACT

A programmably sliceable switch-fabric unit (PSSU) and methods of use are disclosed. An N×N' switch matrix is programmably made to operate as if it were a plurality of S×S' virtual switch slices, where S<N and S'<N'. Ingressing requests each specify an egress path (unicast mode) or plural egress paths (multicast mode) in terms of one or more relative egress port numbers. A request translator converts relative egress port numbers into absolute egress port numbers by determining what virtual slice each request belongs to. The translated egress requests are handed off to an arbitration and/or scheduling mechanism for further processing. If the translated request is granted, the corresponding payload egresses through the actual egress port(s) which the translated request asked for. An inventory of PSSU's may be distributed in accordance with the disclosure to segmented markets such that each PSSU can service the specific needs of a market, be it providing a plurality of 4×4 switch slices, 8×8 switch slices, 16×16 switch slices, or otherwise. In one embodiment, virtual slices are distributed throughout a physical switch-matrix so as to minimize pinout crossover for external line card units.

12 Claims, 19 Drawing Sheets

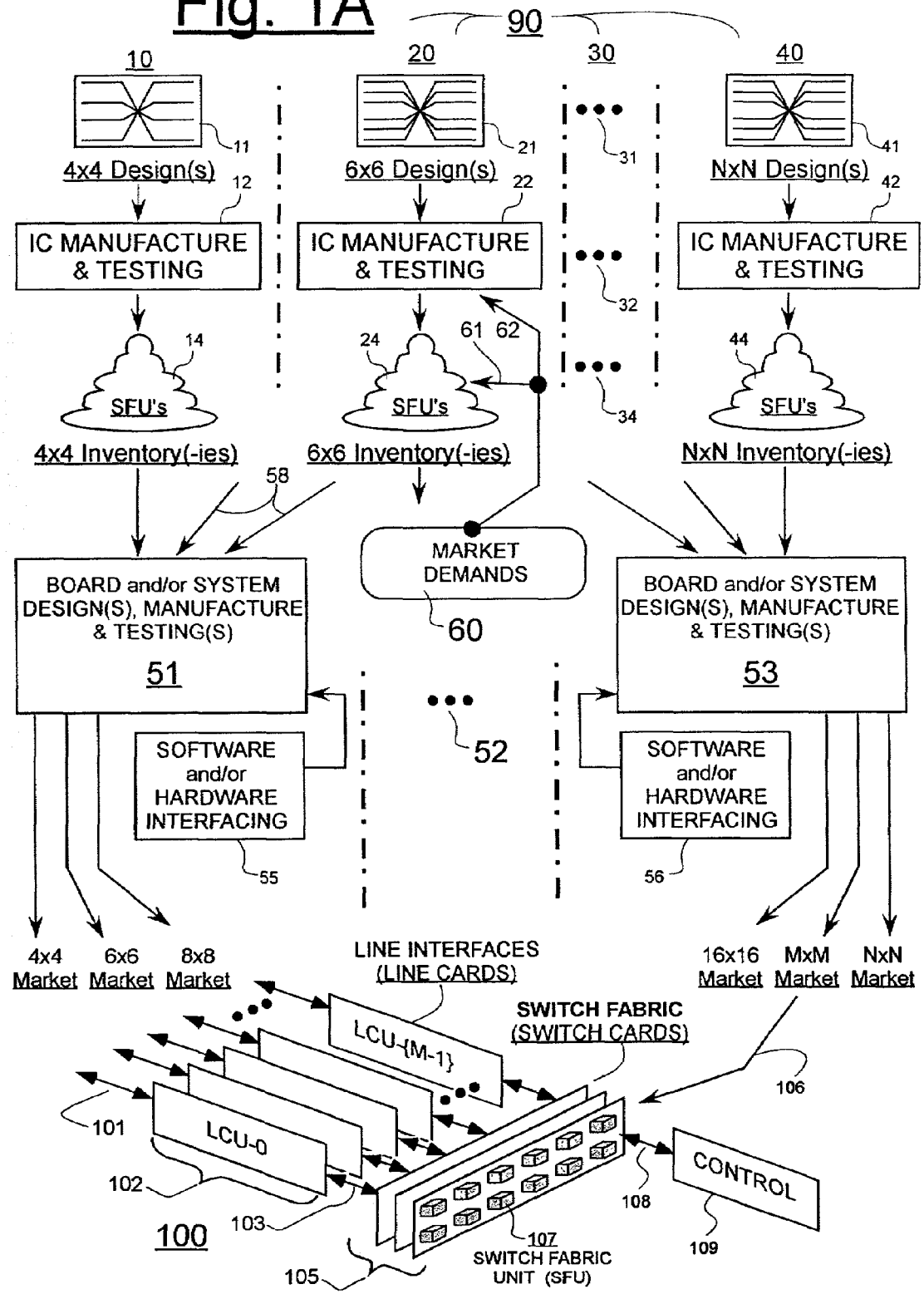

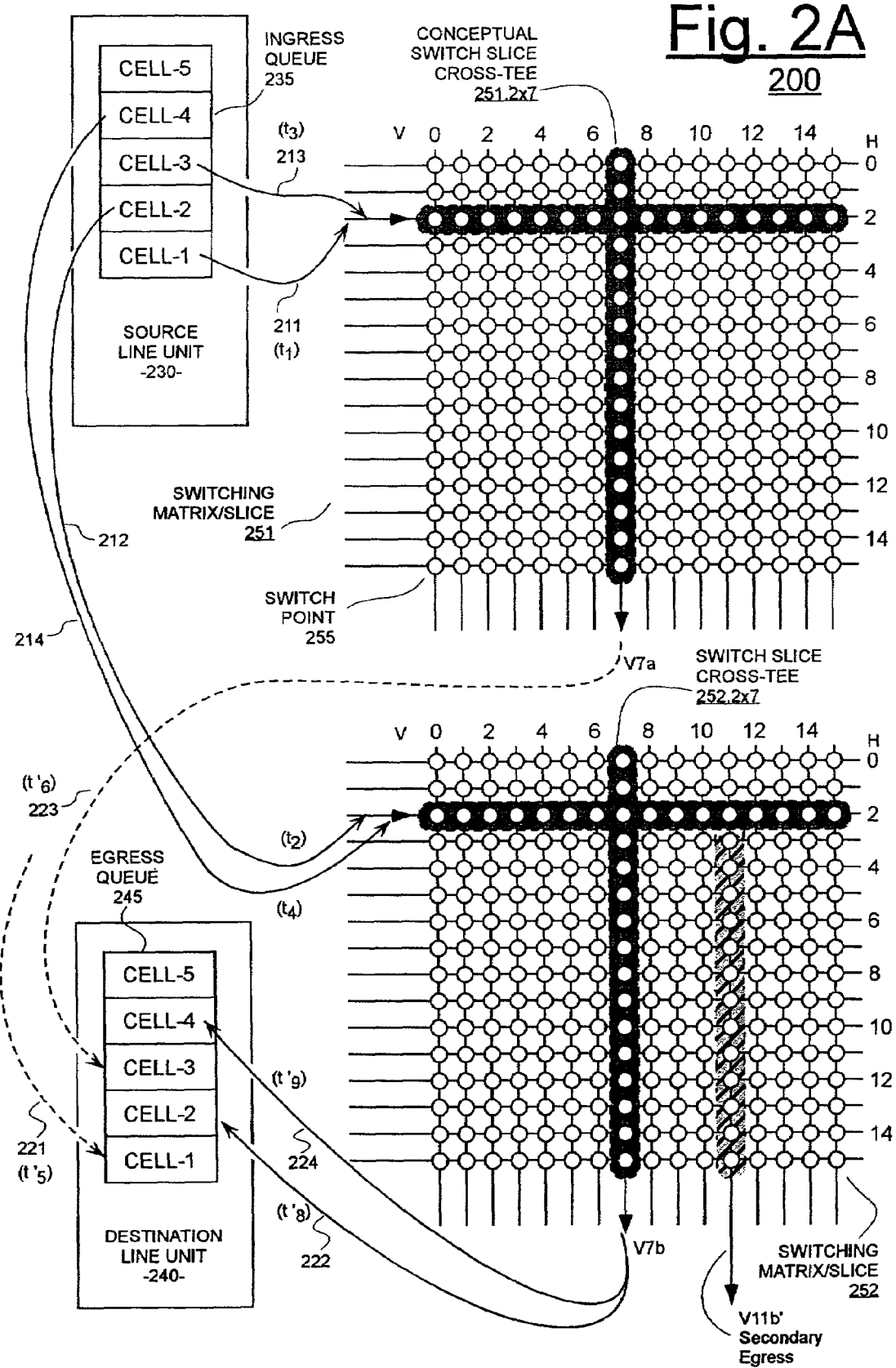

Fig. 2C
207'  SAP-16 MODE (25% SLICES)
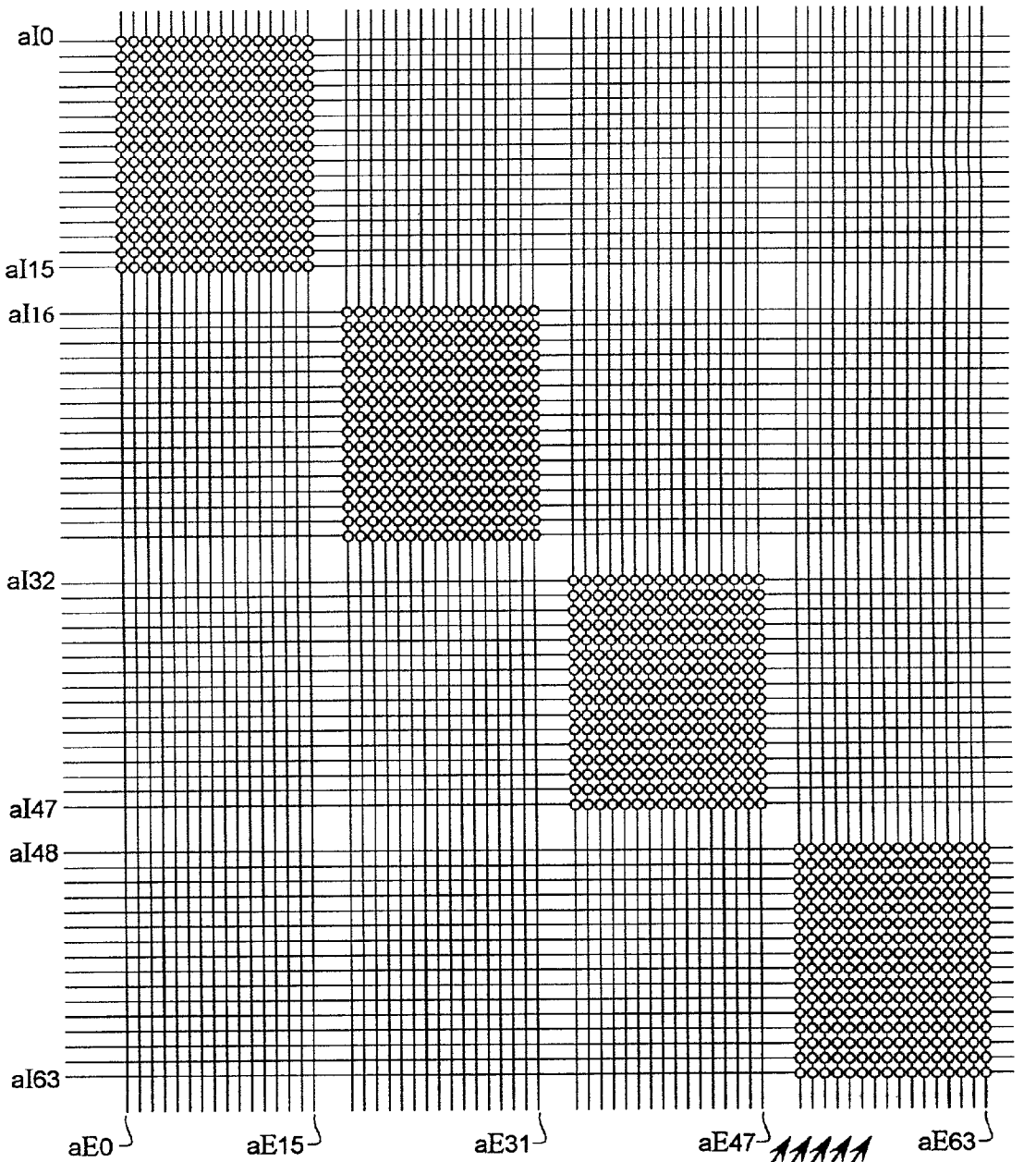
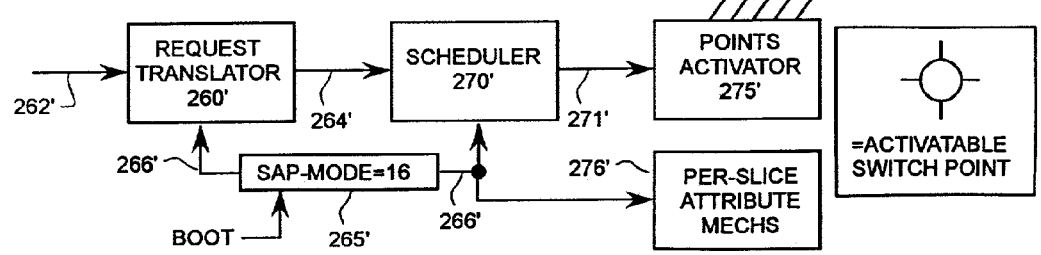

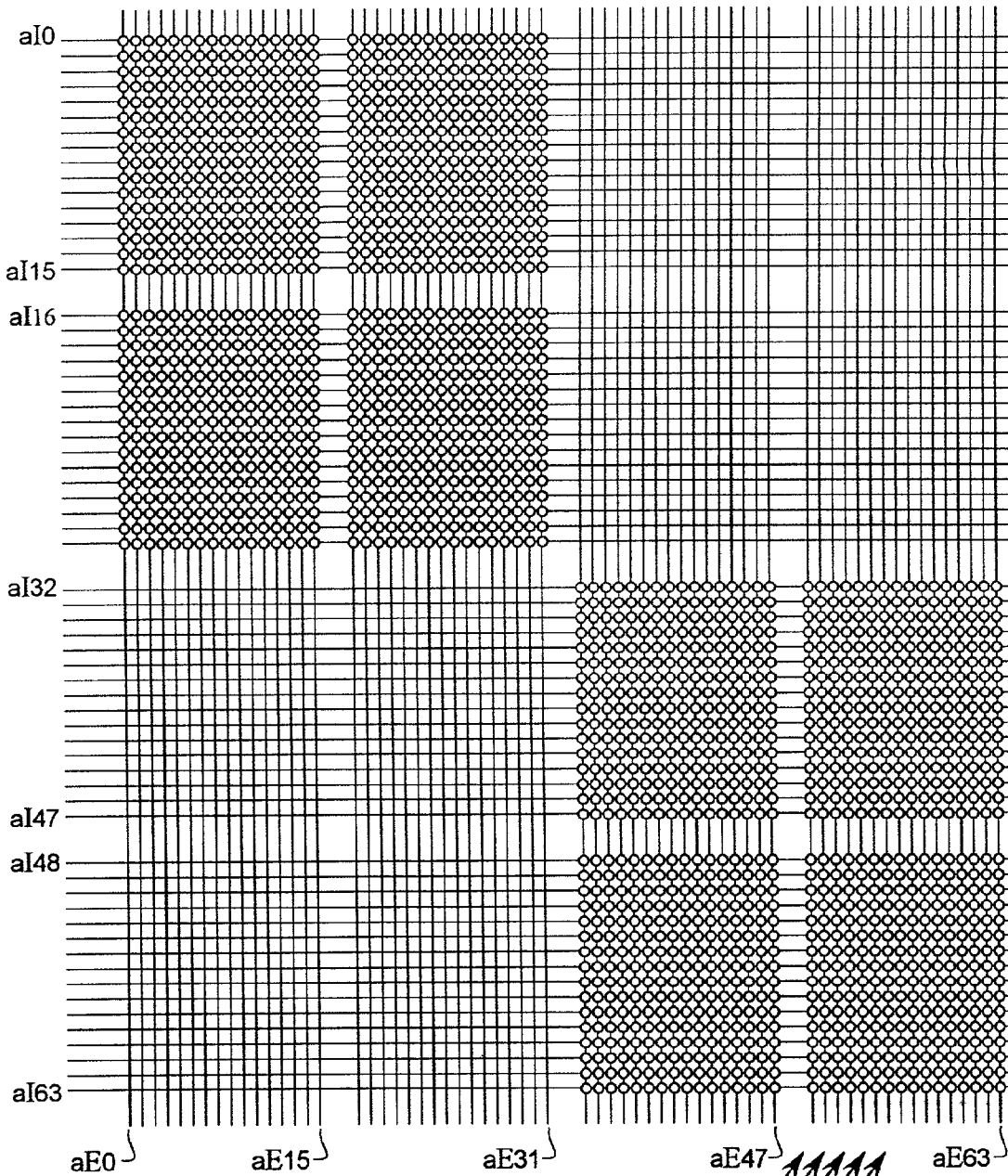
Fig. 2D — 207″ — SAP-32 MODE (50% SLICES)
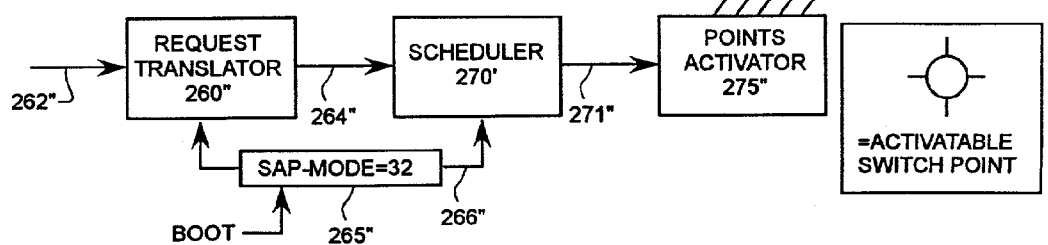

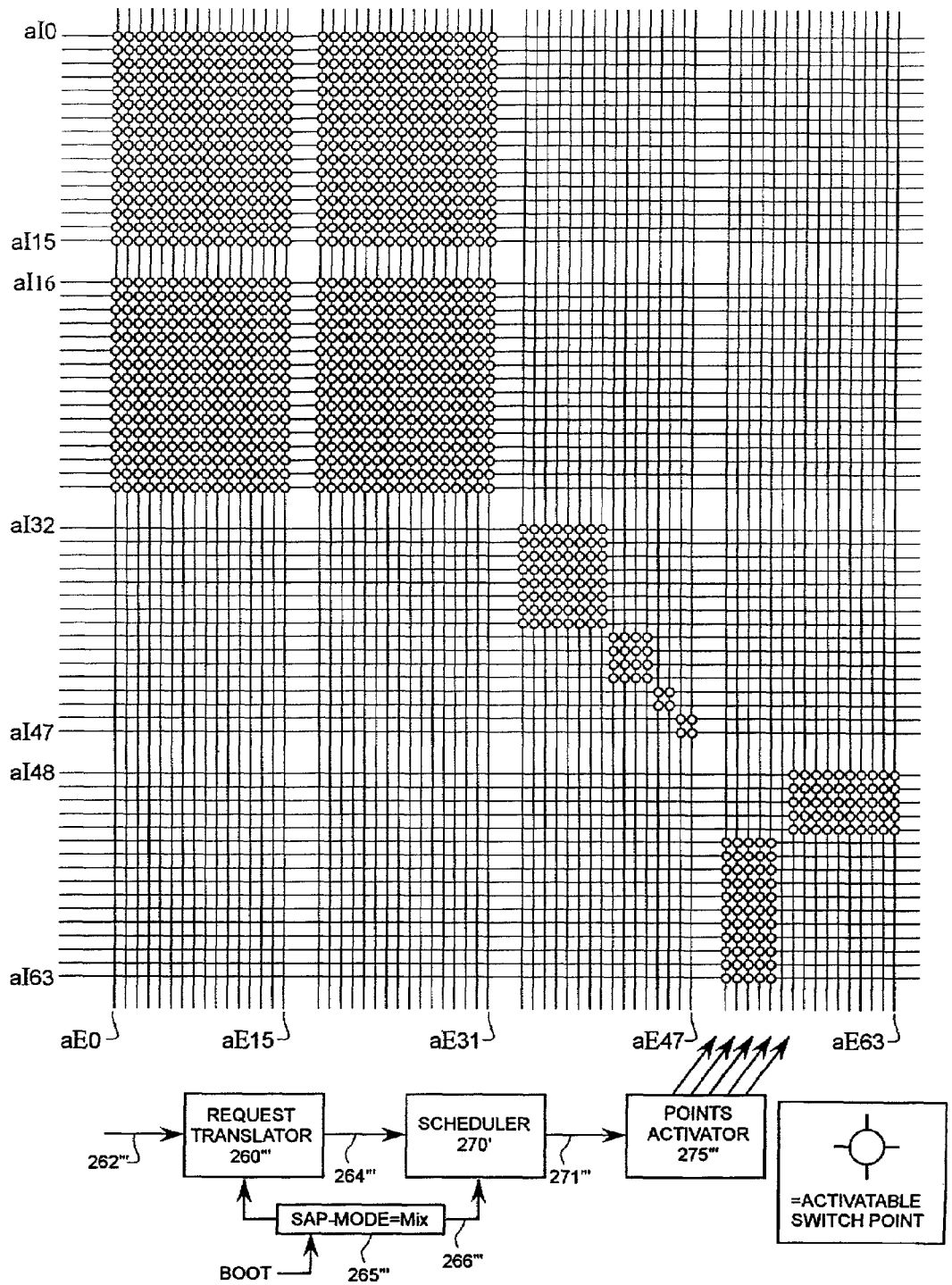

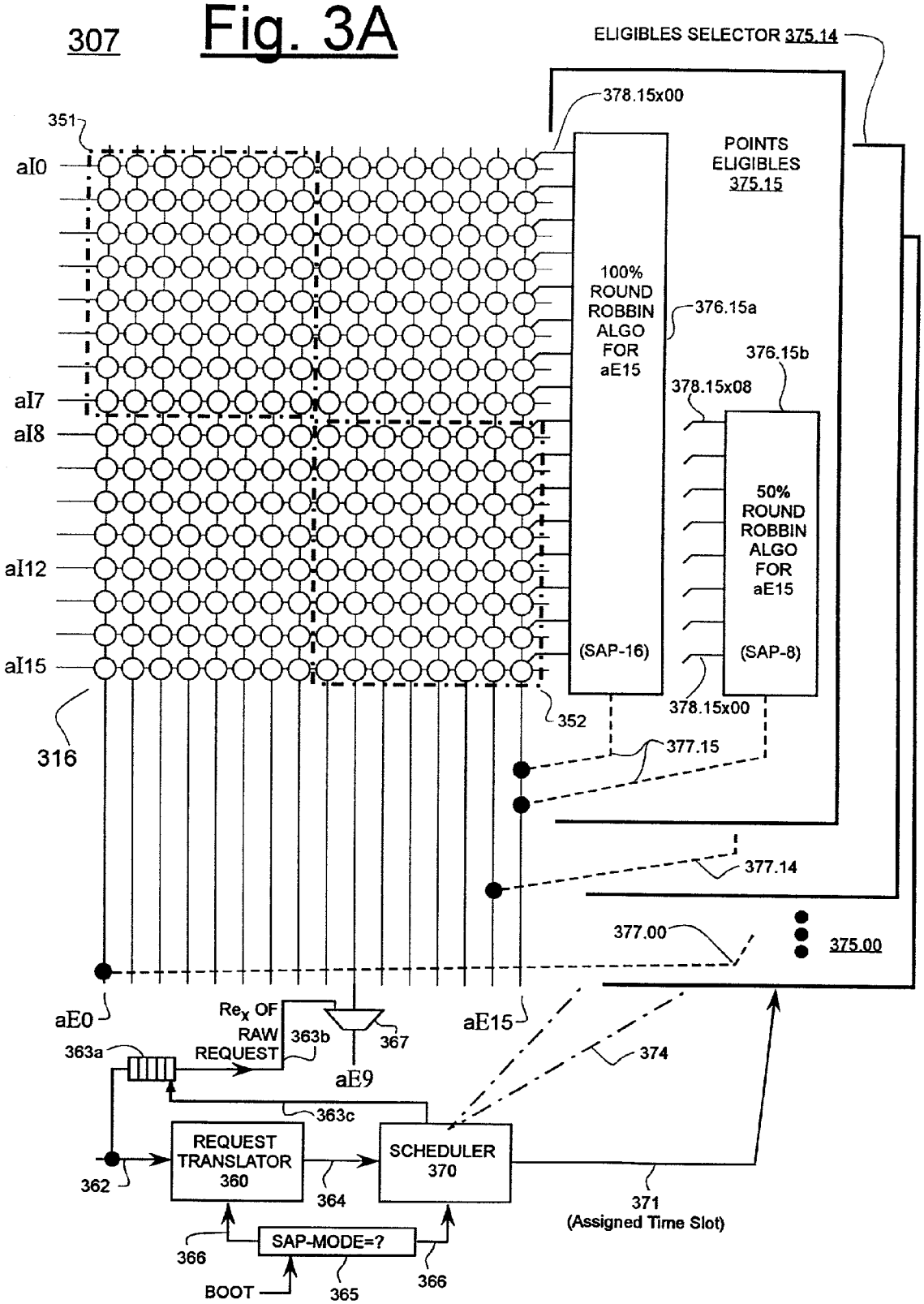

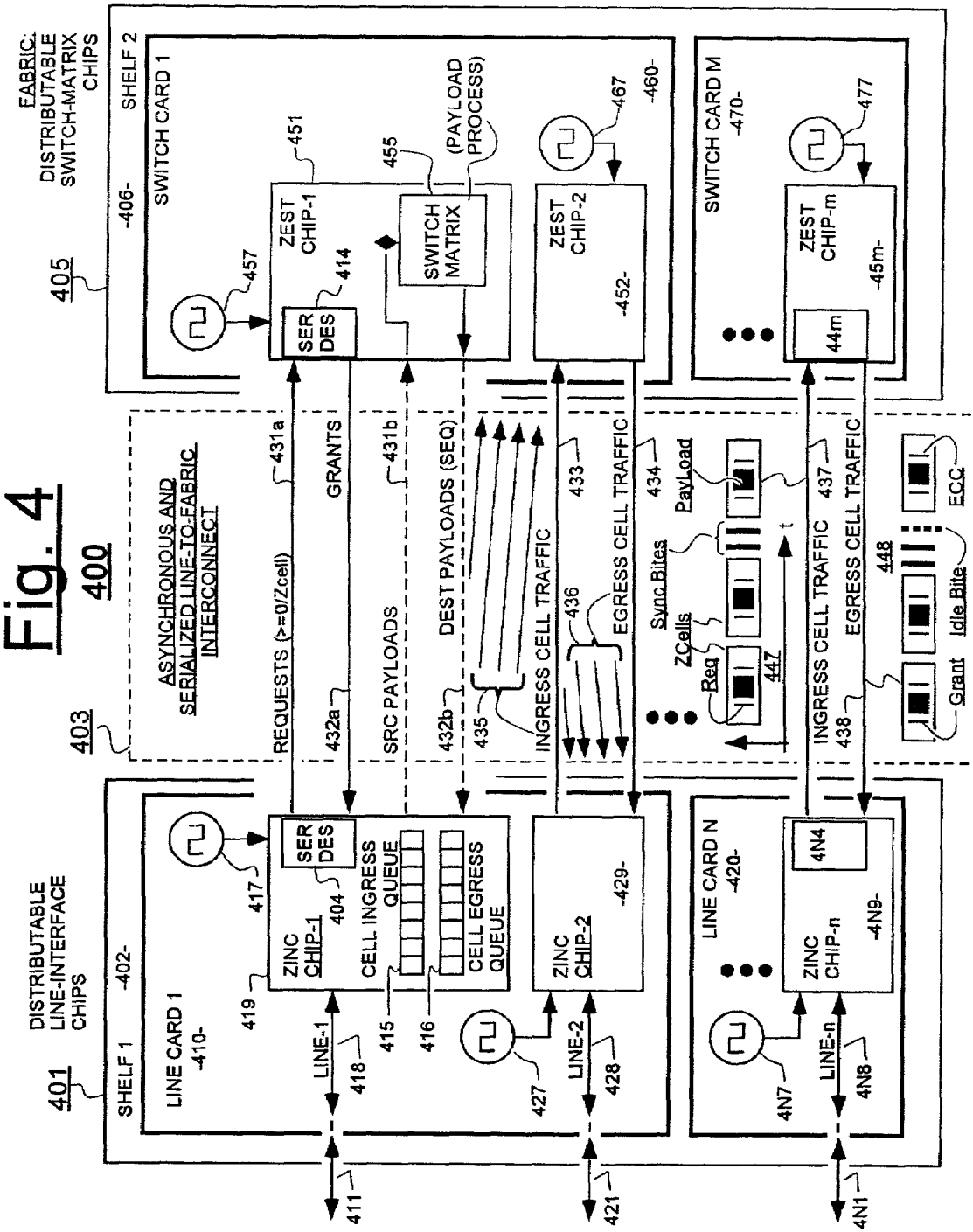

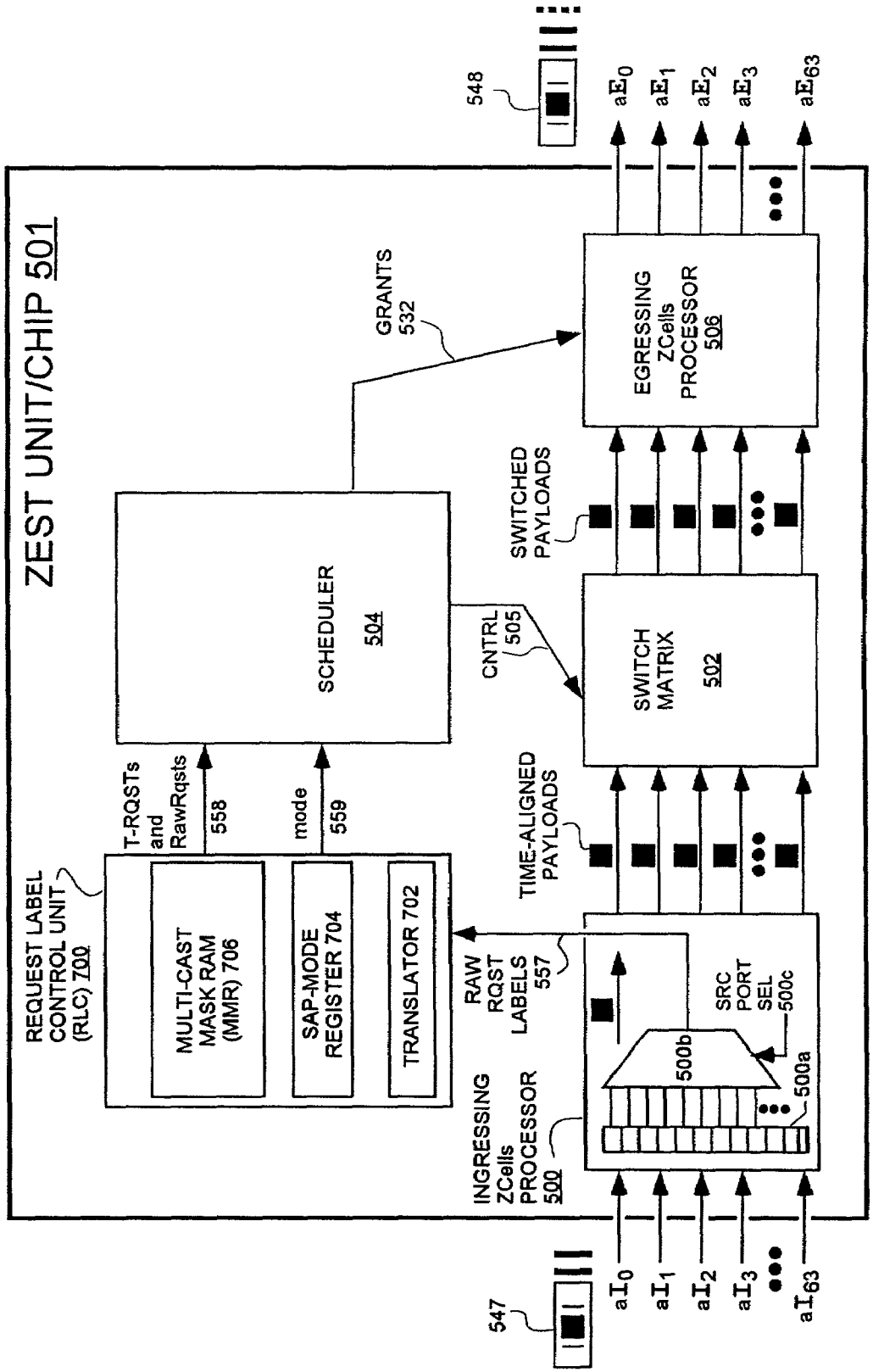

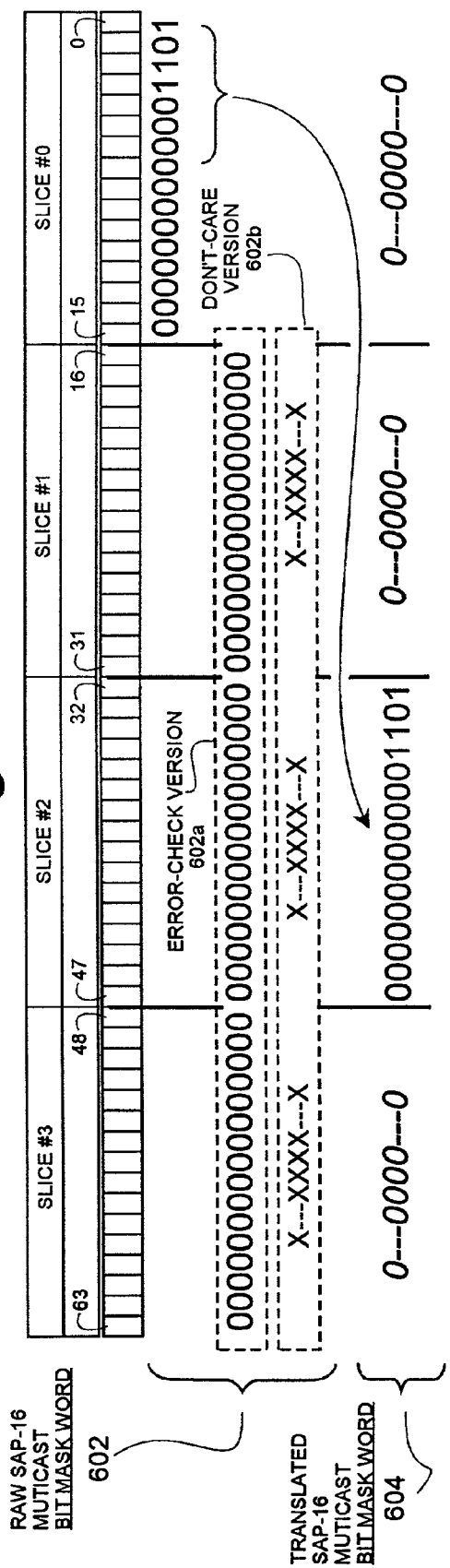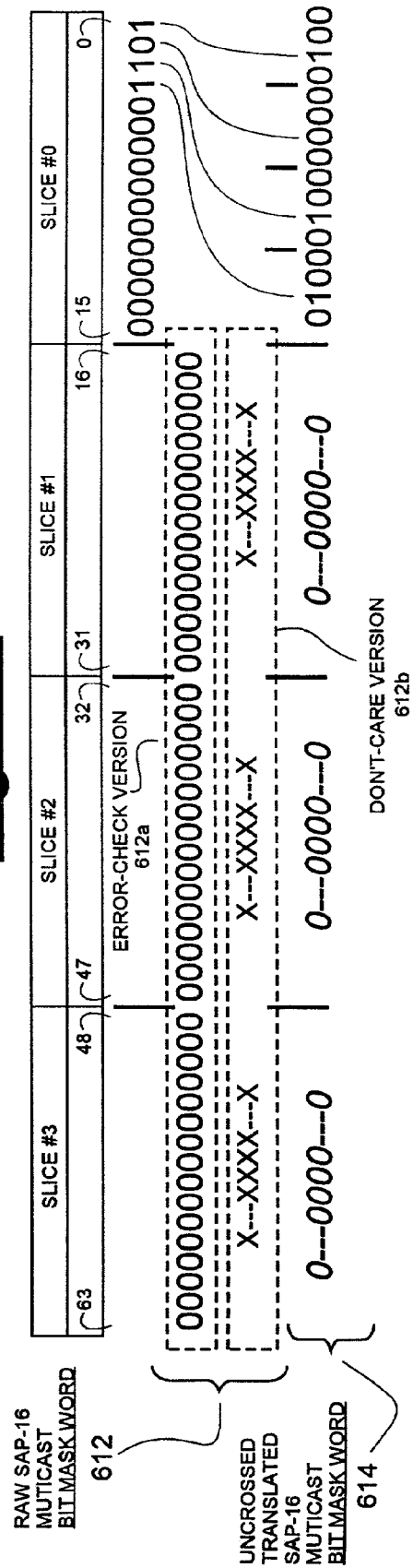

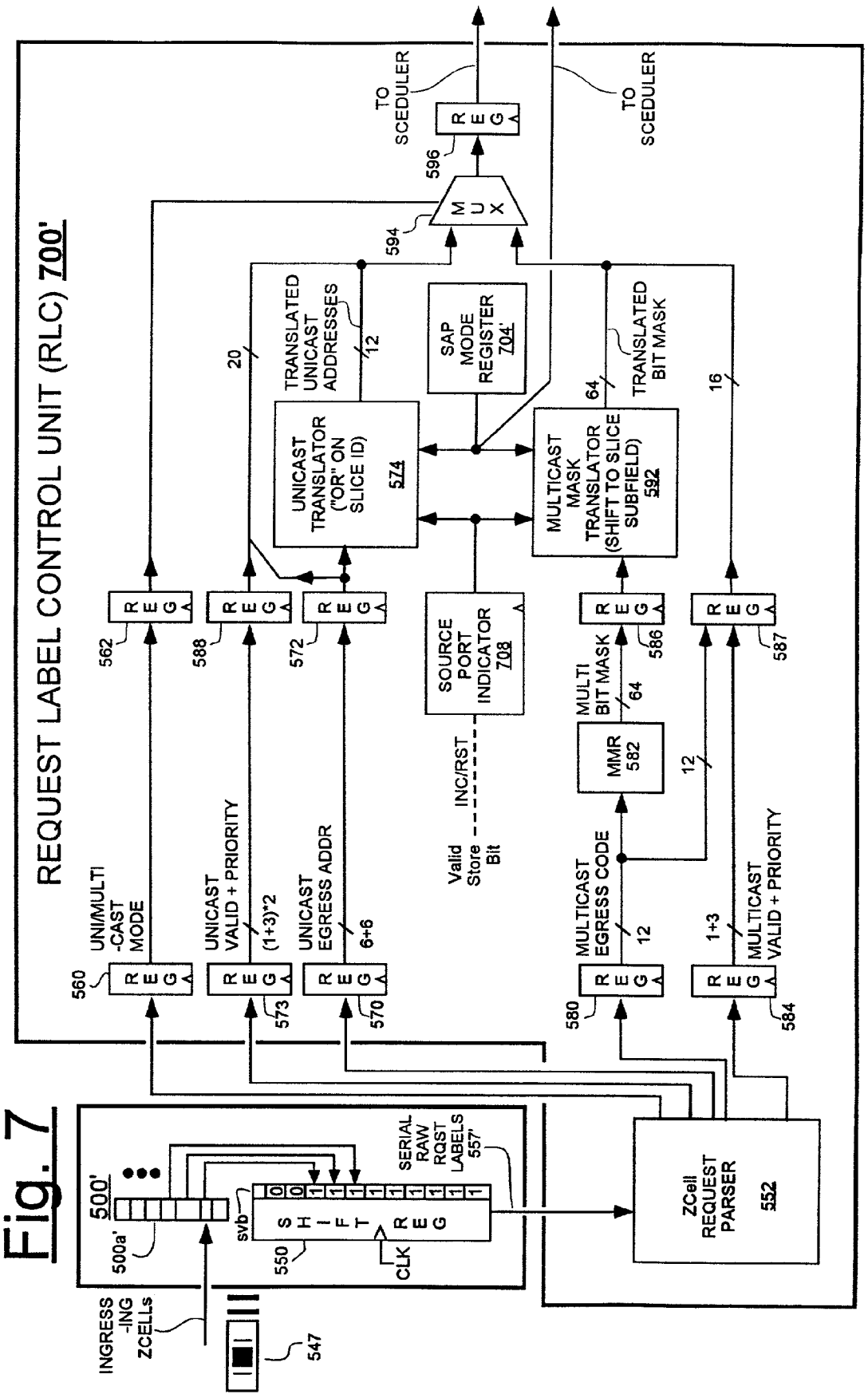

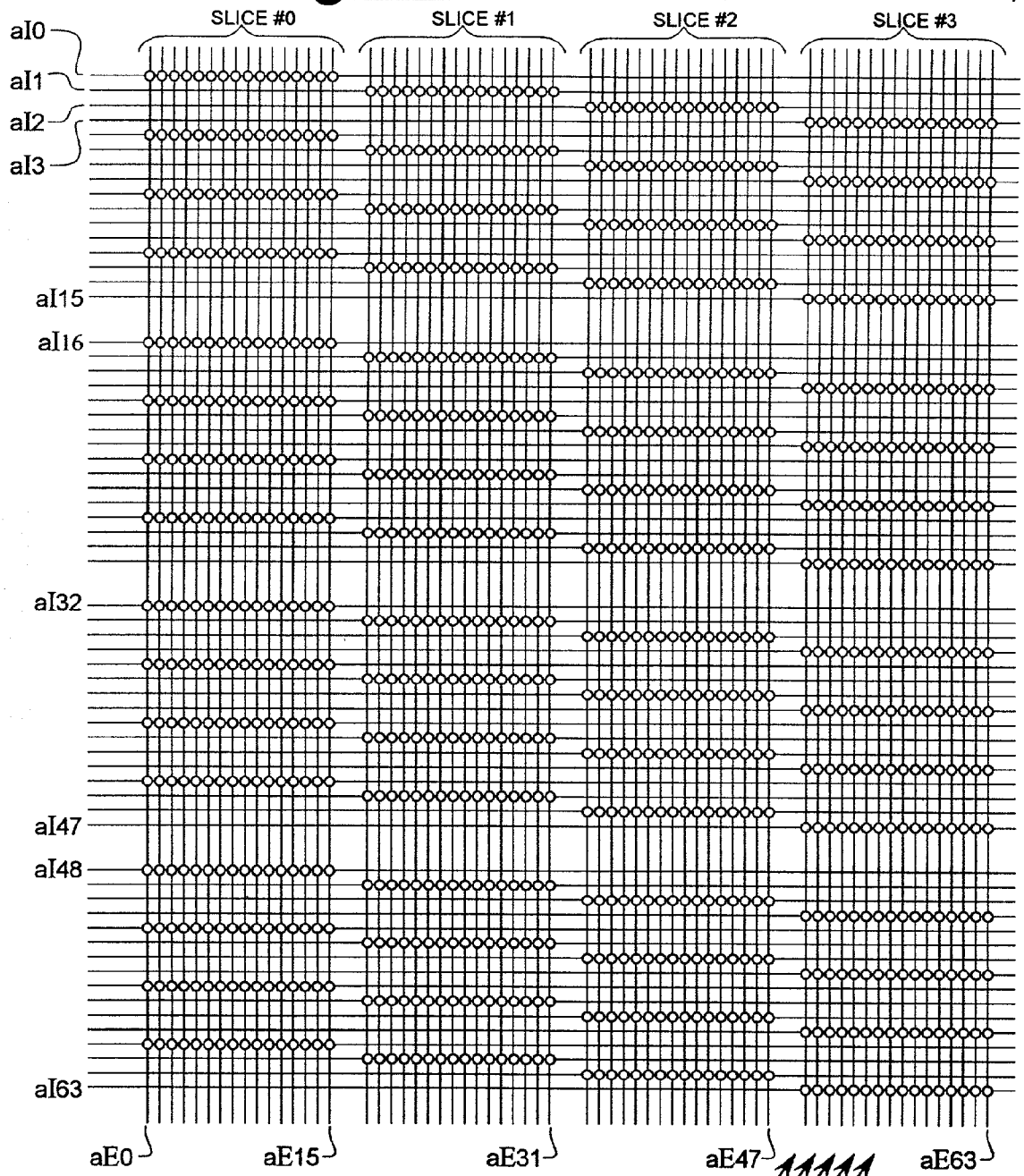
Fig. 8B  SAP-16 MODE (UNCROSSED INPUTS)
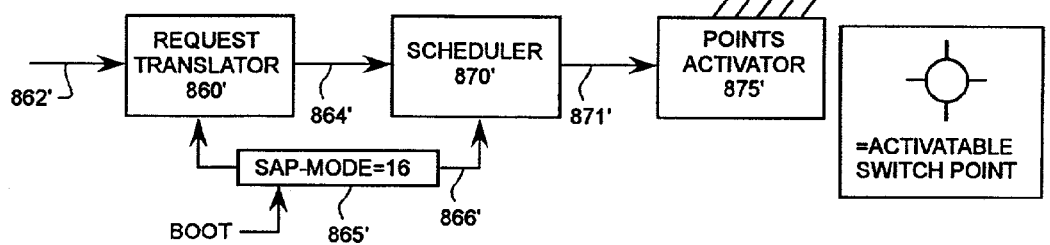

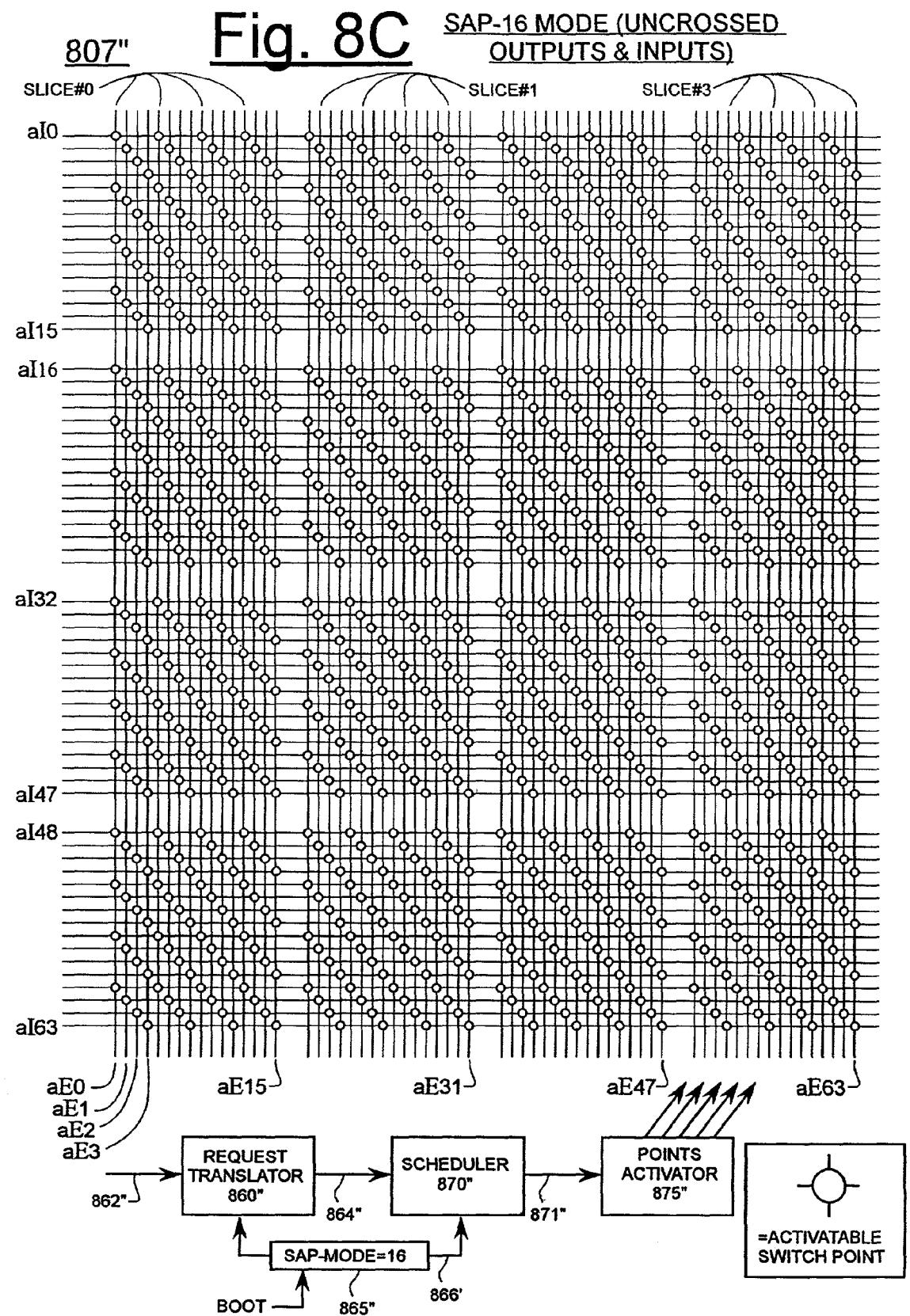
Fig. 8C SAP-16 MODE (UNCROSSED OUTPUTS & INPUTS)

PROGRAMMABLY SLICEABLE SWITCH-FABRIC UNIT AND METHODS OF USE

1. FIELD OF DISCLOSURE

The present disclosure of invention relates generally to switch fabrics such as may be found in packet-based (or cell-based, or like framed-data based) digital, telecommunication switching systems.

The disclosure relates more specifically to switch-fabric units (SFU's) which may be integrated in the form of packaged, monolithic integrated circuits (switch-fabric chips) or otherwise, and provided in repeated form within a switch fabric of a digital, telecommunication switching system.

2a. CROSS REFERENCE TO CO-OWNED APPLICATIONS

The following copending U.S. patent applications are owned by the owner of the present application, and their disclosures are incorporated herein by reference:

(A) Ser. No. 09/847,711, filed May 1, 2001 by Onchuen (Daryn) Lau, Chris D. Bergen, et al, and which is originally entitled, MULTISERVICE SWITCHING SYSTEM WITH DISTRIBUTED SWITCH FABRIC;

(B) Ser. No. 09/846,875, filed May 1, 2001 by Matthew D. Ornes, Christopher I. W. Norrie, and Gene K. Chui which was originally entitled, METHOD AND SYSTEM FOR ERROR CORRECTION OVER SERIAL LINK;

(C) Ser. No. 09/905,394 filed Jul. 13, 2001 by Matthew D. Ornes, Gene K. Chui, and Christopher I. W. Norrie, and originally entitled, "Apparatus and Method for Reordering Sequence Indicated Information Units into Proper Sequence";

(D) Ser. No. 09/865,258 filed May 25, 2001 by Matthew D. Ornes, Gene K. Chui, and Christopher I. W. Norrie, and originally entitled, "Method and Apparatus for Scheduling Static and Dynamic Traffic through a Switch Fabric"; and (E) Ser. No. 09/699,737 filed concurrently herewith by Onchuen (Daryn) Lau, et al and originally entitled, VARIABLY DELAYABLE TRANSMISSION OF PACKETS BETWEEN INDEPENDENTLY CLOCKED SOURCE, INTERMEDIATE, AND DESTINATION CIRCUITS WHILE MAINTAINING ORDERLY AND TIMELY PROCESSING IN ONE OR BOTH OF THE INTERMEDIATE AND DESTINATION CIRCUITS.

2b. CROSS REFERENCE TO PATENTS

The disclosures of the following U.S. patents are incorporated herein by reference:

(A) U.S. Pat. No. 4,486,739, issued Dec. 4, 1984 to Franaszek et al. and entitled "Byte Oriented DC Balanced (0,4) 8B/10B Partitioned Block Transmission Code".

2c. CROSS REFERENCE TO RELATED OTHER PUBLICATIONS

The following publications are cited here for purposes of reference:

(A) CSIX-L1: Common Switch Interface Specification-L1, Published Aug. 5, 2000 as Specification Version: 1.0 at Internet URL: http://www.csix.org/csixl1.pdf.; and (B) Fibre Channel Physical and Signaling Interface (FC-PH) Rev 4.3, ANSIX3.230:1994 (available from Global Engineering, 15 Inverness Way East, Englewood, Colo. 80112-5704.

(See also http://www.ietf.org/internet-drafts/draft-monia-ips-ifcparch-00.txt)

2d. RESERVATION OF EXTRA-PATENT RIGHTS AND RESOLUTION OF CONFLICTS

After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer program listings or art works or other works provided herein, and to trademark or trade dress rights that may be associated with coined terms or art works provided herein and to other otherwise-protectable subject matter included herein or otherwise derivable herefrom.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

3. DESCRIPTION OF RELATED ART

The concept of a distributed switch fabric is known in the art. See for example, U.S. Pat. No. 5,844,887 issued Dec. 1, 1998 to Oren, et al. and entitled, ATM Switching Fabric; and U.S. Pat. No. 6,069,895 issued May 30, 2000 to Ayandeh and entitled, Distributed Route Server.

Briefly, under the switch fabric concept, each of a plurality of line cards (or other line units) can distribute its respective flows of communications traffic across a shared plurality of switching modules. Such switching modules may then switch or route the distributed traffic to others of the line cards/units according to dynamically-varied routing instructions. The traffic throughput rates that can be achieved for a given line card/unit may be increased by increasing the aggregate number of switching modules that service the given line card/unit. If one of the switching modules fails, others of the plural modules in the switch fabric may be used for moving the traffic through. A distributed switch fabric therefore provides the advantages of scalable throughput speed and fault tolerance.

Typically, a switch fabric is populated by a plurality of alike, switch-fabric units (SFU's), where each SFU implements part or the whole of a switching crossbar or another form of data routing means. A so-called, switch-fabric chip may be considered a non-limiting example of an SFU. There is a wide variety of possibilities in terms of how an SFU may be structured and how its corresponding switch fabric may be designed and used. A small scale design may call for a relatively simple and slow crossbar having dimensions of say, 4×4 (four ingress ports by four egress ports). A larger scale design may call for a complicated switching module that handles specific timing and protocol requirements while providing a, say 16×16 crossbar capability at traffic rates in the range of say OC-1 or STS-1 or 51.84 Mbps (megabits per second) to OC-12, where OC-N corresponds to Nx51.84 Mbps; N=1, 2 . . . , etc.

Consider, for purpose of a simple example, the needs of a small business office which has a private, digital telephone intercom system. Assume the intercom system hosts no more than four digital telephones. Each telephone is to be given the ability to individually call or route data to any of the three other telephones (unicast mode) as well as to itself. Each telephone is to be further given the ability to support a conference intercom call among as many as all of the three other telephones (multicast mode) as well as keeping itself in the conference. A set of 4×4 crossbars operating at low-fidelity voice speed should be able to support such a simple system nicely.

In contrast to the example of the small office intercom, consider the needs of a large, non-private, branch exchange that must provide high-rate and dynamically switched routing (of both unicast and multicast kinds) between thousands of line cards (or other line units), where each line card/unit may operate at an OC-1 or a faster data rate. The 4×4 low-speed crossbar design mentioned above would probably not be appropriate for such a more demanding situation. Instead, system designers may want to use large numbers of 64×64 crossbars, where each crossbar has a very high data transfer rate and has other attributes, as may be appropriate. The above two examples (the 4 station intercom versus the large branch exchange) are merely for illustrating how different situations may call for different kinds of SFU's as part of their respective switching solutions.

Because there is a wide spectrum of different needs within the digital switching industry, some manufacturers of switch-fabric units (e.g., producers of switch-fabric chips) tend to focus on specific, lower end, market segments such as the relatively slower and small-scale, 4×4, 6×6, or 8×8 segments. Other SFU manufacturers may concentrate on the larger scale and higher-speed market segments where the desire may be for SFU's with 16×16, 32×32 or larger crossbar capabilities. Each SFU manufacturer may chose to provide a unique packaging solution (e.g., ball grid array, quad inline, etc.) for its respective switch-fabric unit, and/or a unique pinout, and/or unique interface protocols. It is left to the next-in-market users (e.g., board manufacturers, and system integrators) in each vertical market segment to devise ways of installing the different SFU's into their systems (e.g., board-level, switch fabric cards) and devise ways of interfacing with the different SFU's.

Demand for product may fluctuate overtime amongst the different SFU market segments. For example, at a given time, demand may fall and inventories may rise in the 32×32 market while demand is rising and inventories are scarce in the 8×8 market, or vice versa. In theory, if there is a parts shortage in the 8×8 market, a switching system manufacturer (e.g., a fabric-board maker) may take a 32×32 part, use an 8×8 subarray of that part and leave as unused the remaining resources of the scrounged 32×32 part. In practice, this kind of solution does not work for several reasons. First, the 32×32 part tends to be much more expensive than the 8×8 switching device. Discarding the use of the majority of resources on such an expensive, 32×32 part rarely makes economic sense. Pricing in the 8×8 market may be such that use of a small subsection of the 32×32 part cannot be justified.

A second reason why the scrounging solution is impractical is as follows. If the scrounged 32×32 part and the original 8×8 switching device are each a single, hermetically-sealed package with one or more monolithic chips inside (as is often the case): the 32×32 part will typically have a very different pinout, very different size, and different hardware interface requirements than those of the scarce 8×8 switching device. Hardware engineers may therefore have to completely redesign the layout and connections on the printed circuit board(s) that originally supported the scarce 8×8 SFU device. This can be prohibitively expensive. A third reason is that the 32×32 part will typically have very different software interface requirements than those of the scarce 8×8 switching device. Software engineers may therefore have to completely redesign the support software that is to drive and/or interface with the replacement, 32×32 part. This too can be prohibitively expensive, particularly if the software engineers had not had an earlier opportunity to learn and gain experience with the interface protocols of the replacement, 32×32 part.

The above situation leaves the industry with a host of unsolved problems. It is difficult for manufacturers of switch-fabric units (e.g., switch-fabric chips) to efficiently manage their production schedules in view of changing market conditions. It is difficult for manufacturers of switch-fabric systems (e.g., board-level integrators) to efficiently predict what sizes of inventory they will need for each different kind of SFU in order to meet changing market demands. There are groups of people in the various market segments that need to be trained in how to interface with the different SFU's on the hardware and/or software sides in order to effectively test and maintain equipment. Support-staff education is therefore a problem in view of the changing needs in the different market segments (e.g., 4×4 to 32×32 or higher) and the different kinds of SFU's (switch-fabric units) that are supplied to each vertical market segment.

SUMMARY

Structures and methods may be provided in accordance with the present disclosure of invention for overcoming one or more of the above-described problems.

(A) More specifically, in accordance with one broad aspect of the present disclosure, a programmably-sliceable SFU (Switch-Fabric Unit) is provided which is capable of not only functioning essentially as an N×N' crossbar, but also of being programmably sliced to function as a plurality of S×S' virtual switch slices, where S<N and S'<N'. (N does not have to equal N' although it typically does. Similarly, S does not have to equal S' although it typically does.)

(B) In accordance with a second broad aspect of the present disclosure, methods are provided for programmably-slicing a PSSU (Programmably-Sliceable Switch-fabric Unit) and using one or more such sliced PSSU's in various situations.

More specifically, in accordance with one detailed aspect of the present disclosure, a request translation method is provided for use in a system where absolute Ingress ports (aI's) and absolute Egress ports (aE's) of a PSSU are alternatively identifiable as Relative ingress ports (Ri's) and Relative egress ports (Re's) of respective, virtual slices, and where the translation method comprises: (a) determining, based on the absolute Ingress port identification ($aI_x$) of the port on which a given request arrived, what slice a corresponding payload signal belongs to; (b) determining from a Relative egress port (or ports) identification (Re) specified in the given request, which absolute Egress port (or ports, aE's) the corresponding payload signal will egress from; and (c) altering the given request so as to cause the corresponding payload signal to egress from said determined aE or aE's.

In accordance with a second detailed aspect of the present disclosure, a plurality of virtual slices are programmably implemented in a given PSSU so as to make efficient use of all, or the majority of pre-switch, signal processing resources and/or post-switch, signal processing resources available with the given Programmably-Sliceable Switch-fabric Unit.

In accordance with a third detailed aspect of the present disclosure, absolute Egress-port(s) identifying signals (aE's) which have been derived from corresponding, Relative egress port (or ports) identifying signals (Re's) are transmitted to a scheduler for scheduling the routing and/or timing of corresponding payloads that are to egress from the egress ports identified by said aE signals.

In accordance with a fourth detailed aspect of the present disclosure, PSSU's having N×N' crossbar routing capabilities are programmed to each operate as a plurality of S×S' virtual slices where S<N and S'<N' and where the virtual slices are intermingled to provide effective uncrossings of the ingress and/or egress signal lines of the PSSU.

In accordance with a fifth detailed aspect of the present disclosure, a switching system having a plurality of PSSU's (Programmably-Sliceable Switch-fabric Units) is brought up, for interconnect testing purposes, in a simple, 2×2 or 4×4 organized slice mode, and then after operability of the system has been verified in the simpler slicing mode, the system is brought up (booted up) a second time in a more complex slicing mode such as 8×8 or higher for further testing and/or actual use.

In accordance with a sixth detailed aspect of the present disclosure, an inventory utilization method is provided for servicing a segmented market having an M×M'-ports switching segment and a S×S'-ports switching segment, where M and S are different whole numbers each greater than one, (and also where M' and S' are corresponding different whole numbers each >1), and said inventory utilization method comprises: (a) maintaining a common inventory of Programmably Sliceable Switch Units (PSSU's) that can each be programmably configured to function in a first mode (SAP-S) as a plurality of K/S, first switching slices with each such first slice providing an S by S' switch matrix capability, and that can each be programmably configured to function in a second mode (SAP-M) as one or more, second switching slices (K/M slices) with each such second slice providing an M by M' switch matrix capability, where K is greater than S and equal to or greater than M; (b) in response to demand in the S×S'-ports switching segment: (b.1) first removing from said common inventory, one or more of the PSSU's, (b.2) coupling the first removed PSSU's with first software that configures them to each operate as up to K/S, first switching slices, and (b.3) supplying the first removed PSSU's with the correspondingly coupled first software to in the S×S'-ports switching segment of the market; and (c) in response to demand in the M×M'-ports switching segment, (c.1) second removing from said common inventory one or more of the PSSU's, (c.2) coupling the second removed PSSU's with second software that configures them each to operate as up to K/M, second switching slices, and (c.3) supplying the second removed PSSU's with the correspondingly coupled second software to in the M×M'-ports switching segment of the market. Moreover, if demand suddenly slackens in one of the market segments, the inventory utilization method may further comprise: recovering from the slackening market segment, unused ones of the supplied PSSU's and returning the recovered PSSU's to the common inventory.

Other aspects of the disclosure will become apparent from the below detailed description.

BRIEF DESCRIPTION OF THE DRAWINGS

The below detailed description section makes reference to the accompanying drawings, in which:

FIG. 1A is a block diagram showing the workflow of Switch-Fabric Units (SFU's) into different vertical market segments for supporting the manufacture and use of switching systems in the various market segments;

FIG. 2A is a block diagram showing why it may be beneficial to have many switch slices in a switch fabric;

FIG. 2C is a schematic showing the programmed implementation of four 16×16 virtual slices in a 64×64 switching array;

FIG. 2D is a schematic showing the programmed and alternate implementation of two 32×32 virtual slices in the 64×64 switching array of FIG. 2C;

FIG. 2E is a schematic showing the programmed implementation of a variety of S×S' virtual slices in a 64×64 switching array;

FIG. 3A is a block diagram showing how tie-breaking can be adjusted to match the dimensions of differently sized virtual slices;

FIG. 4 is a block diagram of a specific, Z-cell based switching system that may be conformed to implement virtual slicing in accordance with the disclosure;

FIG. 5 is a block diagram of a specific, Z-cell based, ZEST chip that is conformed to implement virtual slicing in accordance with the disclosure;

FIG. 6A is graph showing how a relative multicast request can be translated into an absolute multicast request;

FIG. 6B is graph showing how a relative multicast request can be translated into an absolute multicast request in a so-called, de-crossed configuration;

FIG. 7 is a more detailed schematic showing how an RLC unit such as shown in FIG. 5 may be constructed;

FIG. 8B is a schematic showing the programmed implementation of four 16×16 virtual slices in a 64×64 switching array with ingress port de-crossing;

FIG. 8C is a schematic showing the programmed implementation of four 16×16 virtual slices in a 64×64 switching array with both ingress port de-crossing and egress port de-crossing;

DEFINITIONS AND CAVEATS

Figure 1B:
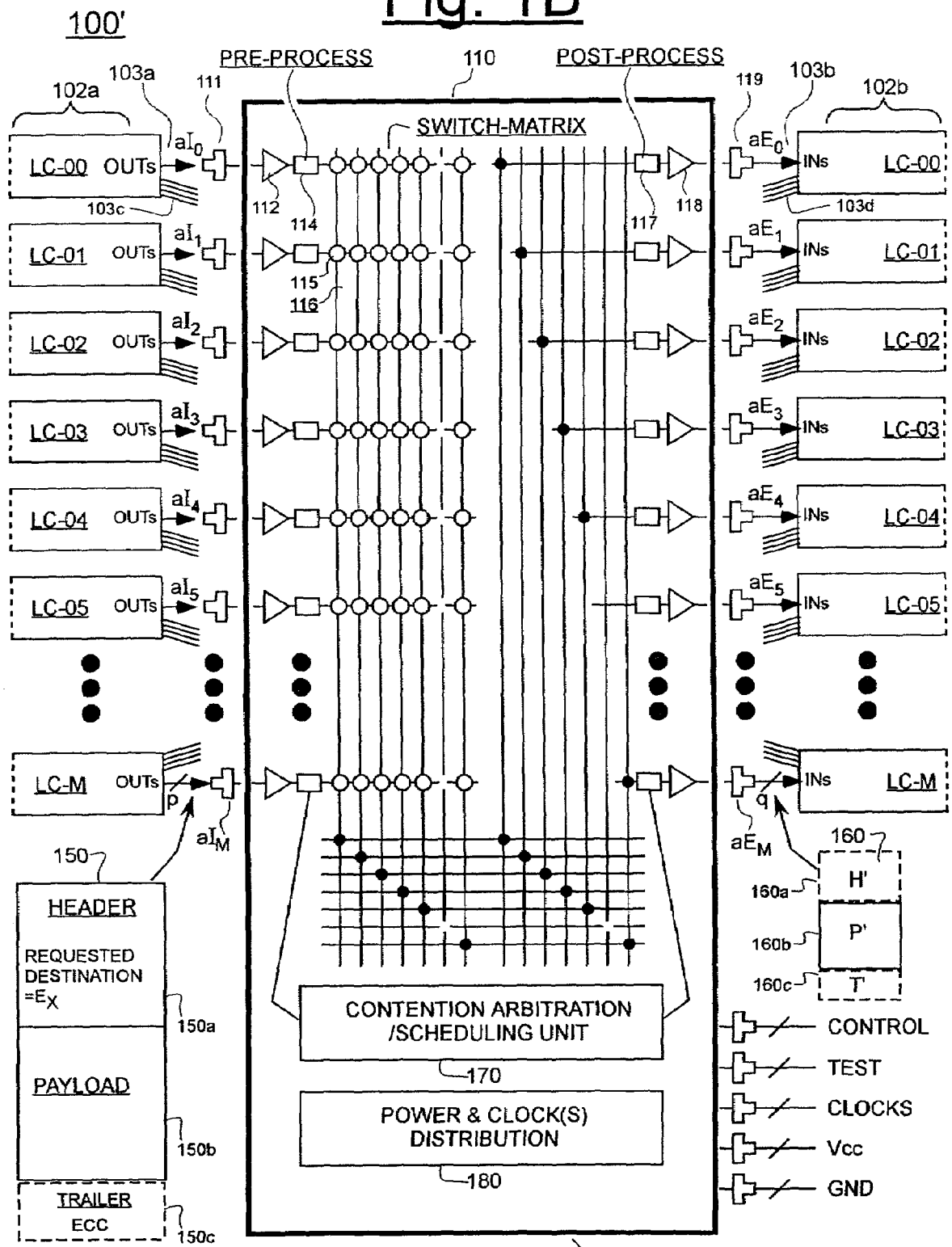
FIG. 1B is a block diagram of an in-system SFU that shows aspects of SFU design and SFU use that are germane to the present disclosure of invention.

New technologies often benefit from the coining of new terminologies that describe novel characteristics. Such is true for the 'Z-cell' based switching systems disclosed in the above-incorporated U.S. patent application Ser. No. 09/847,711 and such is also true for the error correction schemes disclosed in the above-incorporated U.S. patent application Ser. No. 09/846,875. The disclosed methods in these earlier-filed applications are merely examples of pre-switch processing and post-switch processing technologies that can be used in combination with the Programmably Sliceable Switch-fabric Units (PSSU's) of the present disclosure. The methods of Ser. Nos. 09/847,711 and/or 09/846,875 are not however considered to be best modes for carrying out the more-generically applicable, programmable slicing disclosed herein. They are merely specific examples of what could be done in combination with programmable slicing.

A number of terms used in U.S. patent application Ser. No. 09/847,711 will be re-used herein for purposes of example. It should be noted however, that the PSSU's described herein are not synonymous with or limited to the ZEST chips of Ser. No. 09/847,711. The line card units described herein are not synonymous with or limited to the ZINC chips of Ser. No. 09/847,711. The request/grant protocols described herein are not limited to the Z-cell based, request/grant protocols disclosed in Ser. No. 09/847,711. Reasons for why should become apparent below.

DETAILED DESCRIPTION

FIG. 1A is a workflow schematic for illustrating more clearly some of the industry problems described above. A first set (90) of parallel development paths 10, 20, . . . , 40 are illustrated as extending vertically to represent development and production cycles for different kinds of switch-fabric units (SFU's). Some overlap in shared technologies (e.g., integrated circuit fabrication processes) is of course possible between the illustrated parallel paths, 10-40.

One of the paths: 10, represents in downstream-directed order, the design-development, design-production, and supply-chain management phases of relatively simple class of SFU's, say, the 4×4 class of switch-fabric units. At the start of the 4×4 path 10, one or a variety of different 4×4 designs (11) may be created for servicing respective end-uses (100) that call for specific combinations of: (a) meeting a specified data throughput bandwidths, (b) complying with industry standard or proprietary interface protocols, (c) accommodating various packaging and power management concerns, and/or (d) conforming to other end-use specifications. The design phase 11 is typically followed by SFU manufacturing and testing phases 12. In one class of embodiments, each SFU (e.g., 107) that is output from the manufacturing and testing processes 12 is provided in the form of a hermetically-packaged, integrated unit having a single monolithic integrated circuit (IC) contained within. An SFU may alternatively be provided as an MCM (Multi Chip Module), or as an printed circuit board (PCB, potted or not), or in another integrated form. Unless expressly stated herein, the term 'SFU' shall refer broadly to any integrally manufactured unit that provides crossbar switching capabilities or substantial equivalents thereof. (In some situations, a partially-populated switching matrix may be acceptable in place of a fully-populated crossbar.) Manufacturing and testing phases 12 may include any or all of processes such as: (1) integrated circuit fabrication, (2) wafer-sort testing, wafer dicing and die testing, (3) chip packaging and post-package testing, (4) printed circuit production, (5) component mounting and post-mounting testing, etc., as may be appropriate for producing commercially viable SFU's 14 in the 4×4 design category 10. The point we are trying to make here is that a substantial amount of work, time and/or monetary expenditures may be associated with the creation of one or more inventories 14 of manufactured SFU's which belong to the 4×4 design category 10. If for some reason, the market for the 4×4 design category 10 declined or disappeared, it would be unfortunate to allow all the effort invested into creating the 4×4 SFU inventory(-ies) 14 go to waste without obtaining at least some return on the invested effort. Contrastingly, it would be highly advantageous to be able to secure maximum utility from the invested resources and efforts that went into creating the 4×4 SFU inventory(-ies) 14 even if the market for the 4×4 design category 10 declined or evaporated.

As seen in parallel development path 20, a similar sequence of designing 21, manufacturing and testing 22, and inventory-accumulating 24 may occur in the 6×6 design category. Development path 40 represents similar steps of SFU-designing 41, SFU manufacturing and testing 42, and SFU inventory creation 44 for a more complex, N×N design category; where N may have a value such as 16, 32, 64, or higher. Column 30 is understood to represent a spectrum of other SFU design and production activities 31, 32, 34 dispersed in relative order between the more-simple, column 10 and the more-complex column 40. Although the examples given here are for the more common, square-organized switching arrays (e.g., 4×4, 6×6, etc.), it is within the contemplation of the disclosure to also include regular switching arrays with other configurations such as an N×N' rectangular configuration in which N' does not necessarily equal N.

As explained above, the respective SFU producers of columns 10, 20, . . . , 40 tend to specialize in their specific design categories (e.g., 4×4, 6×6, etc.) and tend to produce non-interchangeable switch-fabric units for their respective categories. In the next successive parts (51, 52, 53) of the illustrated, vertical markets; board manufacturers and/or other types of system designers, manufacturers and/or system integrators decide which, and how many specific ones of the manufactured switch-fabric units (SFU's) 14-44 will be used in their respective switch-fabric boards and/or switching systems. The respective board/system producers 51-53 accordingly order and/or draw 58 product from respective ones of inventories 14, 24, . . . , 44 to satisfy their specific needs. The production schedules and inventory management activities of the upstream SFU producers 10-40 are typically modified in response to the ordering and/or inventory-depleting actions 58 of the downstream, board/system producers 51-53.

There are substantial inertia's associated with the board/system producers 51-53. Let us look at the activities, 51 of a specific board or system producer. It may be appreciated from FIG. 1A that there are various costs associated with the design, manufacture, and testing of the specific switch-fabric boards and/or switching systems (100) which are to be offered by each given producer, say producer 51. The activities of board/system producer 51 typically include predicting how much to order and/or draw 58 from respective SFU inventories such as 14 and 24. Additionally, each board/system producer (e.g., 51) typically has to provide appropriate software and/or hardware 55 for interfacing with the utilized 58 inventories (e.g., 14 and 24) of SFU's. The board/system producer 51 then offers (106) its manufactured and tested products to one or a small subset of the market segments in the switching industry. FIG. 1A shows producer 51 as offering its wares to the 4×4, 6×6 and 8×8 market but not to the more complex market segments such as the 16×16 or higher segments. By contrast, board and/or system producer 53 is shown offering its respective wares (coupled with appropriate software and hardware interfacing 56) to the 16×16 or higher market while not offering products for the lower end 4×4 market. Ellipses 52 are understood to represent yet other board/system providers who service respectively specialized segments of the switching market.

Due to market volatility, the demand (60) for specific SFU's in each design category (e.g., 4×4, 6×6, . . . , N×N) can change rapidly with time. Feedback lines 61 and 62 respectively represent inventory utilization controls and production controls that respond to market demands 60 to effectuate appropriate changes in the numbers of products held within respective ones of SFU inventories 14-44 and to effectuate appropriate changes in the production rates and production capacities of SFU factories 12-42. The feedback mechanisms represented by lines 61 and 62 should account for current market conditions as well as predicted, long term market conditions. Those skilled in the arts of inventory management and production management know that accurate prediction of long term trends can be very difficult (particularly in markets that are driven by Moore's law, such as the semiconductor-based markets). Market demands can change dramatically overnight. For example, the 8×8 SFU market may heat up overnight while the 16×16 market slackens or vice versa.

Theoretically speaking, if 8×8 SFU's are in short supply and at the same time, 16×16 SFU's are abundant, then a board/system producer (51) who operates in the 8×8 market may try to draw replacement parts from a 16×16 product inventory (44) rather than the 8×8 inventory (34) which that producer normally draws from. The 8×8 producer (51) may try to use a single 8×8 subset of the available 16×16 switching capability offered by the 16×16 SFU's to satisfy the need for 8×8 switching capability. However, theory and practice do not coincide here. A number of reasons have already been given above for why it is generally impractical to substitute 16×16 SFU's in place of specific 8×8 units. Additional reasons for why will become clear as we next discuss FIG. 1B. At this juncture we note that the switching industry may benefit significantly, and that costs to end users might be reduced if a switch-fabric unit (SFU) could be devised that would efficiently service a diverse set of market segments such as the 4×4, 8×8, 16×16, 32×32 and 64×64 segments.

However, before explaining how such a ubiquitous solution can be provided, we remain in FIG. 1A to briefly describe how a packet-based (or a cell-based or an otherwise organized) switching system 100 may be structured, used, and how SFU's may be incorporated into such a system 100. Packet-based, or otherwise-framed, digital communication signals may be provided along a first set of lines 101. The physical makeup (e.g., optical and/or electrical) of the signals on lines 101 and the various signaling protocols used (e.g., ATM, TDM, IP, etc.) may vary from line to line and/or situation to situation. The specifics of telecommunication lines 101 are not relevant here.

Further in system 100, a switch fabric 105 is provided for dynamically routing communications signals from one of lines 101 to a dynamically-selected subset of lines 101. The selected subset may be just one line (unicast routing) or a larger number (multicast routing) of lines even including all of the lines in set 101 as may be appropriate for a given switching environment. The switch fabric 105 may be structured as a plurality of physical switch cards (PCB's) or in other physical and/or logical forms as deemed appropriate by the board/system producers 51-53. Because the switch fabric 105 has historically come in the form of individual switch cards, it is shown as such in FIG. 1A. However this exemplary depiction is not to be considered as limiting. The switch fabric 105 can be structured according to a wide variety of other ways (including physical intermingling with components of a soon-described, lines-interfacing layer 102). Switch-fabric unit 107 is an example of one of a plurality of SFU's that may be used (106) by a given board/system producer (e.g., 53) to create a respective switch fabric 105.

Typically, a lines-interfacing layer 102 is provided between telecommunication lines 101 and the switch fabric 105. The lines-interfacing layer 102 may be populated with line cards or other appropriate physical and/or logical means. Respective line-interface units of layer 102 are referred to herein as line card units (LCU's) in accordance with historical usage. An LCU is not limited however to being in the form of a printed circuit board and may come in various physical and/or virtual formats as may be appropriate. If system 100 services the M×M market (where M is greater than 2), then typically there will be a plurality of M LCU's whose individual members may be numerically identified as LCU-0 through LCU-(M−1). There is no necessary direct linkage between the number, M of lines 101 and/or line-card units used layers 101-102 and the S×S' switching array capabilities provided by each SFU 107. M could be fairly large (e.g., M=1024) while the local switching capability provided by each SFU 107 may be relatively small, say, 8×8. Cascaded layers of SFU's might be used to provide the larger M×M switching capability. For purpose of simplicity however, we will assume that only a single layer of SFU's is used in fabric 105 and that the S×S' switching capability of each SFU 107 therefore matches the M×M switching function of the overall system 100 (in terms of numbers of ingress ports and numbers of egress ports although usually not in terms of per-unit bandwidth).

An interconnect layer 103 may be provided between the lines interface layer 102 and the switch-fabric layer 105. While the above-cited U.S. patent application Ser. No. 09/847,711 discloses a particular form of interconnect 103, the present disclosure is not limited to such a unique interconnection scheme. The interconnect layer 103 is mentioned here mainly so that it may be later appreciated (when we describe FIG. 1B) that a given SFU (107) may include specialized, pre-switching resources (112/114) and specialized, post-switching resources (117/118) that are adapted for appropriately coupling with the corresponding interconnect layer 103.

FIG. 1A shows the switch fabric 105 as being further coupled to a control mechanism 109 by way of a control interface 108. Control interface 108 may provide a variety of ancillary functions such as (but not limited to): resetting the switch fabric units 107 to a default state, testing the SFU's 107, and/or to otherwise controlling operations of the SFU's 107. As different parts of the switching system 100 are assembled together, it is often advisable to test their interconnections and other aspects of their interoperability. Such testing may include putting each of the SFU's 107 through its paces by asking it to route signals according to a large number of routing permutations.

In FIG. 1B, we provide a simplistic introduction to the internal structuring of an SFU 107' so it can be understood how testing and use of its various resources interrelate. During this introduction, we develop certain terminologies (e.g., aI, aE) that will be used throughout the remainder of this disclosure. The introduction also begins to explain why a PSSU (Programmable Sliceable Switch-Fabric Unit—see FIG. 2B) may make far more efficient use of its SFU-internal resources than might be apparent from merely looking at the virtual switch slices (see FIG. 2B) that are programmably implemented within such a PSSU.

In FIG. 1B it is assumed that an exemplary, line-card unit such as LC-M (bottom left) may route a respective payload signal 150b to a desired one or more of line card units LC-00 through LC-M by passing the payload signal 150b through a single SFU 107' rather than by having to pass the payload through a cascaded chain of such SFU's. The latter cascaded approach however, is also within the contemplation of the present disclosure and PSSU's may be used in switch fabrics with cascaded layers as well as within the single-layer switch fabric assumed by FIG. 1B.

SFU 107' is shown to be housed in a protective enclosure 110. For one set of embodiments, enclosure 110 may be a hermetically sealed packaging such as used for packaging monolithic IC's or MCM's. As known in the art, such packagings typically have external interface terminals or pins for coupling with external circuitry. The housed chip or chips may have interface pads for coupling to the package pins or terminals. In the case of the integrally packaged unit 110 (which alternatively could be a laminated printed circuit board or another integrated component in the broad sense), item 111 represents one or more of the package pins or terminals; and/or one or more of the chip pads, and/or functionally equivalent means which define a first ingress port, $aI_0$. The lower case 'a' in the notation, $aI_x$ indicates 'absolute', the I indicates 'ingress', and the x indicates a unique port identification such as a port number. We will introduce later below, the concept of a 'relative' port identification. Also in FIG. 1B, item 119 represents a counterpart, first egress port, $aE_0$. The package pins, terminals, and/or die pads, etc. of these ingress and egress ports 111 and 119 may be distinct or they may overlap (e.g., if multiplexing is used). The number of conductors, p, per ingress port (e.g., port $aI_M$) and the number of conductors, q, per egress port (e.g., $aE_M$) may be the same or they may be different and each can be any number greater than zero. During system bring-up, the operability of each of the p and q conductors of each port (ingress and egress) should be verified by exercising them with a variety of permutated test patterns that look for opens, shorts and other undesired conditions.

As seen in FIG. 1B, respective ingress and egress ports 111 and 119 both connect to a same line card unit, LC-00 (more specifically to the ingress side 102a and egress side 102b of that LCU). The interconnect couplings 103a of LC-00 that connect to ingress port $aI_0$ are part of a set denoted as OUTs while the couplings 103b from egress port $aE_0$ to LC-00 are part of a set denoted as the INs of the line card unit. In addition to the interconnect couplings 103a, 103b between LC-00 and SFU 107', there will typically be further interconnect couplings 103c, 103d between the respective OUTs and INs of LC-00 and other switch-fabric units which are not shown in FIG. 1B. Under the switch fabric paradigm, each line card unit (e.g., LC-M) of signal-sourcing layer 102a should be trying to distributively transmit its respective payloads (105b) through a corresponding plurality of switch matrices (116) in order to achieve high throughput bandwidth and/or fault tolerance. The payloads distributing aspect will be detailed shortly (see FIG. 2A). It should be appreciated in passing, that during system bring-up, the ability of each LCU to route its signals through all of the available SFU's should be verified by exercising the LCU's with a variety of permutated test patterns that look for opens, shorts and other undesired conditions.

An actual ingress port such as 111 ($aI_0$) will typically couple to an input buffering unit 112 within SFU 107' and/or to a pre-switch processing unit 114. The functions carried out by input buffering unit 112 and/or pre-switch processing unit 114 can vary depending on the signaling and timing protocols specified for the corresponding interconnect layer (103) and lines-interfacing layer (102, see FIG. 1A) and on other factors. Examples of input buffering and/or pre-switch processing functions 112/114 may include, but are not limited to: (1) level-shifting; (2) bit-detection; (3) clock recovery (if asynchronous communication is used); (4) de-serialization (conversion from a serial to a more parallel data format); (5) signal framing; (6) error check and/or correction; (7) ingress-side error logging and auto-shutdown of error-prone ingress links; (8) signal decoding or decompression; (9) signal storage and/or (10) alignment of received signals with internal clocks of SFU 107'. Significant amounts of die space and/or other resources of SFU 107' may be consumed for providing the ingress buffering and pre-switch processing functions 112/114. It is to be understood that any one or more of pre-switch functions 112/114 can be optional. It should be appreciated in passing, that during system bring-up, the ability of each pre-switch resource 112/114 to perform its expected functions should be verified by exercising the SFU with a variety of permutated test patterns that look for defects in the pre-switch resources 112/114. If one or more of the pre-switch resources 112/114 of a given SFU are not operating as desired, it may become advisable to deactivate the in-system SFU 107'.

Signals that have been received by first ingress port $aI_0$ and have been optionally buffered or pre-processed in units 112/114 may next move into a switch-matrix portion 116 of SFU 107'. The switch-matrix 116 is schematically illustrated as a regular set of intersecting horizontal and vertical lines with hollow circles 115 populating the intersections. Those skilled in the art will understand the hollow circles 115 to represent dynamically-controllable junction points or switch points. Activation of a given junction point 115 allows a signal that is ingressing along a horizontal line to egress along a corresponding vertical line of matrix 116. If the switch point 115 is not activated, then no signal coupling is provided therethrough from the corresponding horizontal line to the corresponding vertical line. A single payload (150b) may be simultaneously multicast from one horizontal line to plural vertical lines by simultaneously activating plural ones of the junction points 115 along the respective, horizontal ingress line.

Some means 170 should be provided for coordinating the activation of the matrix junction points 115 in order to prevent a contention situation from arising where two or more conflicting signals are trying to egress along a same vertical line at the same time. Additionally, or alternatively, various payload signals may be vie with one another for access through a given horizontal ingress line. The illustrated contention arbitration and/or scheduling unit 170 may be operatively coupled to various parts of the switch matrix 116 and the pre-switch (114) and post-switch (117) processing units for coordinating the operations of the switch matrix so that contention are avoided. A wide variety of arbitration and scheduling algorithms may be employed within unit 170. The specifics of such arbitration and/or scheduling algorithms are not relevant to the present disclosure. However, some of these algorithms may include round-robin or other priority distribution mechanisms which may be impacted by the soon-to-be-disclosed programmable-slicing techniques. Methods for dealing with these will be described later below. It should be appreciated in passing, that during system bring-up, the ability of each switch point 115 to perform its expected functions should be verified by exercising the SFU with a variety of permutated test patterns that look for defects in the switch-matrix resources. If a given switch point 115 or its associated, horizontal ingress and vertical egress lines are not operating as desired, it may become advisable to deactivate the in-system SFU 107'.

After having been routed through switch matrix 116, a given payload signal 105b will typically move through a post-switch processing unit 117 and/or an output buffering unit 118 for final egress through a corresponding egress port 119 ($aE_0$). The post-switch processing functions 117 and output buffering functions 118 that are carried out may include, but are not limited to: (1) encoding and/or compression of payload signals; (2) attachment of error correction and other control signals or framing signals; (3) egress-side error logging and auto-shutdown of SFU if its egress side is error-prone; (4) phase-alignment to external clock signals (if synchronous communication is being used); (5) serialization; (6) level-shifting and/or (7) other processings as may be appropriate in accordance with protocols used on the egress interconnect conductors 103b. The so-switched and processed payload signal, 160b may then move into line interface layer 102b for further handling therein. It should be appreciated in passing, that during system bring-up, the ability of each post-switch resource 117/118 to perform its expected functions should be verified by exercising the SFU with a variety of permutated test patterns that look for defects in the post-switch resources 117/118. If one or more of the post-switch resources 117/118 of a given SFU are not operating as desired, it may become advisable to deactivate the in-system SFU 107'.

As seen in FIG. 1B, the ingress payload signal 150b may be accompanied by, or logically associated with, a header data signal 150a and/or a trailer data signal 150c. The egress payload signal 160b may be accompanied by, or logically associated with, a respective header data signal 160a and/or a trailer data signal 160c. Trailers 150c and/or 160c may include error checking and/or correction codes (ECC codes), in-band control signals, or other fields related to link-health, signal-integrity, or the like. The above-cited U.S. patent application Ser. No. 09/846,875 discloses one of many possible schemes for carrying out error checking and/or correction and in-band control. The ingress payload 150b does not have to be attached to the header 150a that makes the request (e.g., Destination equals the egress port(s) identified as $E_x$) for a corresponding switching operation through matrix 116. In an alternate embodiment, Requests are sent separately from corresponding payloads, and the payloads are sent only if a corresponding Grant is returned to the LCU from the request-receiving SFU. The latter approach makes more efficient use of the limited bandwidth in the LCU-to-SFU interconnect layer 103. See the above-cited U.S. patent application Ser. No. 09/847,711 for more details (not relevant to the present disclosure).

Besides the contention arbitration and/or switching scheduling unit 170, the switch-fabric unit 107' may include a variety of further resources 180 for generating and/or distributing power and clock and/or other signals within packaging 110. The external pins, pads or other terminals of SFU 107' may accordingly include those for: (a) connecting to ground (GND) and power (Vcc) rails, (b) connecting to clock traces on a corresponding printed circuit board or another external circuit means; (c) connecting to test-conducting mechanisms and/or to other control mechanisms. When SFU 107' is manufactured, all its various resources should be tested for operability and conformance with performance and reliability specifications. That means that features such as all the package terminals and die pads have been tested and found to work properly. All or a substantial portion of internal structures such as 112, 114, 115, 116, 117, 118, 170 and 180 should also have been tested and found to work properly. A substantial amount of effort may have been invested into fabricating and testing SFU 107' before it is installed into a switching system (100, FIG. 1A) as well as after it has been installed into such a system. In view of this, it would be advantageous—if it could be done—to be able to efficiently harvest as much utility as possible from all the effort that is expended in creating and testing an SFU such as 107' even if market conditions (see 60 in FIG. 1A) shift somewhat and demand slackens or disappears for a particular switch matrix configuration such as 4×4 or 8×8. Programmable-slicing makes this possible.

Figure 2B:
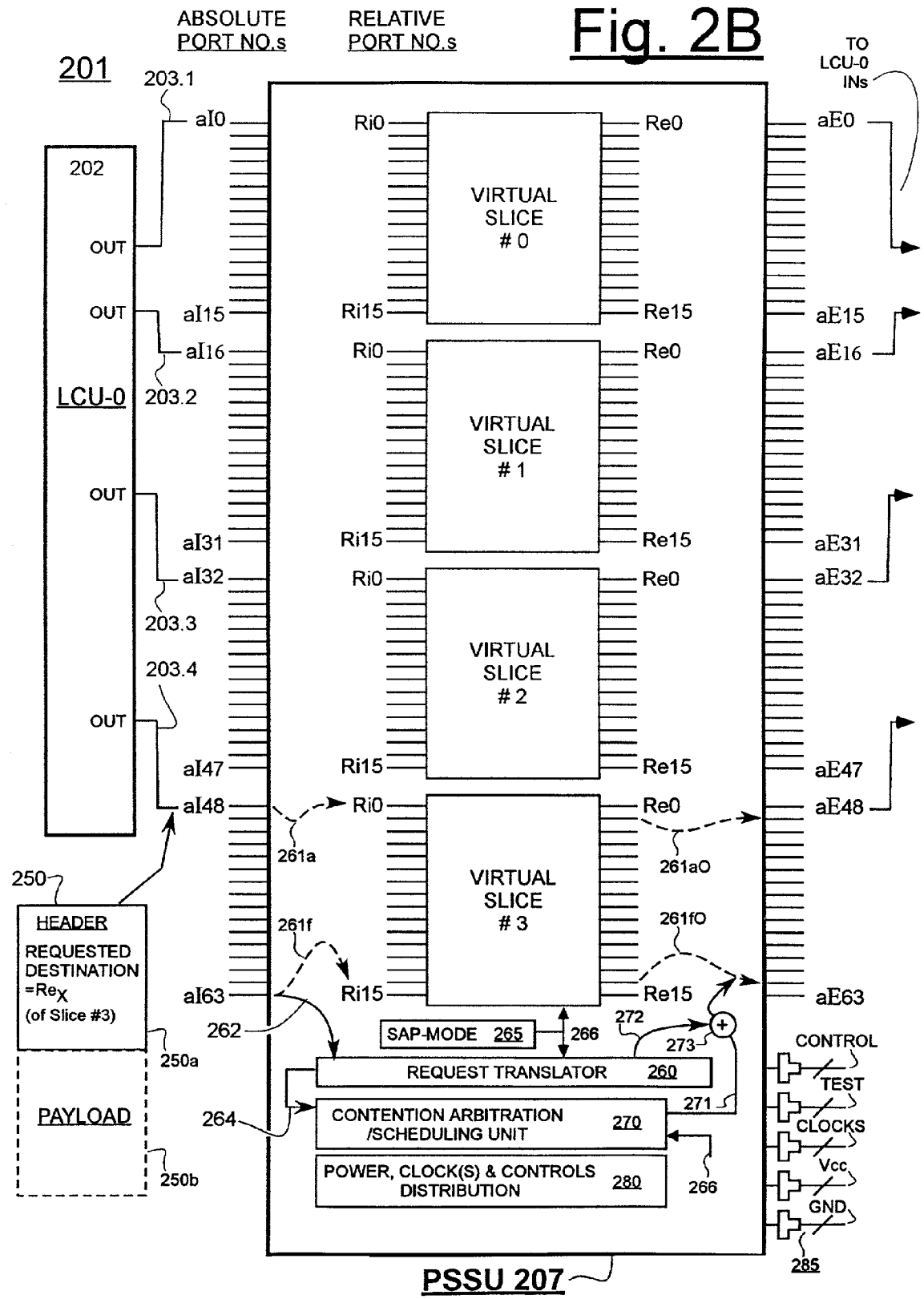
FIG. 2B is a block diagram introducing the concept of mapping relative destinations within requests into absolute destinations.

Before describing how the programmable-slicing depicted in FIG. 2B may be carried out, we digress to FIG. 2A in order to explain why it may be desirable to have large numbers of switch matrices (or switch slices, as the more generic, virtual and/or real versions of these are referred to herein). FIG. 2A provides a conceptual diagram for explaining how multiple SFU's or virtual equivalents thereof may be used to switch traffic at variable throughput rates. The illustrated system 200 is assumed to be very simple and comprised of just two fully populated switching matrices 251 and 252 (e.g., two SFU chips) or, alternatively, two functional equivalents of these SFU's, where the equivalents are referred to as switch slices. Items 251 and 252 are therefore also referred to herein as first and second switching slices. In this simplified example, each of the switching slices has 16 horizontally-extending ingress lines crossing with 16 vertically-extending egress lines, where a programmably activatable switching point such as 255 is provided at every intersection of the lines. Activation of a switching point such as 255 allows an ingressing signal on the corresponding horizontal line to egress along the corresponding vertical line. If the switching point (255) is deactivated, a conductive path is not formed between the intersecting horizontal and vertical lines at the position of that switching point.

Those skilled in the art will appreciate that the illustrated, and fully populated 16-by-16 array 251 of switching points (one of which points is denoted as 255) is not the most practical way to implement a switching matrix; particularly as one scales to larger sized matrices such as 32-by-32, 64-by-64, or higher. Each switching point (255) can capacitively 'load' its respective horizontal and vertical connection lines. The total amount of loading on each line can become excessive as one scales the conceptually-illustrated version to larger sizes. In more practical implementations, rather than the one-shot switching organization shown in FIG. 2A, it is better to have cascaded stages of switching that operate in pipelined fashion such that the pipeline stages each make full use of a given timing window (a switching 'tick') to keep data-that-is being switched, constantly moving through the pipelined switching system. There are many different designs for implementing practical, fully-populated, switching matrices or crossbars or function equivalents of such, including pipelined and cascaded approaches. Such is beyond the purview of the present disclosure, and is not relevant because, generally speaking, irrespective of what slice-implementing technology is employed, the programmable, slice-partitioning approaches disclosed here should work. The simplistic, one-stage switching organization shown in FIG. 2A is the easiest way to explain the relevant concepts. Hence it is used for convenience's sake.

The term 'ingress channel' will be used herein to refer to what is conceptually-shown in FIG. 2A as a horizontally-extending ingress line in combination with its set of on-line switch points (255).

For purposes of unicast traffic routing, when a given switch point (e.g., 255) is activated, it's horizontal ingress channel and vertical egress line may be deemed to be 'consumed' and thus unable to at that same time support unicast routing of other traffic. The term 'cross-tee' will be used herein to refer to a horizontally-extending ingress channel in combination with one of the vertically-extending egress lines. A notation such as 251.2x7 will refer herein to a cross-tee defined in switch slice 251 by ingress channel 2 and egress line 7. A notation such as 251.2 will refer herein to ingress channel 2 of switch slice 251.

Each of horizontal ingress channels H0-H15 may receive egress traffic from a respective one of 16 line card units in our simple example. We assume that line card unit number 2 (230) contains an ingress queue 235 holding five data cells that want to be passed through the switch fabric and over to destination line card number 7 (240) at a pre-specified rate, say OC-24. We assume further that due to the utilized IC technology and/or implemented algorithms for processing cells (or packets, or other framed sets of data), the cells-per-second, throughput rate of a given switch slice cross-tee is limited to a maximum value, of say OC-12. One example of a switch slice cross-tee is indicated by first shading at 251.2x7 and it is understood to provide ingress receipt via channel H2 and to provide, switched egress output via line V7a. If the cells of ingress queue 235 are to move at the desired throughput rate of OC-24, then switching slice 251 will not by itself be able to support such a throughput rate. However, if the cells of source line card 230 are spatially split apart as indicated by paths 211-214 so that roughly half the ingress cells (235) move through switch slice cross-tee 251.2x7 while the remainder move roughly in parallel through switch slice cross-tee 252.2×7, then the desired throughput rate can be realized. If we wanted to increase the desired throughput rate to OC-36 (that is, three times our per slice rate), then we would try to distributively transmit our source cells (235) simultaneously to and through three switch slices. Similarly, if we wanted to increase the desired throughput rate to OC-48 (that is, four times our per-slice exemplary rate), then we would try to distributively transmit our source cells (235) simultaneously to and through four switch slices. For an OC-192 throughput rate, we would need at least 16 switch slices in this example. That is the basic concept behind using plural switch slices such as 251 and 252. The more slices there are, the more flexibility there is for distributively transmitting source cells (e.g., 235) simultaneously, to and through all or a subset of the switch slices in order to realize a desired throughput rate (e.g., OC-12 through OC-192). If a given cross-tee becomes inoperative because, say, an ingress-side interconnect line (103a—see FIG. 2B) breaks; or even if the whole of a given switch slice becomes inoperative because, say, an egress-side interconnect line (103b—see FIG. 2B) breaks; then others of available switch slices may be used as alternate paths for the affected traffic. The switching system 200 can continue to operate (albeit, at a slightly slower, aggregate throughput rate) despite the appearance of a fault such a broken-open interconnect line. So the provision of a switch fabric with large numbers of switch slices is highly desirable. But there are practical problems that need to be solved in order to implement a distributed switch fabric.

More specifically, suppose that at first time point $t_1$, ingress CELL-1 is applied by path 211 to ingress channel H2 of slice 251 (also denoted as 251.2). Suppose that a second time point, $t_2$ which is fairly close to or identical to first time point $t_1$, ingress CELL-2 is applied by path 212 to channel 252.2. The sequential order and closeness of time points $t_1$ and $t_2$ can vary from one implementation to the next and even during use of a given implementation. This can be so for several reasons. It may be that ingress CELL-2 departs from line card unit 230 before ingress CELL-1, or vice versa. The signal propagation delay of path 212 may be longer than that of path 211, or vice versa. Ingress CELL-2 may develop an uncorrectable bit error during its travel across path 212 (e.g., across the line-to-switch interface layer 103 of FIG. 1A) and may therefore have to be re-transmitted at a later time over same path 212. These are just examples. Other factors that may cause variations of arrival time at a given horizontal ingress channel, 25J.K may include temperature changes, IC fabrication process changes, clock skew, and so forth.

As CELL-1 and CELL-2 respectively arrive on the H2 lines (or their equivalents) of switch slices 251 and 252, the respective switching points of cross-tees 251.2x7 and 252.2x7 should have been pre-activated so that, upon successful arrival, CELL-1 and CELL-2 can quickly traverse out from respective egress lines V7a and V7b (or their equivalents) for respective coupling along paths 221 and 222 to destination line card unit 240. However, as was the case with the ingress paths 211-212, the now egressing cells can encounter same kinds of delays problems on respective paths 221-222 before CELL-1 finally arrives in egress queue 245 at respective time point $t_5$, and CELL-2 finally arrives in queue 245 at respective time point $t_8$. Because of the possible variations in positionings of a destination line card unit 240 relative to switch slices 251, 252 and relative to source line card unit 230, and/or because of variations in signal propagation delays of paths 221-224, and/or because of other factors, the arrival times of egress cells such as CELL-1 through CELL-5 at queue 245 can vary in terms of sequence and closeness to one another. A problem may therefore be presented regarding how to compensate for such timing variations if need be.

Another problem is how to make efficient use of the ingress and egress resources of the switch slices 251, 252. For example, if egress line V7b (or its equivalent) is busy servicing a horizontal ingress channel other than 252.2, then CELLs-2 and 4 may not be able to get through at that time. However that should not mean that all other egress possibilities from horizontal channel 252.2 should be wasted at that time. It may be that egress line V11b is not busy and it can service another cell wanting to travel from line card unit 2 to line card unit 11 by way of cross-tee 252.2x11. So even if access requests by ingress CELLs-2 or 4 for switch slice crossbar 252.2x7 may be refused because V7b is 'busy', a 'secondary' request by another cell to use switch slice cross-tee 252.2x11 (egresses through V11b') may be granted if egress line V11b' is not busy at the time the request is arbitrated or otherwise handled. The primary request that lost because of the V7b 'busy' problem may be queued up in a buffer within switch slice 252 for a predefined time length (e.g., up to 6 ticks) and allowed to compete in future request arbitrations carried out for horizontal ingress channel 252.2. If the queued request ages too much (e.g., more than roughly 6 local ticks), the losing request may be dropped from the arbitration queue.

In addition to the just-described, 'secondary' egress of a unicast cell from alternate egress line V11$b'$, it may be desirable to multicast plural copies of a given source cell (e.g., CELL-2) simultaneously from one ingress channel such as 252.2 for egress by way of plural vertical lines such as V7$b$ and V11$b'$ to respective destination line cards units. The processing of these, and a variety of further options can be fairly complex. The contention arbitrating and/or scheduling unit 170 (FIG. 1B) is typically designed to deal with such problems.

It would be nice to have a scheme which allows for programmable slicing of an integrated switch matrix (e.g., 116) so that multiple slices, each having desirable switching dimensions (S×S'), can be implemented. It would be nice to at the same time be able to avoid dealing with all the internal complexities of the arbitrating and/or scheduling unit 170.

Referring to FIG. 2B, some of the concepts behind our solutions are introduced at a simplistic level. Basically, part of a line card unit such as part 203.4 of LCU 202, is led into believe it is transacting with a relatively small switch slice (virtual slice #3) when in fact that LCU part (e.g., 203.4) is actually communicating with a larger switch-fabric unit 207. Within the larger switch-fabric unit 207 (where this latter unit 207 is also referred to as a Programmably-Sliceable Switch-fabric Unit, or PSSU 207), there is provided a programmable request translator 260. The request translator 260 receives (262) request signals which arrive on the actual ingress ports (e.g., $aI_0$-$aI_{63}$) of PSSU 207 from corresponding line card units (LCU's). Each of the received request signals (e.g., 250$a$) includes an initial identification of one or more egress ports that the request provider (e.g., LCU) believes will be the output location for a correspondingly, switched-payload (e.g., 250$b$). The request translator 260 transforms the initial identification(s) of the payload destination or destinations as found in the received request signal (262) from a relative one (Dest=Re$_x$) into an absolute one (Dest⊆|aE$_0$ . . . aE$_{63}$|) before forwarding (264) the translated request(s) to a contention arbitrating and/or scheduling unit 270 of the PSSU 207. The arbitrating/scheduling unit 270 then processes the translated request 264 and causes the corresponding payload (250$b$) to be switched for egress 272 from the absolutely-identified port(s). The payload-sourcing LCU 202 may be left completely unaware that it has been communicating with the larger PSSU 207 rather than a smaller virtual switch slice (e.g., #3).

By way of a more concrete example, we show PSSU 207 as having 64 actual Ingress ports identified respectively as $aI_0$-$aI_{63}$, and as having 64 actual Egress ports identified respectively as $aE_0$-$aI_{63}$. A partitioning mode (a 'SAP' mode) is established within register 265 of the PSSU 207 for causing the PSSU to appear as if it has—in this example—four, virtual switch slice units each having 16 virtual ingress ports (respectively identified by Relative port numbers, Ri0 through Ri15) and 16 virtual egress ports (respectively identified as Re0-Re15).

Note that actual ingress ports $aI_0$-$aI_{15}$ correspond to Relative ingress ports Ri0-Ri15 of virtual slice #0. Also, actual egress ports $aE_0$-$aE_{15}$ correspond to Relative egress ports Re0-Re15 of virtual slice #0. The request translation (inside unit 260) for virtual slice #0 can therefore be a simple one-to-one translation. Note secondly, that actual ingress ports $aI_6$-$aI_{31}$ correspond to Relative ingress ports Ri0-Ri15 of virtual slice #1. Moreover, actual egress ports $aE_{16}$-$aE_{31}$ correspond to Relative egress ports Re0-Re15 of virtual slice #1. The request translation (inside unit 260) for virtual slice#1 can therefore be simply that of adding the value 16 to the relative Re number in order to obtain the actual aE port number. In binary notation, the identification of Re0-Re15 can be expressed with just 4 bits (0000-1111) and the Add 16 operation can be mimicked simply by ORring a 01 string to the implicitly zero-filled, most significant, fifth and sixth bit positions (thereby obtaining the translated range, 010000-011111).

Note thirdly that actual ingress ports $aI_{32}$-$aI_{47}$ correspond to Relative ingress ports Ri0-Ri15 of virtual slice #2. Moreover, actual egress ports $aE_{32}$-$aE_{47}$ correspond to Relative egress ports Re0-Re15 of virtual slice #2. The request translation (inside unit 260) for virtual slice #2 can therefore be simply that of adding the value 32 to the relative Re number in order to obtain the actual aE port number. If binary representation is used, the Add 32 operation can be mimicked simply by ORring a 10 string into the implicitly zero-fi led, most significant, fifth and sixth bit positions (thereby obtaining 100000-101111).

Note fourthly that actual ingress ports $aI_{48}$-$aI_{63}$ correspond to Relative ingress ports Ri0-Ri15 of the fourth virtual slice, namely, #3. Moreover, actual egress ports $aE_{48}$-$aE_{63}$ correspond to Relative egress ports Re0-Re15 of virtual slice #3. The request translation (inside unit 260) for virtual slice #3 can therefore be simply that of adding the value 48 to the relative Re number in order to obtain the actual aE port number. If binary representation is used, the Add 48 operation can be mimicked simply by ORring a 11 string into the implicitly zero-filled, most significant, fifth and sixth bit positions (thereby obtaining 110000-111111).

Alternatively, if a sixteen position bit-mask is used to indicate which of Relative egress ports Re0-Re15 is requested for outputting the subject payload, where the indication is a 'true' bit embedded in a field of zeroes (e.g., 000 . . . 1 . . . 000); then the translated, sixty-four position bit-mask for representing actual egress ports $aE_{00}$-$aE_{63}$ can be generated by left-shifting (with zero padding on the right) by 0, 16, 32 or 48 bit positions for respective slices #0, #1, #2 and #3.

In FIG. 2B we show a first line card unit, LCU-0 (also referenced as 202) having four interconnect lines, 203.1-203.4, respectively coupling to actual ingress ports $aI_0$, $aI_{16}$, $aI_{32}$ and $aI_{48}$ of PSSU 207. It should be understood, even though not shown, that a second line card unit, LCU-1 (not shown) may similarly have its OUTs coupled to actual ingress ports $aI_1$, $aI_{17}$, $aI_{33}$ and $aI_{49}$ of the same PSSU 207. And at the end of such a series, we could have a sixteenth line card unit, LCU-15 (not shown) similarly connected to have its OUTs coupled to actual ingress ports $aI_{15}$, $aI_{31}$, $aI_{47}$ and $aI_{63}$ of the same PSSU 207. However, from the internal view point of an LCU such as 202 it appears its respective interconnect lines 203.1-103.4 each connect to a respective R10 ingress port of respective virtual slices #0-#3.

Given that each of virtual slices #0-#3 has an exclusive set of actual ingress ports ($aI_x$) dedicated to it and an exclusive set of actual egress ports ($aE_x$) dedicated to it (see also FIG. 2C) then a fairly simple request translation algorithm may be implemented. If a given request 250$a$ arrives through a set of actual ingress ports (e.g., $aI_{48}$-$aI_{63}$) that have been exclusively allocated to a given virtual slice (e.g., slice #3), it may be determined from the identity of such actual ingress ports, that the request was meant to be directed to the corresponding virtual slice (e.g., slice #3). More specifically, if a given first request, 261$a$, arrives on actual ingress port $aI_{48}$ and the request internally indicates (261$a$O) it is asking for an egress from relative egress port Re1, it can be determined that the relative request, 261$a$ is directed to virtual slice #3 and that the request is unknowingly asking (not known to the request internally) for an egress 261$a$O from actual egress port aE49. Similarly, if another request, 261*f* is sent by LCU-15 (not shown) with the belief that the request is entering on relative ingress port Ri15, when in fact the request 261*f* arrives on actual ingress port a163, it can be also determined that the request is being directed for entry into slice #3 and, if by way of example, request, 261*f* is internally asking for an egress 261*f*O from relative egress port Re14, it can be determined by appropriate processing that this request 261*f* is unknowingly asking for an egress 261*f*O from actual egress port aE62.

The request translator 260 can therefore be programmed to use the exclusive allocations of specific, actual ingress ports (aI$_X$) to corresponding virtual slices to determine which virtual slice a given relative request (e.g., 250*a*) is being implicitly directed to. The request translator 260 can further use the specific exclusive allocations of actual egress ports (aE$_X$) to determine from the relative egress port identity Re$_X$ which actual egress port the corresponding payload (250*b*) is to exit from (e.g., 261*f*O). The translated request 264 can then be sent to the scheduling unit 270 for further processing. The scheduling unit 270 may arrange a time for, and/or a route by way of which the corresponding payload (250*b*) will egress (e.g., 261*f*O) from the actual egress port (or ports, if the request is a multicast one) which the translator 260 has defined as the one/ones to be used for the egress. Thus, although the requesting line card unit (202) thinks that its corresponding payload (250*b*) is egressing virtually (e.g., 261*f*O) from a specified relative egress port such as Re14 of a given virtual slice (#3), the actual egress 271 will be from an actual egress port (e.g., aE62) whose identity is defined at least partly by the request translator 260.

Figure 3B:
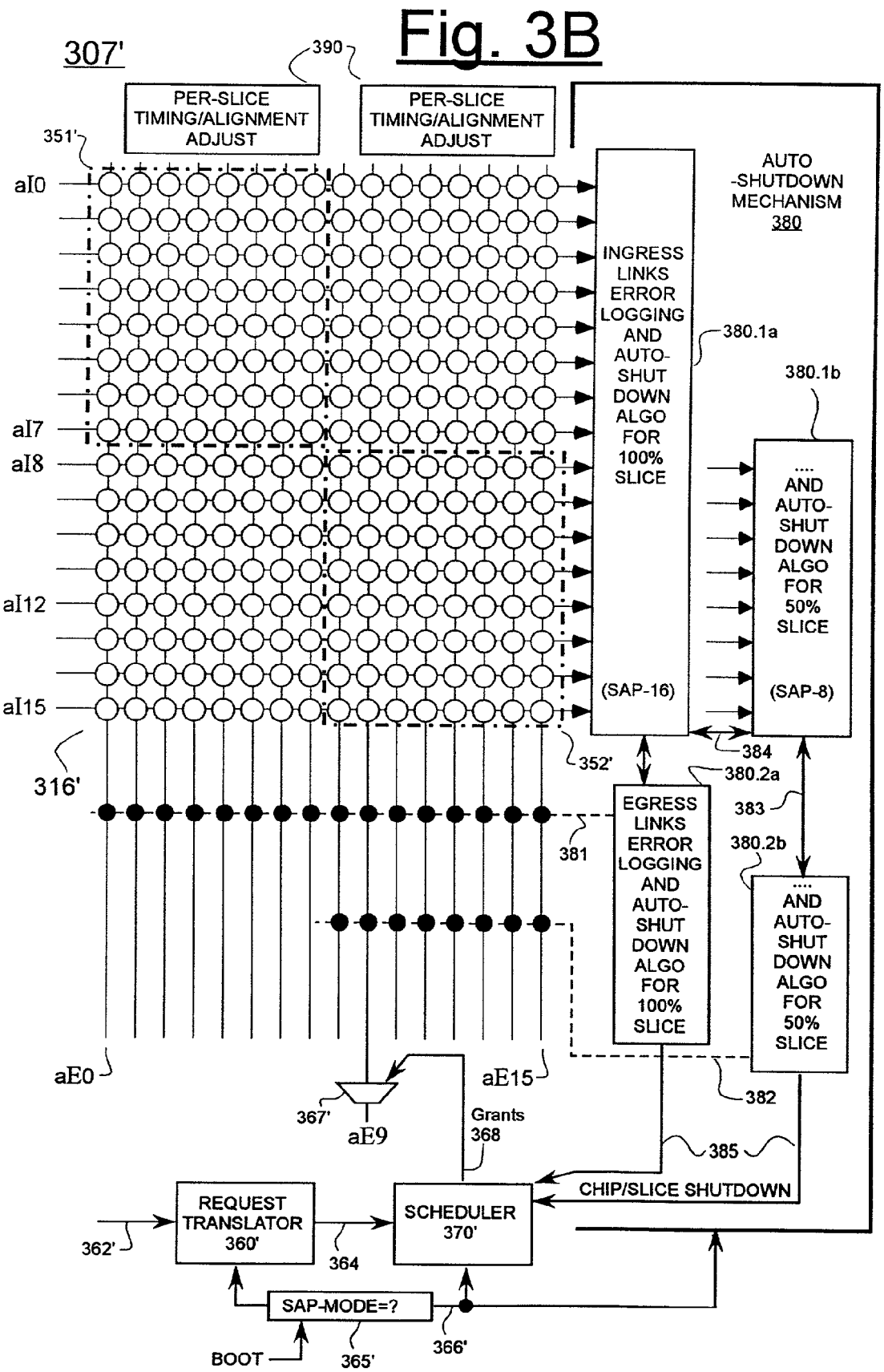
FIG. 3B is a block diagram showing how other per-slice mechanisms may be adjusted to match the dimensions of differently sized virtual slices.

The request translation operation which is carried out by unit 260 should be a function of the number of virtual slices created within the PSSU and of the allocation of specific actual ingress ports and actual egress ports to each of those virtual slices. A slicing-mode register 265 or another slices-defining means may be used to programmably or otherwise define the slicing pattern and the corresponding, specific translation which will be carried out by the request translator 260 as indicated by connection 266 in FIG. 2B. In some cases, it may be advisable to modify certain operations of the scheduler 270 in response to the defined slicing pattern, as indicated by the coupling of line 266 to unit 270. This will be further explained when FIGS. 3A-3B are detailed below. In some cases, it may be advisable to embed 273 certain request-based data 272 (which data 272, the request translator 260 may extract form the original request 262) into grant-related responses that are sent back from unit 270 and by way of path 271. As such an optional, data-adding or embedding means 273 is shown interposed in the path 271 between the arbitrating/scheduling unit 270 and the actual egress port (e.g., aE62). This will be further explained when FIGS. 3A, 7 are detailed below.

FIG. 2C shows a programmably-defined slicing mode (25% slices) corresponding to the four virtual slices shown in FIG. 2B. It is to be understood that the illustrated PSSU 207' can actually implement a full 64×64 crossbar (assuming, of course, all of its switch points and other necessary parts are operating properly). However, in the illustrated, virtually-sliced mode, the request translator 260' is operating such that only $^4/_{16}$th's of the full array of 64×64 switch points are activatable. These activatable switch points are shown as hollow circles. The non-activatable switch points that occupy the remaining $^{12}/_{16}$th's of the intersections in the 64×64 array are made invisible in FIG. 2C so that the activatable switch points can be easily seen.

The virtually-sliced mode of FIG. 2C is also referred to herein as a SAP-16 mode. The acronym, SAP indicates a specific, Scalable Aperture Partitioning mode. In the SAP-16 case of FIG. 2C, four 16×16 virtual slices are implemented as indicated by the illustrated activatable switch points. Note that the four 16×16 virtual switch slices lie along the diagonal of the 64×64 array and that each virtual switch slice has its own exclusive set of actual ingress ports (aI$_x$) and its own exclusive set of actual egress ports (aE$_x$). It is, of course, within the contemplation of the present disclosure to provide may other variations of virtual switch slices wherein each virtual switch slice meets the requirements of having its own exclusive set of actual ingress ports and exclusive set of actual egress ports. The virtual switch slices do not have to lie in corner-to-corner order along a diagonal of the actual switch-points array. The virtual switch slices do not have be all of same dimensions or each arranged as regular pattern as is shown in FIG. 2C. They also do not have to consume all of the ingress horizontal lines and/or all of the egress vertical lines of the N×N' array of lines available in the switch matrix. One could have a situation, for example, where there are two 16×16 virtual slices in the top left quadrant as shown in FIG. 2C, and then three 8×8 virtual slices next provided along the left-and downwardly sloping diagonal, and thereafter a rogue 6×6 virtual slice occupying the space that would have otherwise been occupied by the last 8×8 virtual slice (thereby leaving two unused horizontal lines and two unused vertical lines). FIG. 2E shows yet another alternate embodiment that includes examples of 8×8, 4×4 and 2×2 virtual slices as well as examples of non-square slices (a 10×5 slice and a 5×11 slice).

During (or prior to) system bootup and/or during system resetting, the SAP mode register 265' of FIG. 2C can be programmed to contain an indication of the SAP-16 mode that is to be implemented by PSSU 207'. The slicing-pattern information 266' represented by the contents of register 265' is conveyed to the request translator 260'. The slicing-pattern information 266' is optionally further conveyed to the scheduler 270' and/or to further, per-slice attribute mechanisms 276' of the PSSU 207' so that these mechanisms can adjust their operations to conform with the current slicing pattern. (These optional connections were introduced briefly in FIG. 2B. It will be seen later that scheduler 270' can include a fairness mechanism whose fairness depends on what current slicing pattern is being used and that PSSU 207' may have other mechanisms (e.g., automated slice shutdown) whose operations can vary depending on what current slicing pattern is being used.)

Relative egress designators in incoming requests 262' are translated by request translator 260' to thereby generate new egress designators 264' which identify the actual egress ports (aE0-aE63) from which corresponding payloads are to egress. Scheduler 270' then processes the translated requests 264' and, at an appropriate time, sends activating signals 271' to respective ones of the activatable switch points by way of a points activator unit 275' or by way of another equivalent means. The corresponding activatable switch points within each virtual switch slice are then activated, or not, to effect the desired unicast or multicast switching action that is to be carried out by each respective, virtual switch slice (e.g., #0-#3).

It is possible for a defectively-manufactured version of PSSU 207' to have one or more switch points that are stuck in the open circuit condition due to fabrication problems. If the stuck-open switch point happens to lie at one of the non-activateable intersections (of horizontal and vertical switch matrix lines), such a defect condition would have no impact on performance in the SAP-16 mode or in like symmetrical modes that use smaller subsets of the activatable areas shown in FIG. 2C. Accordingly, a defectively-manufactured version of PSSU 207' could be supplied to the 16×16 and lower market segments even if it is not useable in the 64×64 and/or 32×32 markets. This is another advantage of making programmably-sliceable switch fabric units. (Of course, customers would have to be warned that the partly-defective part is not useable in the higher market segments.) Even if the stuck-open switch point lies at an intersection that must be used by one of the smaller S×S' virtual slices, this making it impossible to use that S×S' virtual slice, all is not necessarily lost. The other virtual slices will still be available for use.

In looking at FIG. 2C, it may strike the casual observer that, in the SAP-16 mode (25% slices mode), there is a gross wastage of resources given that $^{12}/_{16}$th's of the illustrated intersections are illustrated as being nonactivateable (where these intersections are nonetheless generally occupied by otherwise activateable switch points—not shown—that can be used in SAP-64 mode). Such a casual observation is misleading. FIG. 1B should be revisited and a mental note should be made that the pre-switch processing resources 112/114 of each actual ingress port, $aI_x$ may still be fully utilized and/or that the post-switch processing resources 117/118 of each actual egress port $aE_x$ may still be used. Moreover, the scheduling resources of scheduling unit 170/270' are still being used for selectively activating appropriate ones of all the activatable switch points of FIG. 2C. So resources of the PSSU 207' are not being squandered to the extent that one may come to believe from a casual glance at FIG. 2C.

Also from FIG. 1B, it may be observed that the power, clock and/or control signal distribution resources of unit 180 may also be usefully employed to distribute respective power, clock and/or control signals across the PSSU (207) even in a case such as that of FIG. 2C where the virtual slices are dimensionally, each 25% or less of what could otherwise be implemented by the full N×N' switch matrix (116 of FIG. 1B). It may further be observed that the miniaturization of the switch matrix and other resources into packaging 110 is also being usefully employed when SAP-32 (e.g., FIG. 2D) or lower SAP modes (e.g., FIG. 2C) are programmably established. The post-manufacture testing and reliability values of SFU packaging 110 and/or of its internal components is also being usefully employed. Accordingly, even though FIG. 2C makes it appear that three quarters of the switching matrix is being wasted, that first-glance appearance is misleading.

FIG. 2C is better appreciated when viewed not only within the bigger-picture context of FIG. 1B, but also when viewed within the system-wide context (100) represented in FIG. 1A. In cases where item 110 of FIG. 1B is the packaging of an integrated circuit which is thereafter mounted onto a printed circuit board (e.g., one of the switch cards shown at 105 in FIG. 1A), a further level of advantages is realized. The system-wide reliability of solder or like connections to the pins or terminals 111/119 of the packaging 110 is improved in comparison to an alternate embodiment that uses a larger number of programmably-unsliceable, individual SFU's each of smaller dimensions and each separately soldered into the printed circuit board. Each of the individual IC-to-board connections made for the power rails, the clock rails and the test and control connections is a point of possible failure during manufacture or subsequent use. Each of the SAP-32 or smaller-sliced virtual slices in this soldered board example would have a fewer number of power, clock and/or test/control pins per slice than would a comparable SFU having an unsliceable packaging. So the per-slice reliability of a PSSU operating at 50% or lower slicing mode is better than that of a comparable set of 2 or more unsliceable SFU's.

Also from the system-wide context shown in FIG. 1A, it can be appreciated that there are per-slice costs attributable to each of the various illustrated activities; including: the designing (41) of SFU's, the manufacturing and testing (42) of SFU's; the logistical distribution of SFU's into respective, post-manufacture inventories (14-44); the logistical redistribution (58) of SFU's from respective, post-manufacture inventories to board and/or system producers (51-53); the learning curves for learning how to interface at hardware and/or software levels (55-56) with the SFU's; the logistics of responding to changing market demands (60) and restocking (61-62) inventories to accommodate such changing demands; and in-field maintenance of switching systems (100) in the respective 4×4 to N×N' market segments. The per slice costs attributable to programmable sliceable switch-fabric units (PSSU's) made in accordance with the present disclosure are advantageously smaller than the per slice costs attributable to comparable switch matrices found in unsliceable SFU's of conventional design.

The PSSU 207" shown in FIG. 2D is essentially the same as the PSSU 207' shown in FIG. 2C except that PSSU 207" has been programmed into the SAP-32 mode (50% slices). Thus, FIG. 2D shows two 32×32 virtual slices are being implemented. Each 32×32 virtual slice again has its own exclusive set of actual ingress ports and its own exclusive set of actual egress ports. In response to the SAP-mode register 265" being in the SAP-32 mode, the request translator 260" assigns all relative-egress requests that come in on actual ingress ports aI0-aI31 to switch slice #0 while those of the relative egress requests that come in on actual ingress ports aI32-aI63 are assigned to slice #1. It should now be understood that 12.5% regular slicing (SAP-8 mode), 6.25% regular slicing (SAP-4 mode), and 3.125% regular slicing (SAP-2 mode) may also be carried out by the PSSU 207 of FIG. 2B when the SAP-mode register 265 is appropriately programmed. PSSU 207 can, of course, also be used to implement a full 64×64 switch slice (SAP-64 mode), and in that case, the request translator 260 will be instructed to perform a one-to-one translation or it will be bypassed. In the above example we have shown that a same PSSU 207 may be ubiquitously used to service not only a full N×N' market segment corresponding to its internal, full switch matrix (116), but also that it can be programmed to serve market segments that call for switch slices of smaller S×S' dimensions. Engineers who learn the control and testing interfaces (285) of the PSSU 207 may utilize that learning experience for any of the market segments in the 2×2 through N×N' markets. This can provide significant cost advantages and shortened time to market.

For some scheduler designs, there may be certain fine points that should be adjusted when different virtual-slicing modes are used. FIG. 3A shows a simplified PSSU 307 having a 16×16 switch matrix (316). Its scheduler 370 includes a priority-based arbitration mechanism 374 whose operations may be impeded if compensating steps are not taken for slicing-modes that are below 100% full utilization of the switch matrix (316). More specifically, the illustrated scheduler 370 first uses an egress-layer arbitration followed by an ingress-layer arbitration. As a base step (STEP-0) in such an egress-first/ingress-last (EFIL) arbitration, all received requests (364) that will be competing for processing in a given time slot (tick) are initially marked as being "eligible". As a next step (STEP-1) in such an EFIL arbitration, for each usable egress line (vertical line in switch matrix 316) the scheduler 370 picks a currently best one of one or more, of the eligible requests that are still competing for the given time slot (tick) and for output of a respective payload by way of that egress line. The scheduler 370 marks that still-eligible and picked request as a "potentially grantable" request. Those of the requests that were competing for that one egress line (e.g., aE9) and same time slot (tick), but were not picked in STEP-1 continue to remain eligible because the "potentially grantable" request may turn out to be ineligible in a follow-up, STEP-2. In the follow-up second step (STEP-2) of the EFIL arbitration, for each usable ingress channel (horizontal line in switch matrix 316) the scheduler 370 picks from amongst the one or more "potentially grantable" requests that are each trying to have its respective payload enter by way of that ingress channel (e.g., aI$_7$) a best one and marks that picked request as an "actually grantable" request. (The actual grant is not effective until an actual grant signal or its equivalent is issued.) Those of the requests that were competing for that one ingress channel (e.g., aI$_7$) and same time slot (tick), but were not picked in STEP-2 are marked as being no-longer eligible (being ineligible) for continuing to compete for the given time slot. STEP-1 and STEP-2 are then repeated until there are no more eligible, and still-not made as "actually grantable" requests in the competition queue or until some other repetition-ending event occurs.

It is within the contemplation of the disclosure to have a reversed process, in other words, an ingress-first/egress-last (IFEL) arbitration wherein eligible requests first compete over a usable ingress channel and thereafter, "potentially grantable" requests compete over a usable egress line.

During STEP-1 of the EFIL arbitration process, it is possible for priority ties to occur between eligible requests that are still competing for the given time slot (tick) and for output of a respective payload by way of a given egress line, say, aE15. The scheduler 370 contains a tie-breaking mechanism (whose inclusion in 370 is represented by expansion lines 374) for handling tie situations. For each egress line (e.g., aE15) there is a corresponding eligibles-selecting mechanism (e.g., 375.15) which picks one of multiple, eligible requests (whose respective source payloads will come from respective ones of the horizontal ingress lines) as the "potentially grantable" request. If the "potentially grantable" request becomes a an "actually grantable" request in STEP-2 of the EFIL arbitration process, then a corresponding payload of that "potentially grantable" request should thereafter egress from the corresponding egress port (e.g., aE15) during a time slot that is scheduled by scheduler 370 (and indicated by scheduling signal 371).

Before going on, however, we note that it is possible for an alternate scheduler (370', not shown) to be based on the IFEL arbitration approach rather than on the egress-first/ingress-last (EFIL) arbitration approach. If such an IFEL-based, alternate scheduler is used, then for each ingress port (e.g., aI$_0$) there would be a corresponding, IFEL-based, eligibles-selecting mechanism (not shown, but corresponding to say, selector 375.15) which picks an eligible request for egress through one or more of the vertical egress lines as the "potentially grantable" request. Although not shown, it can be understood that the alternate eligibles-selecting mechanisms of such an alternate scheduler 370' would lie in FIG. 3A at right angles to the selectors 375.15-375.00 shown in the EFIL-based embodiment of that figure and that the alternate selectors would be respectively associated to different ones of the horizontal ingress lines instead of being associated (as indicated by 377.15-377.00) to different ones of the vertical egress lines. The next described, tie-breaking problem would be equally applicable to such an alternate, IFEL-based scheduler and the solutions would be similar. The illustrated, EFIL-based structure is shown because it is preferred for handling multicast switching operations. (Each of selectors 375.15-375.00 can associate each eligible request with a single and respective, ingress channel irrespective of whether the requested switching operation is unicast or multicast. In the alternate, IFEL-based approach, multiple egress lines may have to be associated with each multicast request, and this would make the arbitration algorithm more complicated.)

Let us now consider for the EFIL-based structure shown in FIG. 3A, the details of a tie break operation. Assume that multiple, eligible requests are contending for egress port aE15. Two or more of these contending requests may come in along ingress ports aI0 through aI15, where the requests ask, at about the same time, for an egress of their respective payloads through egress port aE15. Egress port aE15 can only handle one payload package at a time. A choice has to be made as to which of the contending requests will first be deemed as a "potentially grantable" request in STEP-1 and for egress port aE15 and which request will have to wait for a later time (or perhaps never get granted). Some sort of priorities will be assigned to the contending requests. Then, the eligibles-selector mechanism 375.15 (the one assigned to egress port aE15) will try to identify and select the highest priority request and to first deem that request as being the "potentially grantable" request in a corresponding running of STEP-1 for egress port aE15. If the "potentially grantable" request succeeds in STEP-2 in becoming an "actually grantable" request, then that success will be appropriately indicated by scheduling signal 371 for a corresponding time slot (tick). When the scheduled time slot (as assigned by signal 371) occurs, a switch-point activator such as 378.15x00 (which is assigned to aI$_0$) or 378.15x08 (which is assigned to aI$_8$) activates the corresponding switch-point or its equivalent to let the respective payload through for output by way of egress port aE15.

One often used, tie-breaker method is the round robin algorithm. Mechanism 376.15a represents a means for carrying out a round robin tie-breaking process for the eligible requests of all sixteen of ingress ports aI0-aI15. Mechanism 376.15a may operate, for example, by incrementing an internal, modulus-sixteen counter (not shown) each time a tie is encountered or alternatively with every arbitration tick. Mechanism 376.15a may then assign the tie-breaking win to the eligible request whose ingress port number is equal to the current count, and if no such request is present, then to the eligible request whose ingress port number is less than and closest to the current count (where the comparison is done with modulus-sixteen arithmetic). This is just an example. Many variations are possible for the tie-breaking algorithm 376.15a and these may be carried out with or without some predetermined weighting factors.

Suppose now that PSSU 307 is placed into a SAP-8 mode and egress port aE15 is thereby exclusively allocated to virtual slice 352. (Egress ports aE0-aE7 will be exclusively allocated to virtual slice 351 as indicated by the dash-dot box representing slice 351.) In such a case, request translator 360 will see to it that none of the requests originating from ingress ports aI0-aI7 will ask for egress through aE15 (or through aE8-aE14 as well). If the 100% round robin algorithm represented by 376.15a is used in such a less-than 100% slicing mode; eligible requests from ingress port aI15 will have an unfair advantage during tie-breaking situations.

They will be picked as having the ingress port number which is less than (modulus-sixteen) and closest to the round robin counter while the round robin counter (not shown) increments through counts 0-7. The tie-breaking algorithm will not work as was originally intended.

In accordance with the present disclosure, to avoid this unfairness problem; when a slicing mode less than 100% is selected, the tie-breaking algorithms are programmably modified to distribute tie-breaks only within their respective virtual slices. More specifically, if SAP-8 mode is selected in FIG. 3A, then round robin algorithm 376.15b is used for egress port aE15 instead of algorithm 376.15a. The round robin counter in algorithm 376.15b cycles only through the counts 8 to 15 or their equivalents instead of cycling from 0 through 15. This gives each of the eligible requests coming in on ingress ports aI8-aI15 a more fairly-distributed chance of winning tie-breaking situations. If 25% slicing is instead chosen (not shown) then the eligibles selector 375.15 of egress port aE15 should be further adjusted to distribute its tie-breaking choices among only eligible requests coming from ingress ports aI12-aI15, and so forth. If other tie breaking algorithms are used, they should be similarly adjusted in response to the programmably-selected slicing mode so as to provide the desired statistical distribution of wins to the ingress ports, aIx-aIy, that are competing within their respective virtual slice.

It should by now be apparent that the just-described eligibles selector 375.15 is dedicated to responding to requests which are requesting the transmission of corresponding payloads out through egress port aE15. Dashed lines at 377.15 indicate the logical connection between the alternate tie-breaking mechanisms 376.15a, 376.15b and corresponding egress port aE15. In similar vein, eligibles selector mechanism 375.14 is understood to service egress port aE14 and to have a tie-breaking mechanism that is similarly adjusted in response to the slicing mode indicated by mode-designating signal 366. Dashed line 377.14 represents the logical connection between aE14 and mechanism 375.14. The sequence of eligibles-selecting mechanisms 374 is understood to continue through to unit 375.00 which, per dashed logical line 377.00, is understood to service egress port aE0 in similar and corresponding fashion. One item of minor note for the particular PSSU 307 illustrated in FIG. 3A: the relative egress identification ($Re_x$) of each raw request 362 is preserved in a storage means such as 363a and, if that request is granted, the preserved raw request is returned by way of a path such as 363b and a multiplexer such as 367 to the egress port (e.g., aE9) of the LCU that made the request. (Connection 363c carries a signal indicating which of the raw requests preserved in storage 363a is to be returned with a corresponding grant signal.) This return of the preserved $Re_x$ signal can serve as part of a request and grant mechanism as shall be further detailed below. It is an example of another minor accommodation that may be made to compensate for the fact that translator 360 is sending a translating egress identification 364 to scheduler 360 instead of the original egress identification found in the original request signal 362.

Aside from tie-breaking, there may be other functions within a PSSU that operate on a per-slice basis and for which adjustments should be made in response to changed slicing patterns. FIG. 3B shows aspects of a PSSU 307' where the latter device can be the same one or different from the PSSU 307 of FIG. 3A. Like reference numbers will be used where practical for alike features of PSSU 307'.

Referring to FIG. 3B, when requests and/or payloads and/or other signals travel over the line-to-fabric interconnect (e.g., 103 of FIG. 1A), they may experience small, but still non-zero error rates. Such error rates can fluctuate due to environmental changes and/or due to changes in the health of the specific interconnect link (e.g., 103a of FIG. 1B) through which the respective signals travel. Error rates may increase undesirably for short or long term durations because of a wide range of possible factors, including but not limited to: changes in temperature at various locations, crosstalk with newly-activated and adjacent links, chemical corrosion of signal-carrying media, and/or because of other time-variant or environment-dependant factors. When a short-term degradation to link health occurs (one that lasts, say no more than about a millisecond) it is desirable to have system hardware and/or firmware quickly handle the problem rather than waiting for a slower, software-driven handler to cope with the problem. Of course, if a link breaks open for the long term due to a broken wire or the like, then system software should be activated to reconfigure the system and route traffic on a long-term basis around the defective link. On the other hand, when the health of an ingress link degrades just temporarily, it may be advisable to use a relatively-quick, hardware and/or firmware fix to reduce the likelihood that vital payload data will be corrupted in the next millisecond or less by passing-through a temporarily degraded link. Such a hardware and/or firmware fix may operate by: (a) disabling the corresponding, horizontal ingress channel (e.g., $aI_0$) associated with the temporarily degraded, ingress link; (b) disabling the corresponding switch slice (e.g., 351'); or (c) flagging system software to initiate a disabling and/or shutting down of the entire PSSU 307'. A goal that may be sought in electing to shut down an entire PSSU 307' could be that of reducing power consumption and/or eliminating the generation of spurious signals across the line-to-fabric interconnect (103). A goal that may be sought in instead electing to temporarily disable a corresponding switch slice (e.g., 351') could be that of being able to quickly, re-enable the corresponding switch slice and thereby bring its bandwidth capabilities back online quickly.

As seen in FIG. 3B, an automatic-shutdown mechanism 380 may be included within PSSU 307' for keeping track of short-term and/or long-term link errors and for deciding when, and what appropriate remedial action is to be taken when error rates exceed predefined thresholds. The remedial actions can include disabling a particular switch slice (e.g. 352') by instructing the scheduler 370' to ignore (e.g., consider as invalid) all requests coming from that switch slice or other actions. Because within a PSSU there can be variations to the size and locus of a given switch slice, and because the per-slice, error tracking parts of automatic-shutdown mechanism 380 may need to change in response to such variations, the slicing pattern information 366' stored in register 365 should be transmitted to the auto-shutdown mechanism 380 so that mechanism 380 can adjust for different slicing patterns.

More specifically, it is seen from FIG. 3B that, when a 100% slice pattern is used (SAP-16 for this 16×16 example), a corresponding algorithm 380.1a may be in effect for collecting ingress-links error-data from all of horizontal ingress channels, $aI_0$-$aI_{15}$ of the PSSU and for making automated shutdown decisions based upon the error information logged from all of these horizontal ingress channels. On the other hand, if a 50% slicing pattern is in effect (SAP-8 in this example), a slice-specific algorithm such as 380.1b may be additionally or alternatively in effect for collecting and analyzing error information obtained from only the horizontal ingress channels of slice 352'. It is understood that another, like logging mechanism (not shown) might be collecting and analyzing error rate information only for the horizontal ingress channels of virtual switch slice 351'. If 25% slicing, or smaller values of slicing are utilized, then, of course, correspondingly organized, ingress-link error logging, analyzing, and automatic shutdown algorithms may be alternatively or additionally be put into effect within PSSU 307' in accordance with the slice patterning information provided by signal 366'. Various ones of the error-logging and analyzing algorithms may communicate with each other, as indicated by connection 384, for facilitating the automated making of a decision to shut down an ingress channel, a slice, or the entire PSSU 307'.

Unlike the case for the ingress-direction interconnect links, the handling of link-health monitoring and remediation for egress-direction links (103b in FIG. 1B) is slightly different. First, the PSSU 307' is not receiving data directly from its own egress links (e.g., $aE_0$-$aE_{15}$). Therefore, the egress-dedicated portions 380.2a, 380.2b, etc. (if any), of its links-error logging and auto-shutdown mechanism 380 may have to rely upon indirect evidence of link degradation and/or reverse-channel notification (e.g., a downstream ZINC unit informs an upstream ZEST unit by way of embedded control signals that data flowing downstream appears to be corrupted). This is to be contrasted with the use of direct evidence to come to an automated decision about ingress-direction link health. An example of indirect evidence of link degradation in the egress-direction is a possible detection of more grants (368) going out on $aE_9$ than matching, payloads coming in on corresponding ingress line $aI_9$. This might indicate that egressing grants are being dropped. A second difference between responding to egress-direction link degradation as opposed to ingress-direction link degradation has to do with remedial options available for the former. If the health of a given egress link degrades below a predefined threshold, it may be acceptable, but it is usually not sufficient to disable only that vertical egress line. Either the corresponding switch slice (e.g., 352') or the entire PSSU 307' may have to be disabled or shut down in response. (The reason for this may be that some, specialized scheduling operations (e.g., static TDM schedulings) do not wait for dynamic request and grant turnarounds. So traffic might not be diverted to other parts of the switch fabric due to lack of grants for such specialized scheduling operations. Switch slice shutdown might be the only way to quickly block the traffic flow of such specialized scheduling operations from passing through a switch slice that connects to a degraded, egress link.)

It is seen in FIG. 3B that egress monitoring and remediation mechanisms 380.2a and 380.2b are structured in accordance with the corresponding pattern of the specific slices they are monitoring. Dashed line 381 indicates that monitoring/remediation mechanism 380.2a is monitoring the health of all of egress lines $aE_0$-$aE_{15}$. On the other hand, dashed line 382 indicates that monitoring mechanism 380.2b is monitoring the health of only $aE_7$-$aE_{15}$. Control signals 385 that are sent to scheduler 370' for causing the disabling or shutdown of a given slice or the entire PSSU 307' may be formulated on the basis of monitoring activities and decisions carried out by any or all of monitoring mechanisms such as 380.1a-380.2b and so forth. PSSU shutdown may or may not include power conservation and line-quieting methods. Details of these are not important. The point being made here is that such automated, analysis and shutdown mechanism may benefit from being made responsive to the slicing pattern information carried by signal 366'.

PSSU 307' may include yet further mechanisms that operate on a per-slice basis. Shown at 390 are two timing/alignment adjustment mechanisms. It is understood that the one on the left corresponds to switch slice 351' while the one on the right corresponds to switch slice 352'. Various aspects to the timing and/or alignment of grants and payloads may be programmably adjustable. Details regarding these are not relevant here. The point being made here is that a variety of pre-switching and post-switching operations may be programmably adjustable on a per-slice basis. If such programmable adjustment is available, then the corresponding adjusting mechanisms (e.g., 390, 380) may benefit from being made responsive to the slicing pattern information carried by signal 366' so that the respective, programmable adjustments can be made in accordance with the locus and numbers of switch points associated with each virtual slice. It will be seen below, in FIGS. 8B-8C, that the switch points associated with each virtual slice may be distributed in a wide variety of ways other than as just as square or rectangular patterns.

Figure 3C:
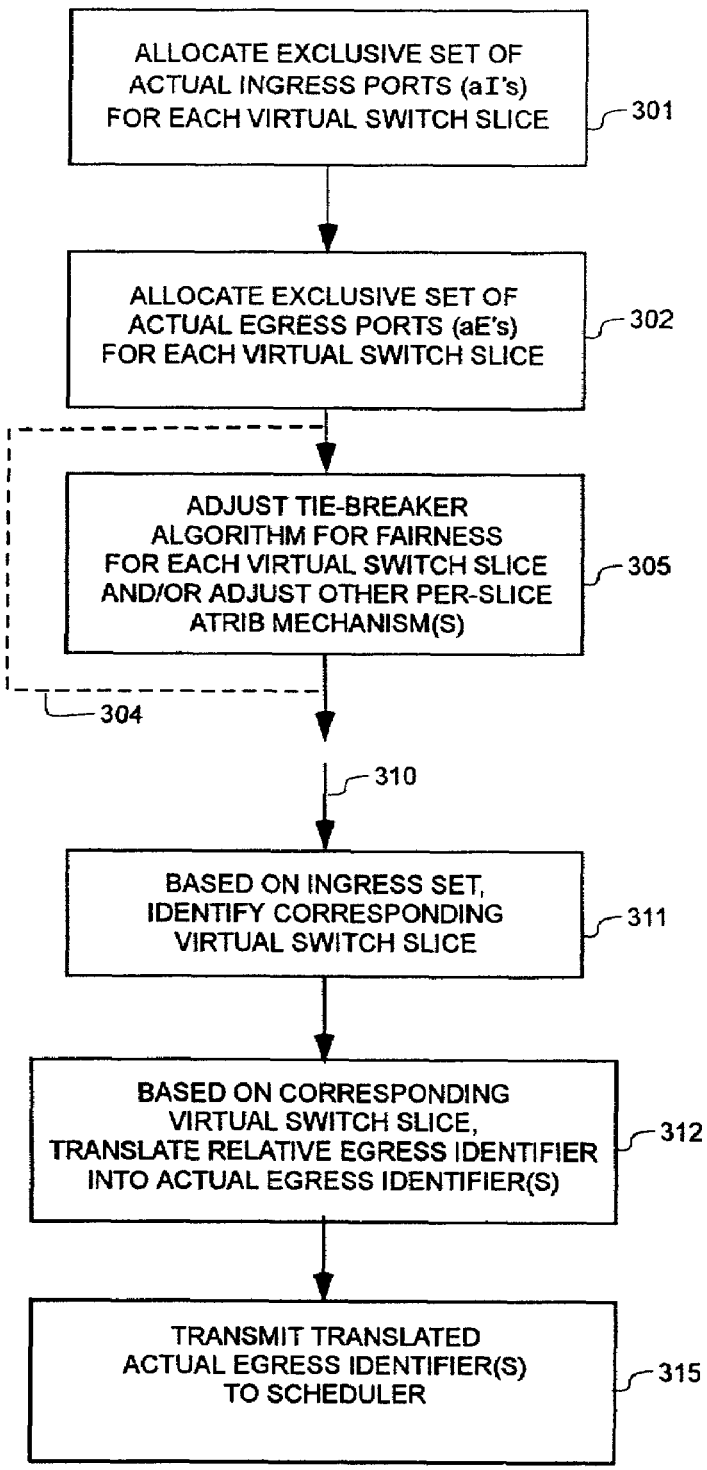
FIG. 3C is a first flow chart showing how to implement virtual slicing in accordance with the disclosure.

FIG. 3C is a flowchart of a programmable slicing method 300 that may be practiced in accordance with the present disclosure. At step 301, respective and exclusive first sets of actual ingress ports (aI's) are allocated for respective ones of the virtual switch slices that are to be programmably implemented within an integrated unit (a PSSU). At step 302, respective and exclusive second sets of actual egress ports (aE's) are allocated for respective ones of the virtual switch slices that are to be programmably implemented within an integrated unit (a PSSU). Steps 301 and 302 may, of course, be merged into a single step for defining each respective virtual switch slice. It will become clearer when we get to FIGS. 8B-8C that the allocation process is primarily realized by the way that the PSSU's ingress and egress terminals are wired to the LCU's and/or to other external circuits.

At optional step 305, if it is not bypassed by path 304, tie-breaker algorithms associated with respective virtual switch slices and/or other per-slice attribute mechanisms is/are adjusted to respectively provide predefined tie-breaking statistics (e.g., a uniform, fair distribution for all involved requests) and/or to provide other attributes for their respective virtual switch slices.

Following step 304 or 305, at step 310 a switching request is received through a given one of the first sets of exclusively-allocated, actual ingress ports, where the received request includes an identification of one or more relative egress ports ($Re_x$'s) through which a corresponding payload is to be output. At step 311, the corresponding virtual slice for the received request is identified based on the identity of the actual ingress port set which the request arrived through. At step 312, the identity of the virtual switch slice identified at step 311 is used to translate the relative egress identifier ($Re_x$) in the received request into one or more actual egress identifiers ($aE_x$'s). At step 315, the translated actual egress identifier or identifiers that had been generated at step 312 are transmitted to the contention arbitrating and/or scheduling unit (e.g., 170 of FIG. 2B or 370 of FIG. 3A) of the PSSU for further processing. Ancillary steps such as the above-described return (363a-b, 367) of the relative egress identifier to the requesting LCU may, of course, be intertwined with the illustrated steps of method 300.

Referring to FIG. 4, an example of a specific system 400 is schematically shown, where the illustrated system 400 may be adapted to include virtual slicing in accordance with the present disclosure. System 400 may include a hierarchy of circuit-containing and/or circuit-supporting means such as: (1) mother boards or backplane boards (not shown); (2) daughter printed circuit boards (PCB's) which may removably plug into the mother boards or into other board receiving means; and/or (3) monolithic integrated circuits (IC's) which may be mounted on either or both of the mother and daughter PCB's. The illustrated PCB's may include so-called, line cards 410, 420, etc. and so-called, switch cards 460, 470, etc. The line cards 410, 420, etc. may connect to out-of-system communications lines 411, 421, . . . , 4N1. The switch cards 460, 470, etc. may support a plurality of switch-matrices 455 and/or other cell-processing units.

The hierarchy of circuit-containing and/or circuit-supporting means can additionally or alternatively include: main frames or shelves (e.g., 402, 406, etc.) which may respectively house one or more of the boards 410-470 as well as power supplies, cooling units, and other ancillary support systems. The specific number of boards and/or shelves used is not important here and neither are the specific numbers of chips (IC's) that are provided in each such circuit containing and/or supporting means. What is relevant, as will shortly become clearer, is that so-called, line-interface units 419, 429, . . . , 4N9 (embodiments of which are also referred to herein as ZINC chips) and so-called switch-matrix units 451, 452, . . . , 45*m* (embodiments of which are also referred to herein as ZEST chips) interact such that the ZINC and ZEST chips may be physically distributed—within bounds of engineering reason—across a plurality of spaced-apart ones of the circuit-containing/supporting means.

The out-of-system traffic lines 411, 421, . . . , 4N1 may be designed to carry high-rate ATM or TDM or IP traffic (Asynchronous Transfer Mode; Time Domain Multiplexing mode; and Internet Protocol respectively), where each traffic line is operating at a high rate such as OC-1 through OC-192 or higher or lower. Respective and incoming packets of a first ATM line or of another such traffic line may need to be switched from that traffic sourcing line (ingress traffic line, e.g., 411) to a dynamically-assigned one or more destination lines (egress traffic lines, e.g. 4N1). It is the job of system 400 to timely route cells (which cells are referred to below as ZCells) that carry the switched traffic within payload sections of the routed cells.

In terms of a broad functional overview, system 400 may be seen as comprising three basic layers: (a) a line-interfacing layer 401 having line-interfacing units, (b) a payload-processing fabric layer 405 (also referred to as in one embodiment as a switch fabric layer 405) having payload-processing units, and (c) a line-to-fabric interconnect layer 403 for allowing the line-interfacing units to distributively use the payload-processing units for processing of their respective payloads. Various parts of the line-to-fabric interconnect layer 403 may use specialized protocols to compensate for respectively different and/or variable latencies associated with interconnect lines (due to different fiber lengths, changing temperatures and/or other factors). Payload traffic can flow from a payload source (e.g., 415) in first layer 401, through the interconnect layer 403, through one or a distributed plurality of intermediate processing units (e.g., 455) in fabric layer 405, and then back through the interconnect layer 403, and to one or a distributed plurality of destinations (e.g., 416) in layer 401. The line-to-fabric interconnect layer 403 acts as the conduit for the traffic moving distributively from layer 401 to fabric layer 405, and then back again to layer 401.

Resources within the switch fabric layer 405 may be dynamically allocated based on resource availability and priority of requests for usage of such resources. Thus, in FIG. 4 we see that line-card generated REQUESTS for use of the fabric resources may travel from layer 401 to one or more parts of layer 405 by way of ingress-directed interconnect lines such as line 431*a*. (In one embodiment, the request density of ingress traffic moving on lines such as 431*a* may be characterized as zero, one, or more requests per transmitted cell {this being indicated as 'Requests≧0/ZCell'}.) Fabric-generated GRANTS for use of the requested fabric resources may travel from layer 405 to layer 401 by way of egress-directed interconnect lines such as line 432*a*. Dashed ingress line 431*b* and egress line 432*b* are typically the same lines as those respectively represented by solid lines 431*a* and 432*a*. They are shown separately so that their associated stimulus and response sequences can be more easily seen (that is: request, grant, sourced data, and processed data; in that order).

After layer 401 receives a GRANT, it may send a corresponding, ingress payload (sourced payload) as indicated by dashed line 431*b* to layer 405. After receipt of the sourced payload 431*b*, layer 405 may process the payload in subsection 455, and then transmit the processed payload (destination payload) as indicated by dashed line 432*b* to layer 401. Various parts of line-interfacing layer 401 and fabric layer 405 may be independently clocked. Note the potentially-independent clocks: 417, 427, 4N7 illustrated in layer 401 and clocks 457, 467, 477 illustrated in layer 403. Clock recovery and data framing process may have to be carried in view of potential differences between the various clocks.

The line-interfacing layer 401 (also referred to herein as the traffic ingress/egress layer 401) may comprise a plurality of N line cards (either virtually or physically) and, as introduced above, these line cards may be respectively denoted as 410, 420, . . . , 4N0. The integer, N can be a fairly large number such as 32 or 64 or larger. On the other hand, for certain market segments, it may be desirable to make N smaller, such as 16, 8 or less. Each of the virtual or physical line card units 410-4N0 may be associated with a respective, line-interfacing unit (e.g., ZINC chip), 419-4N9.

The switch fabric layer 405 may have a plurality of m switching units (separated either virtually or physically) and in similar vein these may be respectively denoted as 451, 452, . . . , 45*m*. Integer value, m can be selected from a range of numbers such as 2 through 16 inclusively, or higher. Each of switching units 451-45*m* may be associated with a respective, virtual or physical, switch card unit such as the illustrated physical cards 460 and 470.

The line-to-fabric interconnect layer 403 may be merely a parallel-wired backplane for coupling the flow of traffic signals back and forth between layers 401 and 405. In a more typical configuration however, the line-to-fabric interconnect layer 403 may comprise a plurality of high-speed electrical or optical transmission lines for carrying heavily-serialized, data signals between layers 401 and 405. The carried data is deserialized to one extent or another as it travels out of interconnect layer 403 and into one of layers 401 and 405. In such an arrangement, conversion means are provided for converting between a more heavily-serialized optical or electrical transmission scheme used at the core of line-to-fabric interconnect layer 403 and less-serialized electrical or optical transmission and processing schemes used in core portions of layers 401 and 405. FIG. 4 shows as a first example of such a conversion means, a SERDES device 404 (SERializing and DESerializing unit) provided at a boundary between the line-to-fabric interconnect layer 403 and layer 401. The SERDES device 404 can be integrated partially or fully into the illustrated ZINC chip 419. And likewise, at the fabric layer side (405), counterpart SERDES devices (414) can be integrated partially or fully into the ZEST chips to thereby define, pre-switch and/or post-switch processing resources of the ZEST chips. In one embodiment, SERDES devices such as 404 and 414 are provided as one or more separate monolithic IC's that are adapted for handling the relatively high switching rates of the more-heavily serialized side of the transmission traffic. In a specific set of embodiments, the SERDES device(s) 404, 414 are used for converting between a more heavily-serialized, 10 serial bits per character (10 bpc) transmission technique used at the core of interface layer 403 and a more-parallel and differently encoded, 8 parallel bits per character (8 bpc), signal transmission and processing scheme used in core regions of line-interfacing layer 401 and of switch fabric layer 405. The use of the high-speed serialized optical and/or electrical communications within layer 403 allows for convenient, long-distance inter-card communications (e.g., at least across about 100 meters or less, if not over a few thousand meters) and for reduction of numbers of electrical wires or optical fibers between the cards so that, if desired, various ones of the line and switch cards can be conveniently located in different housings such as shelves 402 and 406, where these various support means may be independently powered, cooled and/or otherwise supported. If switch units/cards are distributed across two or more such independently supported shelves or other circuit support means; and one of the shelves (or other circuit support means) becomes inoperative (either intentionally because of routine maintenance or unexpectedly because of loss of a power supply, loss of cooling, etc.) then the switch units/cards in the still-operative other ones of the circuit support means can continue to provide service and the system 400 can continue to remain functional. Thus overall system reliability is enhanced.

Additionally or alternatively, the use of the higher level of serialization in layer 403 allows the line-interfacing units 419, 429, . . . , 4N9 and/or the switching units 451, 452, . . . 45m to be conveniently located in one or more different shelves, or spaced-far-apart PCB's, or other forms of spaced-far-apart ($\geq 0.5$ meter) circuit-supporting/containing means, where the latter supporting/containing means may be removably connected for convenient swapping as may be desired for maintaining the system 400 in continuous operation.

If part or all of the serialization and de-serialization functions of the SERDES devices 404, 414 or of other transmission conversion means are monolithically integrated into respective ones of the ZINC and ZEST chips as implied in FIG. 4, then the corresponding ZINC and ZEST chips should use an appropriate high speed transistor or like technology for supporting the high frequency switching rates of the highly-serialized data streams. Code conversions such as between the 8 bpc/10 bpc or like coding domains may be carried out externally to the ZINC and ZEST chips even though one set of embodiments disclosed here has the code conversions being carried out in a monolithically integrated fashion within the ZINC chips (e.g., 419) and the ZEST chips (451). These variations concerning where the serialization and de-serialization functions should be carried out, and/or where the respective 8 bpc/10 bpc or like code conversions should be carried out, are within the scope of the present disclosure.

Referring to so-called ZCells shown at 447 and 448, these ingress-directed and egress-directed signals (respectively) may be considered as payload-and/or-control carrying vehicles that move back and forth between the traffic lines-interfacing layer 401 and the fabric layer 405 by traveling through the line-to-fabric interconnect layer 403. The ingress-directed and egress-directed payloads of each given line card, 410-4N0 may be carried within a respective payload or 'PDU' section of the ZCells moving in the respective ingress-directed and egress-directed streams, such as 433 and 434 respectively.

Each ZCell may include an Error Checking and Correction (ECC) field which is designed for correcting transient errors that may occur as data of the ZCell (447, 448) moves through heavily-serialized parts of the line-to-fabric interconnect layer 403. In one embodiment, the ECC field is structured to support DC-balanced and/or cell-framing and/or clock-recovering, asynchronous serial traffic flow through the line-to-fabric interconnect layer 403. Because the highly-serialized, high-frequency optical and/or electrical transmission and conversion components in the line-to-fabric interconnect layer 403 tend to be susceptible to transient noise, and the bit rate tends to be high, there is a fair likelihood of experiencing an erroneous flip of a bit fairly often, but much less often than once per ZCell. The ECC field should be specifically designed for at least correcting such serial-link induced, one-bit transient errors. The ECC field may also be designed to function cooperatively in the clock-reconstructing, serialized domain (e.g., 10 bpc domain) found at the core of the interface layer 403. A detailed description of such an ECC field may be found in the above-cited, U.S. application Ser. No. 09/846,875 filed May 1, 2001 by Matthew D. Ornes, et al. which was originally entitled, METHOD AND SYSTEM FOR ERROR CORRECTION OVER SERIAL LINK. ZEST-integrated element 44m can represent pre-switch processing and post-switch processing resources that is replicate-ably integrated into each ZEST chip (451, 452, . . . 45m) for carrying out clock recovery and/or the ECC function and/or code conversion as may be appropriate. ZINC-integrated element 4N4 can represent a counterpart means that is replicate-ably integrated into each ZINC chip (419, 429, . . . , 4N9) for carrying out clock recovery and/or the ECC function and/or code conversion as may be appropriate.

Each ZCell 340 may further include either a Switch Request field (REQ) or a Grant field (which Grant field contains an identification of the egress path or paths that were originally specified in a corresponding request (REQ). The REQ field may be used for requesting a processing time slot for a given resource (e.g., a slice cross-tee) within a given switching chip (a ZEST chip). Indications may be included within the egress-directed (438,448), Grant fields for identifying future time slots in which the requested carrying out of switching and/or other cell processing of ingress-directed payloads (437,447), where those future time slots are measured within the timing reference frames of the respective switch fabric units (e.g., ZEST chips) that gave the grant.

From the broad overview provided by FIG. 4, it may be seen that each line-interfacing unit, such as ZINC chip 419, may be associated with a corresponding bidirectional traffic line 411. Line-interfacing units/chips 429-4N9 may be similarly associated with respective traffic lines 421-4N1. If the bidirectional traffic line 411 is optical, then appropriate optical/electrical converting transducers and serializing and de-serializing buffer (SERDES) circuits (not shown) may be provided between the external traffic line 411 and its corresponding line card 410 and/or ZINC chip 419 for interfacing with the primarily electrical and more parallel circuitry of the line-interfacing chip. ZINC chip 419 may include a local ingress queue 415 for storing ingressing traffic cells or packets and a local egress queue 416 for storing egressing traffic cells or packets. Each ZINC chip (e.g., 429, . . . , 4N9) may have a different traffic protocol associated with it (e.g., TDM or IP or ATM).

Each ZINC chip (419, 429, 439, . . . , 4N9) typically has a plurality of m ZCell egress ports and a same number, m, of ZCell ingress ports. Each ZCell port may be 5 parallel bits wide (optionally with DDR—Dual Data Rate clocking) or 10 parallel bits wide, or it may be more-serialized as appropriate. Typically, serialization down to a 1 bit wide ingress or egress stream occurs at the boundary where the line-to-fabric interconnect layer 403 meshes with the ZINC chips. Respective ones of the first through mth egress/ingress ports on a given ZINC chip (e.g., 419) should each couple by way of interconnect layer 403 to a respective one of m switch slices. The m switch slices may be constituted by respective ones of ZEST chips 151-15m if no programmable-slicing below 100% is being employed. On the other hand, if each of ZEST chips 151, 152, etc. is a PSSU in accordance with the disclosure, the total number of virtual slices can be programmably made greater than the number of in-system ZEST chips 151, 152, etc. In other words, the number of in-system ZEST chips 151, 152, etc. can be less than the number of active switch slices if programmable-slicing below 100% is being employed (e.g., 50% slices as in FIG. 2D, 25% slices as in FIG. 2C, or otherwise). As already explained, each ZINC chip (ZCell-based INterface Connecting chip) should connect both ingress-wise and egress-wise, to a respective set of virtual switch slices or switch matrices. Each ZEST chip (ZCell-based Enhanced Switch Technology chip) may implement one or more switch slices. In a variation, some line-interfacing chips (ZINC's) may be hardwired to a fewer number of switch slices (implemented within corresponding ZEST chips) than are others of the ZINC chips.

If programmable slicing below 100% is not taking place, then each ZEST chip (e.g., SFU IC 451) should be organized to have a plurality of N, ZCell ingress ports and a plurality of N, ZCell egress ports, respectively coupled to the N ZINC chips so that each such ZEST port corresponds to a respective one of ZINC chips (line-interfacing IC's) 419 through 4N9. On the other hand, if programmable slicing below 100% is taking place, then the ratio between the number of ingress ports per ZEST chip (a PSSU) versus the number of line-interfacing ZINC chips can be other than 1:1. As with the ZINC chips, each ZEST port (ingress and egress) may be 5 parallel wires wide (optionally with DDR) or 10 parallel bits wide or it may be more-serialized as appropriate. Typically, serialization down to a 1 bit wide ingress or egress stream occurs at the boundary where the line-to-fabric interconnect layer 403 meshes with the ZEST chips.

A given ZINC chip such as 419 may try to selectively distribute parts of the data in its ingress queue (415) for approximately simultaneous processing by (e.g., switching through) all slices of all m of the ZEST chips 451 45m. If successful, such a distribution of payload processing work should provide that given ZINC chip (419) with a relatively maximal throughput of its ingress-direction payloads (which payloads are carried in the ZCells 447 the ZINC sends out) through the fabric layer 405. Alternatively, a given ZINC (e.g., 419) may request less-distributed processing (e.g., switched routing) of its ingress queue data through only one of its ingress-direction ports to just one virtual slice of just one of the ZEST units, say a slice inside unit 452. This would give the ZINC a relatively minimal throughput of payload processing through the payload-processing fabric layer 405. The reasons for this may be appreciated by quick reference back to FIG. 2A. The ability to programmably select the number of virtual slices that will be implemented by each ZEST chip (451-45m) and the ability to programmably select the number of virtual slices that each ZINC port will be trying to distribute its ingress-direction payloads (435) to, allows system designers to pick and choose among a wide variety of design options and to more easily find cost-effective switching solutions forgiven environments.

In one particular embodiment, a link-rate disparity is solved by periodically inserting, so-called 'idle bites' (a bite is a ten bit character) into the ZEST-to-ZINC interconnect traffic 448. The reason for this is not relevant here. What is relevant is that the per-port, idle-bite insertion mechanism constitutes another example of a post-switch processing resource that is not wasted when programmable slicing is carried out in accordance with the present disclosure. In one particular embodiment, each idle bite is coded as the K28.0 character. Two synchronization bites are inserted between each pair of ZCells for framing purposes as shown at 447 and 448. The two synchronization bites may be respectively coded as either one or both of the K28.5 and K28.1 characters in accordance with the above-cited, Fibre Channel Physical and Signaling Interface industry standard. The uses of such coding are not relevant here. What is relevant however is that the per-port, sync-bite framing and sync-bite insertion mechanisms of the ZEST chips constitute further examples respectively of pre-switch and post-switch processing resources that are not wasted when programmable slicing is carried out in accordance with the present disclosure.

Referring to FIG. 5, there is shown a block diagram of a ZEST unit 501 which could be provided in a monolithic integrated circuit chip and which is structured in accordance with the disclosure. The illustrated ZEST chip 501 includes a request translator 702 which can be used to translate relative egress addresses (Re's of respective virtual slices) into physical or absolute egress addresses (aE's of the physical ZEST chip) in order to carry out programmable slicing. The translator 702 is part of a Request Label Control (RLC) unit 700 provided within the illustrated ZEST chip. After a given ZCell (e.g., 547) is received by a ZCells Ingress Processor 500 and through a given absolute Ingress port (e.g., $I_0$, $I_1$, $I_2$, $I_3$, etc.) of the ZEST chip, it is stored in a receive queue 500a. A multiplexer 500b or another equivalent means is used to pick out request-carrying portions of the ZCell (see REQ at 447 of FIG. 4) according to respective source ports (e.g., by a rotating source port selection signal 500c.) A raw request-label field 557 in each selected, request-carrying portion (REQ) is directed from the ZCell Input receiver 500 to the RLC unit 700. The RLC translator 702 then translates the selected raw (original) request-label field 557 to produce therefrom a translated request-label 558 whose contents represent one or more physical egress port identifications. The type of translation carried out by translator 702 can vary depending on what partitioning (slicing) of the switch matrix 502 is specified in a SAP mode register 704 and on whether the raw (original) request 557 is one that requests a unicast routing operation or a multicast routing operation.

The translated request-label field 558 is submitted to a scheduler 504 of the ZEST chip. Parts of each selected, original or raw request signal (including the raw (original) request-label field 557) may also be submitted to the scheduler 504 by way of path 558. (The forwarded original request parts may be used in a grant-generating operation as will be briefly described below.) Identifying information 559 about the virtual slicing mode may also be submitted to the scheduler 504 for reasons such as those described in connection with FIGS. 3A-3B. Specifics about particular scheduling algorithms that may be carried out in scheduler 504 are not relevant here. What is relevant is that the scheduler 504 is instructed by the translated request 558 to schedule an egress of a corresponding payload (PDU) out through the absolute egress port (e.g., $E_0$, $E_1$, $E_2$, $E_3$, etc.) of the ZEST chip even though the original, raw request 557 may have specified the requested egress in terms of a logical or relative egress port identification ($Re_x$) for a given, virtual slice. In response to the translated request 558, the scheduler 504 sends route-defining control signals 505 to the illustrated switch matrix 502. These control signals 505 typically define the route or routes that a corresponding payload will take through the switch matrix 502 during a future time slot that is being scheduled for by the scheduler 504.

It has already been explained that many raw requests can vie with one another by asking for simultaneous egress of their corresponding payloads through a same relative or absolute egress port. The scheduler 504 arbitrates amongst contending requests and sends corresponding Grants 532 out through the egress-direction ZCell traffic 548 to those of the ZINC units (419-4N9) whose respective requests won use of a switch-matrix time slot. In part of the Grant signal 532, the scheduler 504 may need to identify for the opposed ZINC chip, which raw request 557 won a respective time slot in the grant-giving ZEST chip 501. The winning request may be identified by the original request-label field 557 that was sent by the ZINC chip to the Ingress Processor 500 of the ZEST chip 501. Accordingly, irrespective of whether programmable slicing is active and not, the scheduler 504 should return the identifying portion of the original request-label field 557 to the corresponding ZINC chip as part of the Grant signal 532. This Grant signal moves through a ZCells outputting processor 506 and through a corresponding egress port (e.g., $E_0$, $E_1$, $E_2$, $E_3$, etc.) of the ZEST chip to get to the request-generating ZINC chip (not shown). Later, a corresponding payload (PDU) moves from a grant-winning VOQ (virtual output queue) of the request-generating ZINC chip, to a pre-assigned ingress port on ZEST chip 501, through the ZCell input receiver 500, through the switch matrix 502, through the ZCell output processor 506, and out through one or more requested egress ports (where the absolute identifications of those egress ports would be defined by translator 702 if virtual slicing is active). During this passage of the payload signals, control signals 505 are sent from the scheduler 504 to the switch-matrix 502 to establish the timing and route or routes of passage of the payloads (PDU's). For more details about specific implementations of scheduling and alignment, see one or more of the above-cited, U.S. Ser. No. 09/847,711 (Multiservice Switching System With Distributed Switch Fabric), U.S. Ser. No. 09/865,258 (Method and Apparatus for Scheduling Static and Dynamic Traffic through a Switch Fabric), and the concurrently filed, U.S. application entitled Variably Delayable Transmission of Packets Between Independently Clocked Source, Intermediate, And Destination Circuits While Maintaining Orderly And Timely Processing in One or Both of The Intermediate And Destination Circuits.

The specific details about scheduling, alignment and other aspects of the above-cited U.S. patent applications are not relevant to the present disclosure. Many other types of switching processes may be practiced in accordance with the disclosure. What is important to understand is that even when the scheduling process (504) is complex, programmable slicing may be practiced with no or relatively little interference to the scheduling process because the scheduler 504 is given translated requests 558 and works with these to devise its switching schedules 505. In other words, the translation (702) from use of relative (logical) egress identifications to use of absolute (physical) egress identifications can be made before a translated request is handed off to the scheduler 504 for subsequent processing. In specific cases such as where the scheduler output (e.g., Grant 532) needs to include one or more parts of the original (raw) request (e.g., the original request-label field) such original parts can be easily copied through into the scheduler output. The scheduler 504 is understood to be keeping track of what actual (physical) egresses it has scheduled, as opposed to or in addition to which relative (logical) egresses the request-generating ZINC chips (not shown) believe were granted.

In one embodiment, the translator 702 carries out its request translation operations in accordance with a scalable aperture partitioning (SAP) mode defined by contents of the SAP mode register 704. The SAP mode register 704 may be programmed at system bootup time and/or system reset time) and/or it may be otherwise programmed to identify the SAP mode of its respective ZEST chip 501. In an alternate embodiment, in-band control signals carried by ZCells 547 sent from the system's ZINC chips may establish the SAP mode stored in register 704.

As a more concrete example of how programmable partitioning may operate, in one embodiment where switch-matrix 502 includes a 64×64 crossbar array, a SAP-64 mode would indicate that no partitioning of the switch matrix is to occur, while a SAP-32 mode would indicate that the 64×64 switch matrix is to be partitioned (due to actions of translator 704) into two virtual switch slices, each of a 32×32 configuration (see FIG. 2D). Similarly, if the contents of the SAP mode register 704 represent a SAP-16 mode, that would indicate that the 64×64 switch matrix is to be partitioned (due to actions of translator 704) into four virtual switch slices, each of a 16×16 configuration (see FIGS. 2B-2C). A SAP-8 mode effectively partitions the 64×64 switch matrix of alignment switch 502 into eight, virtual switch slices, each of a 8×8 configuration. A SAP-4 mode effectively partitions alignment switch 502 into sixteen, virtual switch slices, each of a 4×4 configuration. A SAP-2 mode effectively partitions alignment switch matrix 502 into thirty two, virtual switch slices, each of a 2×2 configuration.

If SAP-16 mode is established for ZEST chip 501, a corresponding, unicast, request label may use as few as 4 bits for identifying the relative egress ($Re_x$) destination for a corresponding payload (PDU). Suppose the logical egress port is identified by the lower four bits [3:0] of a received, raw request label signal 557. The identity of the virtual slice for which this request label (bits [3:0]) was targeted may be determined by looking at the actual ingress port number ($aI_0$ or $aI_1$ or, etc.) through which the request signal 547 arrived. More specifically, even though there are 64 individual, ingress ports on ZEST chip 501 ($aI_0$-$aI_{63}$), when SAP-16 mode is in effect, the sixty-four aI's can be grouped into four sets of 16 aI's each, with each group corresponding to a respective, virtual slice (see FIG. 2B). Only two further bits (beyond the original four) are needed to identify one of the four virtual slices. If such a pair of slice-identifying bits [5:4] are pre-pended to the logical destination bits [3:0], we can obtain a 6-bit long binary number that identifies the actual egress port ($aE_y$) from which the payload is to egress.

In one embodiment, a unicast request is distinguished from a multicast request by a request-type bit included in the request signal. If the RLC unit 700 detects the request-type bit as indicating unicast mode; and it detects the SAP-16 mode as being in effect, the RLC will fetch the lower four request-label bits {3:0} while ANDing out the upper bits of the request-label with zeroes. The RLC will then OR into bit positions [5:4] of the ANDed request-label, a binary number representing the virtual slice number. The latter, virtual slice number may be generated by dividing the absolute ingress port number ($aI_x$) by the current SAP mode number—which in this example is, 16. The latter, divide-by-16 operation can be conveniently carried out on a binary representation of the absolute ingress port number ($aI_x$) by shifting 4 places to the right. The six bits which are produced by the above-described, ORring operation may be provided to the scheduler 504 as part of the translated request 558 that identifies the appropriate physical (actual) destination port from which grant and/or payload egress is to occur. We will see shortly in FIG. 7, that these kinds of simple translation operations can be carried out on-the-fly (OTF) such that there will be relatively minimal delay between when a raw request 557 is output by the ZCell input receiver 500 and when a translated version 558 can be handed off to the scheduler 504 for further processing.

In one embodiment, the request-label field is 12 bits long and it is not checked (covered) by the ZCell ECC code (see 448 of FIG. 4) even though the request-label field is included in ingress-directed ZCells 547. Unicast requests need no more than 6 of the twelve bits in the request-label field for identifying a specific one of the 64 actual egress ports of ZEST chip 501. Therefore, at least 6 remaining bits of the request-label field can be used for functions other than egress port identification; for example, error detection. If SAP-32 or lower slicing modes are in effect, then even a fewer number of the bits in request-label field are needed for identifying a specific one of the 32 or less, relative egress ports of a targeted, virtual slice. The unused, 6 or more bits of the request-label field may be otherwise employed to carry out a rudimentary kind of error detection function as is now explained. Ingress-direction ZCell signals 547 can sometimes experience erroneous bit flips as they travel through the interconnect layer 403. (Recall that the request-label field is not covered by ECC in this embodiment.) If such an in-transit bit flip occurs in an upper portion of the request-label field, where the bits of that upper portion are expected to be all zeroes for a given SAP mode, then the presence of a "1" bit may indicate that a transmission error has occurred. This information can be used for the link-health monitoring function described in connection with FIG. 3B. For example, if SAP-16 mode is in effect, label bits [11:4] of the raw request 557 should all be zero because the relative egress address ($Re_x$) is carried by lower bits [0:3]. So detection of a transmission error may be performed, for example, with a "mask-and-compare" operation. In such a mask-and-compare operation, the raw request label may be masked by ANDing it with a $00F_{hex}$ code to thereby turn off all but the lower four bits in the output of the ANDing operation. The so-masked output may then be compared (e.g., XORred) with the bits in the original request label 557 to assure that all of the upper bits [11:4] in the received, raw request label 557 were zero. A subsequent ORring of the result bits output by the XOR operation can be used to quickly see if any of the XOR output bits was a '1' (indicating an error condition). Appropriate action may then be taken in response to such an error detection. In one embodiment, the AND-masked and thereafter translated request 558 is handed off to the scheduler 504 for normal processing even if the here described, error condition was detected in the received, raw request label 557. A counter or other error-logging means (such as that described for FIG. 3B) may be used to keep track of such label-field based, error detections. A supervisory circuit may periodically scan the error-logging means and decide to reset the system or take other corrective action (e.g., shutdown a slice or an entire PSSU) when a predefined and corresponding threshold level for errors is exceeded.

Referring to both FIGS. 5 and 7, when a multicast request is received, its presence may be detected by checking the request-type bit. While a unicast request typically asks for just one egress port (an exception being if a dual homing mode is turned on and thereby indicates that a unicast request is to be interpreted as implicitly asking for egress of its corresponding payload from not only its stated egress port, but also from at least one additional egress port—the ancillary homing port), by contrast, a multicast request may explicitly ask for egress of its corresponding payload (PDU) through a plurality of egress ports. In one embodiment, any two, three, and so on, up to all 64 of the egress ports (of the example given in FIG. 5) may be explicitly requested by a given multicast request. In order to keep the size of the request signal small while still allowing for a multicast outputting of a given payload through any or all of the 64 egress ports, a multicast lookup table (LUT) may be used. In one embodiment, the LUT produces a 64-bit mask word whose various bits are turned on to indicate which of the 64 egress ports are being requested. Such a LUT is referred to herein as a Multicast Mask RAM (MMR) and is shown at 706 and 582 in FIGS. 5 and 7 respectively. In one embodiment, the request-label size for multicasting is 12 bits as it is for unicasting. (However, for unicast mode, the 12 bits can comprise two, independent 6-bit addresses, while for multicast mode the 12 bits represent one lookup address.) The MMR 706 (or 582) converts the 12 bit label into a 64 bit-wide selection mask. If a variable number of more significant bits are expected to be all zeroes in the raw multicast request-label 557 (the number varying with SAP mode), then error detection can be performed using the above-described "mask-and-compare" method or an equivalent as it may also be used for unicast request labels that carry only one egress address. (Typically, the number of request-label bits for multicast will be the same as they are for unicast under a given SAP-mode, although this is not a necessary condition.) The MMR may be programmed during system bootup and/or system reset and/or otherwise as may be appropriate for converting unique, 12-bit (or smaller) egress defining codes into corresponding 64-bit mask words.

In one embodiment, SAP mode translation occurs as follows: The 64 bit wide MMR output, mask word is retrieved, its valid bits are assigned to a respective slice group according to the actual ingress port number and according to the number of virtual slices present. The bits of the assigned group are thereafter shifted left (without wrap around) by a number of bit places, where the latter shift-left amount is equal to the slice number multiplied by the number of relative egress ports per slice. Remaining parts of the translated mask word are padded with zeroes. The resulting mask word then identifies the actual (physical) egress ports through which egress is to take place. For example, in SAP-16 mode, the MMR should output mask word whose least significant 16 bits identify the relative egress ports ($Re_x$'s) being requested. The multicast translation process should shift this group of sixteen bits, 16 bits to the left if virtual slice #1 is being addressed; 32 bits to the left if virtual slice #2 is being addressed; and 48 bits to the left if virtual slice #3 is being addressed. As with unicast mode, in multicast mode the slice identification may be determined from the actual ingress port number through which the request signal arrived. The so-translated, 64-bit wide mask word is then provided to the scheduler 504 for further processing.

As an example, FIG. 6A illustrates a corresponding translation process for SAP-16 mode wherein virtual slices #0, #1, #2, #3 are respectively associated with actual ingress ports 0-15, 16-31, 32-47, and 48-63 as well as being respectively and exclusively associated with actual egress ports 0-15, 16-31, 32-47, and 48-63. Suppose a multicast request arrives through actual ingress port number 40 (a 140). Suppose MMR 706 (582) converts the relative request-label into a mask word that flags relative egress ports 0, 2 and 3 ($Re_{00}$, $Re_{02}$, $Re_{03}$) as the desired destinations from which the corresponding payload is to egress in multicast fashion. (In a request/grant protocol system, the multicast occurs of course, only if the request wins a grant from the scheduler 504.) Reference 602 (FIG. 6A) shows the raw mask output of MMR 706 as requesting relative destination ports 0, 2 and 3 (indicated by a 1101 sequence in the least 4 significant bit places). Since the physical source port of the multicast request was port 40, (which in the hook up shown in FIG. 2B is associated with logical source port 8 in virtual switch slice #2) the translator 702 shifts the MMR output by 32 bits to the left (with zero padding and no wrap around) as indicated by reference item 604. Thus, the translated request 558 that is provided to the scheduler 504 will be a 64-bit wide mask word (604) with its bits set to indicate requested egress from absolute port numbers 32, 34 and 35. FIG. 6A also shows how the upper bits [63:16] of the raw MMR output may be used for error checking in a first version 602a. In an alternate, second version 602b, the states of the upper bits [63:16] are don't cares (X--XXXX--X). FIG. 6B is directed to a so-called, de-crossed embodiment which will described later below.

FIG. 7 shows one embodiment of a RLC unit 700' and of a ZCell receiver unit 500' as may be practiced in accordance with the disclosure. Raw unicast and/or multicast requests are obtained from the ZCell input transceiver 500' as they appear on respective ones of the ingress ports. For purpose of understanding how these signals are synchronized and ordered, they are shown as being first stored on a parallel basis in a receive queue 500a'. When a given multi-clock machine 'tick' begins, those of the raw requests that have been captured in the receive queue 500a' are transferred in parallel, along with corresponding storage-valid bits (svb's) into a long shift register 550 to be stored in an accordance with the ingress port they came in on. (If no valid request came in for a given ingress port, its internal request-valid bit will be 0, but its storage-valid bit (svb, separately shown) will still be set to 1 in the shift register 550.) With each pulse of the local clock (CLK), the shift register 550 pushes out a next raw request 557' for processing by a request parser 552. The opposed end of the shift register 550 fills with zeroes as raw requests 557' shift out from the first end in an order representing their actual ingress port ($aI_x$). Accordingly, the backend, storage valid-bits (svb's) will be zeroes. The raw requests 557' (or back padded zeroes) exit on a streaming basis (pipelined basis) from the shift register 550. The exiting raw requests 557' are sent one by one in pipelined manner to a unicast/multicast request parser 552. In this parser 552, the request-type bit (unicast versus multicast) is identified and the request is responsively routed from outputs of the parser 552 to either a unicast processing section or a multicast processing section depending on the state of the uni/multicast request-type bit. The unicast processing section includes registers 570 and 573. The multicast processing section includes registers 580 and 584.

If a multicast request is detected by parser 552, the 12-bit raw request-label is routed to register 580, while other bits of the request, such as request-priority and request-validity indications, are routed to register 584. (At the same time, the parser 552 outputs zeroes to registers 570, 573 and a multicast indicator to register 560 so that the pipeline contents remain aligned.) The multicast egress identifying code which is output by label register 580 is applied to an address input of MMR 582. This MMR stores multiple 64 bit wide mask words. The raw mask word which is addressed by the current egress code (580) is next transmitted to a synchronization register 586. A co-synchronized register 587 also captures and thereby associates with the MMR output; the original request label from register 580. Register 587 also captures other portions of the original request label from register 584, which remaining portions include priority and request validity bits (3 and 1 bits respectively). The captured copy of the original request-label (580) is later used by the scheduler 504 to provide a matching grant indication back to the line interface chip (ZINC chip) that sent the original request.

The output of synchronization register 586 is provided to a multicast-mask translating unit 592. The multicast-mask translating unit 592 provides translation by in essence shifting the bits of the 64-bits wide mask portion to the appropriate switch slice position, depending on the actual source port of the request as described above. (See FIG. 6A.) The multicast-mask translating unit 592 receives a slicing-pattern identifying signal from the SAP mode register 704' indicating what slicing pattern is in effect. The multicast-mask translating unit 592 further receives an indication of which virtual slice is being targeted from a source-port indicator block 708. (A source ports indicator counter 708 sequences through identifications of the various ingress ports (source ports) in accordance with the order their raw requests are stored in shift register 550. The source-port indicator counter 708 is allowed to increment (CLKEN) as long as there is a valid storage bit present, corresponding to the storage-valid signals (svb's) sequencing in from shift register 550. If the backend, padding zeroes of register 550 are detected, the source-port indicator counter 708 is reset, and waits to begin counting again when the next stream of true svb's arrive. In this way, the source port indicator counter correctly indicates to the multicast-mask translating unit 592 what ingress port the currently-being processed, request mask in register 586 belongs to.) In response to the current SAP mode indication (704') and the current source port indication (708), the multicast-mask translating unit 592 performs a corresponding translation on the multicast bit mask word stored in register 586, such as for example, shifting the raw, 16-bit LSB subfield of word 602 of FIG. 6A into the SLICE #2 subfield of mask word 604 in FIG. 6A. The translated 64-bits wide mask word (e.g., 604) is output from the translation block 592 to a multicast-mode input of multiplexer 594, along with the original priority/validity indication and request label that had been captured in synchronization register 587. A second synchronization register 596 then forwards the pipelined data to the scheduler 504. (The current SAP mode indication (704') may also be sent to the scheduler 504 for reasons described above respecting FIGS. 3A-3B.)

In the unicast pipeline section of FIG. 7, the request-label that had been stored in register 570 is forwarded to third synchronization register 572. The priority bits (3 per request) and request-validity bits (1 per request) that had been stored in register 573 are forwarded to a fourth synchronization register 588 so they remain in pipeline alignment with their corresponding request-label in register 572. Although shown as separate registers, registers 573 and 570 may of course be combined into one register and similarly registers 572 plus 588 can also be combined into one register. Registers that are illustrated in vertical alignment, such as 560, 573, 570, 584, 580 serve to maintain pipeline alignment of related signals and registers 562, 588, 572, 586, 587 as well as source-port indicator block 708 are similarly drawn in vertical alignment. A first copy of the original, unicast request label stored in register 572 is forwarded for translation to a unicast translator 574, while a second copy of the label is forwarded from register 572 to the scheduler 504 (by way of multiplexer 594) for use in formulation of a corresponding grant signal, assuming of course, that such a grant is won by the request and is thereafter sent to the requesting line card interface chip (ZINC chip). To keep both the unicast and multicast pipelines filled and operating synchronously, zeros are provided to the unicast pipeline registers 570, 573 in the case where the request is of the multicast type. Similarly, zeros are provided to registers 584 and 580 in the case where the request is of the unicast type.

The unicast translation block 574 can provide the appropriate translation for a given SAP mode by ORring the appropriate request-label bits (e.g., bits [3:0] in SAP-16 mode) with more significant bits identifying the corresponding switch slice (e.g., bits [5:4] in SAP-16 mode). The unicast translation block 574 receives an input from the SAP mode register 704' and an indication of the switch slice from block 708 to support its translation operations.

The SAP mode register 706 has bits indicating the SAP mode which can be set either by the system manufacturer or a user. In one embodiment, the source port indicator 708 operates essentially as a preloadable, incrementing counter, as already explained above. Such an incrementing counter can be used when the requests are provided from the shift register 550 and through the illustrated pipeline in numerical order according to their actual ingress port number. If one request in the expected numerical sequence is not present, a dummy request (e.g., all zeroes except for the storage-valid bit, svb) may be instead provided to the pipeline in the expected sequential position, but the request validity bit (register 573 or 584) of the dummy request should be reset to 0 to indicate the request itself is invalid. The scheduler 504 ignores invalid requests.

The translated unicast request-label is output from the translation block 574 to multiplexer 594 along with other request data that had been captured in register 588. Multiplexer 594 is controlled by a request-type bit which moves through registers 560, 562 to thereby timely select either the translated unicast or translated multicast request for submission to the RLC output register 596.

Because the scheduler 504 ignores invalid ones of translated requests, a given virtual slice can be easily deactivated by forcing its request-valid bits to zero. The disabling of one or more virtual slices may be desirable in cases where the exclusive ingress or egress resources of that slice appear to be malfunctioning (e.g., showing an excessive number of ZCell transmission errors). When associated ZINC chips fail to get grants from the shut-down slices, those ZINC chips can automatically decide to route their requests to other slices within the switch fabric. If errors are detected which are not port specific, the entire ZEST chip may be disabled rather just a given switch slice. When associated ZINC chips fail to get grants from the shut-down ZEST chip, those ZINC chips can automatically decide to route their requests to other ZEST chips within the switch fabric.

Referring briefly to FIG. 2B, it may be appreciated that the exterior pinout of PSSU 207 is less than ideal for implementation on a planar printed circuit board (PCB). Interconnect leads (e.g., PCB traces) 203.1-203.4 of LCU-0 connect to spread-apart pins (terminals) of the PSSU packaging. With this kind of layout, the traces or other interconnect conductors which couple further line card units (not shown) to PSSU 207 may have to cross with one another and with those of LCU-0. This can disadvantageously lead to problems with crosstalk, signal timing, and can result in inefficient use of PCB layout space. It would be much better if the pinout of PSSU 207 could be organized so that the interconnect traces (or other conductors) 203.1-203.4 of each line card unit (e.g., 202) could be grouped together to avoid or minimize the crossing of interconnect leads.

Figure 8A:
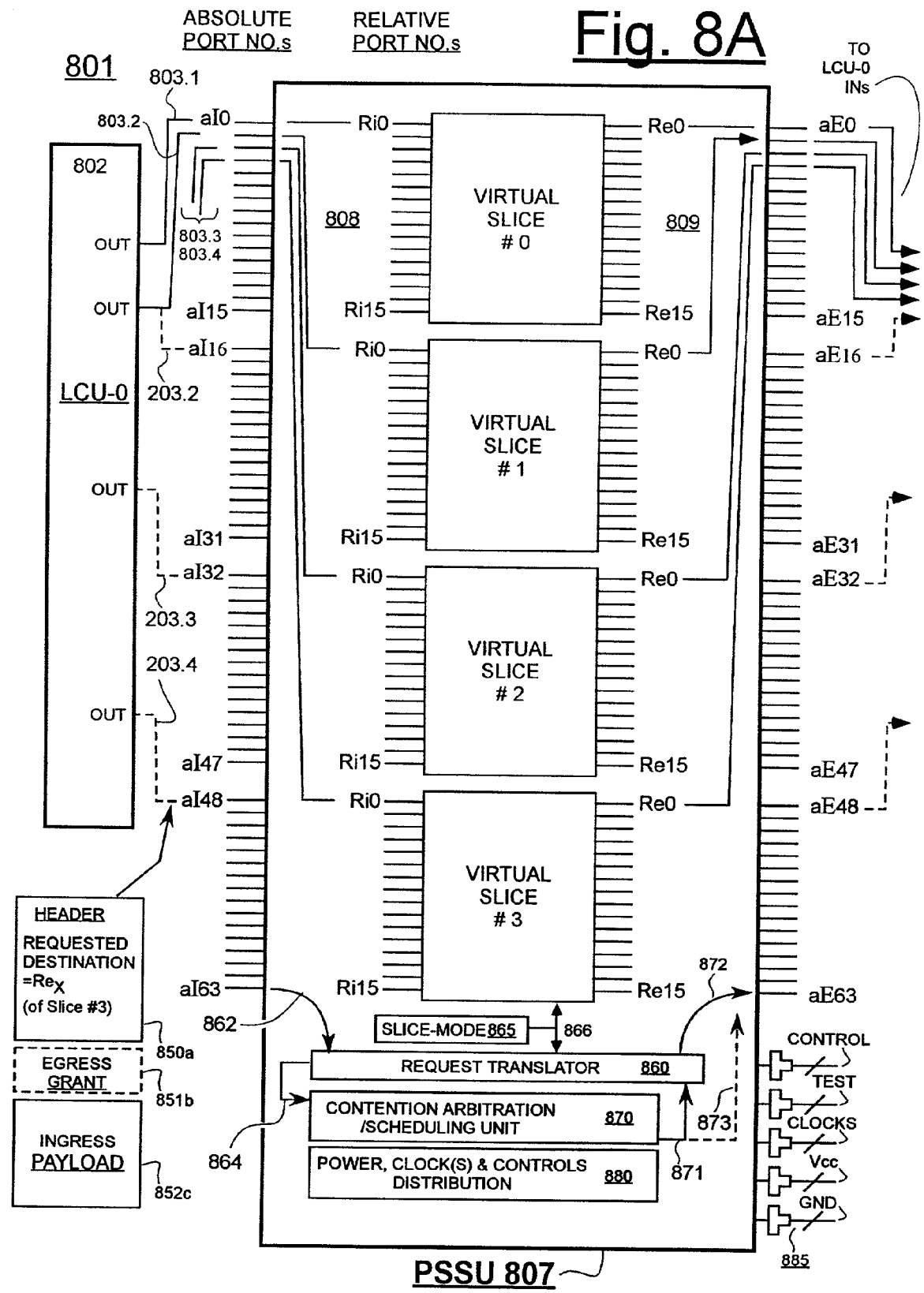
FIG. 8A is a block diagram introducing the concept of chip-internal re-mapping of pinout.

FIG. 8A shows a modified, Programmably-Sliceable Switch-fabric Unit 807 that includes respective first and second means, 808 and 809, for respectively and programmably uncrossing the external ingress-pinouts ($aI_x$'s) and the external egress-pinouts ($aE_x$'s) of the packaging of PSSU 807 so that terminals (e.g., pins) of each LCU (e.g., 202) can be grouped adjacent to one another. In FIG. 8A, like reference numerals in the "800" century series are used where practical for like elements numbered in the "200" century series in FIG. 2B. It may be appreciated from FIG. 8A that external interconnect lead 803.2 replaces dashed lead 203.2 which was originally present in FIG. 2B. Similarly, respective external leads 803.3-803.4 replace dashed leads 203.3 and 203.4. The PSSU-internal, first uncrossing means, 808 re-routes the signals of external pins $aI_0$-$aI_3$ to the respective R10 relative ingress terminals of virtual slices #0-#3. Similarly, at the egress side of PSSU 807, the unit-internal, second uncrossing means, 809 re-routes the egress signals of relative egress ports Re0 of slices #0-#3 to respective ones of absolute egress ports $aE_O$-$aE_3$.

Similar internal, and programmably carried-out uncrossings may be carried out by the first and second uncrossing means, 808 and 809 so that the ingress and egress pinouts of the remaining other line card units, LCU-1 through LCU-N (not shown) will be grouped together such that essentially none of the line card unit interconnect leads need to cross with one another on the PCB or other means that supports PSSU 807. Methods for carrying out such programmable uncrossings will be described shortly. We note in passing through FIG. 8A, that its switch fabric design, 801 temporally interposes an egress-directed Grant signal 851*b* between the ingress-directed, Request signal 850*a* and its corresponding and ingress-directed Payload signal 852*c*. Such a split-in-time organization of request signal 850*a* and corresponding ingress payload 852*c* can help to reduce bandwidth wastage in the interconnect layer (103). Payloads which fail to win a Grant (851*b*) will not be sent out on the ingress side of the interconnect layer and thus will not disadvantageously waste its ingress-directed bandwidth.

FIG. 8B shows a first slice distribution scheme 807' in which the ingress side pinouts have been fully uncrossed while the egress side pinouts remain the same as in the corresponding SAP-16 slice distribution of FIG. 2C. It may be seen from FIG. 8B that the top horizontal row of slice #1 (of FIG. 2C) has been pushed up to exclusively occupy horizontal ingress line $aI_1$ while the second row of slice #0 (FIG. 2C) has been pushed down in FIG. 8B to instead exclusively occupy horizontal ingress line $aI_4$. Similarly, the top row of slice #2 (FIG. 2C) has been pushed up in FIG. 8B to exclusively occupy horizontal line $aI_2$ and the top row of slice #3 (FIG. 2C) has been pushed up in FIG. 8B to exclusively occupy horizontal line $aI_3$. The same pattern has then been repeated for the other rows of the 16×16 slices of FIG. 2C and their counterparts in FIG. 8B so that each line card unit may connect to all four slices by way of numerically adjacent ingress ports. More specifically, LCU-0 may connect on the ingress side to each of slice #0-#3 by way of the external terminals of numerically and physically adjacent, ingress ports $aI_0$-$aI_3$. (Although FIG. 8A assumes a simplistic, Dual-In-Line type of pinout, it may be appreciated that other types of packagings such as Ball Grid Array (BGA), etc. will tend to have their numerically adjacent pins also grouped in physical proximity to one another. The numerical proximity provided by the illustrated uncrossings will therefore be advantageously applicable to a wide variety of packagings. Those skilled in the art, will understand from this disclosure how to vary the row re-distributions exemplified by FIGS. 8B and 2C so as to accommodate points of discontinuity (if any) in the pinouts of specific packagings.)

The request translation that is carried out by translator 860' of FIG. 8B remains fairly similar to that used by the translator of FIG. 2C. A primary difference is that the two least significant bits (LSB's) of the binary representation of the absolute ingress port number ($aI_x$) now represent the slice number in FIG. 8B whereas in FIG. 2C it was the two most significant bits (MSB's) of the six-bit port representation that provided the slice number. Stated otherwise, to determine what slice number a given, relative request belongs to, in the embodiment of FIG. 8B (and also in the embodiments of 8C and 8D, as will be seen): take the number of the absolute ingress port ($aI_x$); divide that number by four; and the remainder (0-3) tells you what slice the request signal belongs to. If the absolute ingress port number ($aI_x$) is expressed as a six-bit binary number, then the two least significant bits provide the remainder value resulting from a shift right-by-two operation (a binary divide by four).

Figure 8D:
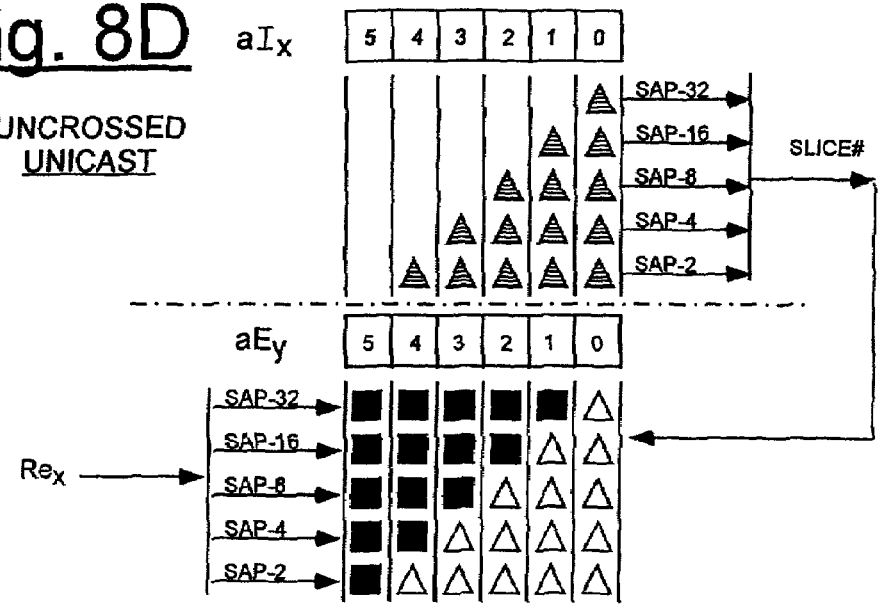
FIG. 8D is a second flow chart showing how to implement virtual slicing and pinout de-crossing for unicast requests in accordance with the disclosure.

Referring to the top half of FIG. 8D, it should be easily appreciated from the above description of translation for FIG. 8B, that if SAP-32 mode had instead been used, it will be only the one, least significant bit of the $aI_x$-representing, binary number that defines the corresponding slice number (0-1); as is indicated by the single, hatched triangle in the SAP-32 row. Moreover, in SAP-8 mode it will be the three least significant bits that define the respective slice number (0-7) as is indicated by the three, hatched triangles in the SAP-8 row, and so on. The bottom half of FIG. 8D shows how the absolute egress port number aE may be determined for a next-described, fully-uncrossed embodiment 807" (FIG. 8C). For the SAP-16 embodiment 807' of FIG. 8B the absolute egress port number $aE_y$ may be determined (not shown in FIG. 8D) by appending to the MSB left side of the $Re_x$ number (the relative egress port number), the two-bit slice number obtained from the divide-by-four operation described immediately above.

Referring to FIG. 8C, it may now be seen from the illustrated distribution of switch points (hollow circles) for embodiment 807" how uncrossing of the egress pinouts may be carried out in a fashion similar to that used in FIG. 8B for uncrossing of the ingress pinouts. Briefly, the left most column of slice #1 (FIG. 8B) has been given exclusive ownership in FIG. 8C of vertical egress line aE1. The left most vertical column of slice #2 (FIG. 8B) has been given exclusive ownership in FIG. 8C of vertical egress line aE2. The left most vertical column of slice #3 (FIG. 8B) has been given exclusive ownership in FIG. 8C of vertical egress line aE3, and so on. Uncrossing of the egress pinouts can be alternatively carried out without concomitant uncrossing of the ingress pinouts. It may be appreciated that such an alternate uncrossing of the egress pinouts would produce the pattern of FIG. 8B, but rotated 90 degrees and then flipped horizontally.

The request translator 860" of FIG. 8C determines the relative slice number of an incoming request in the same way as is done in FIG. 8B. The least significant bits of the absolute ingress port number define the slice number. See the top half of FIG. 8D. To determine what the absolute egress port number is for SAP-16 mode, the relative egress number is shifted left by two bit positions and the already-determined slice number is inserted as the two least significant bits. Stated otherwise, in SAP-16 mode, the relative egress number is multiplied by four and the virtual slice number (0-3) is added to that result to thereby identify the absolute egress port number. As seen in the bottom half of FIG. 8D and represented by the darkened squares, for SAP-32 mode, the left shift is by only one bit and for SAP-8 mode, the left shift is by three bits, and so on. Request translation may therefore be carried out for unicast requests just as easily for the uncrossed embodiments 807' and 807" of respective FIGS. 8B and 8C as it had been for FIG. 2C.

Figure 8E:
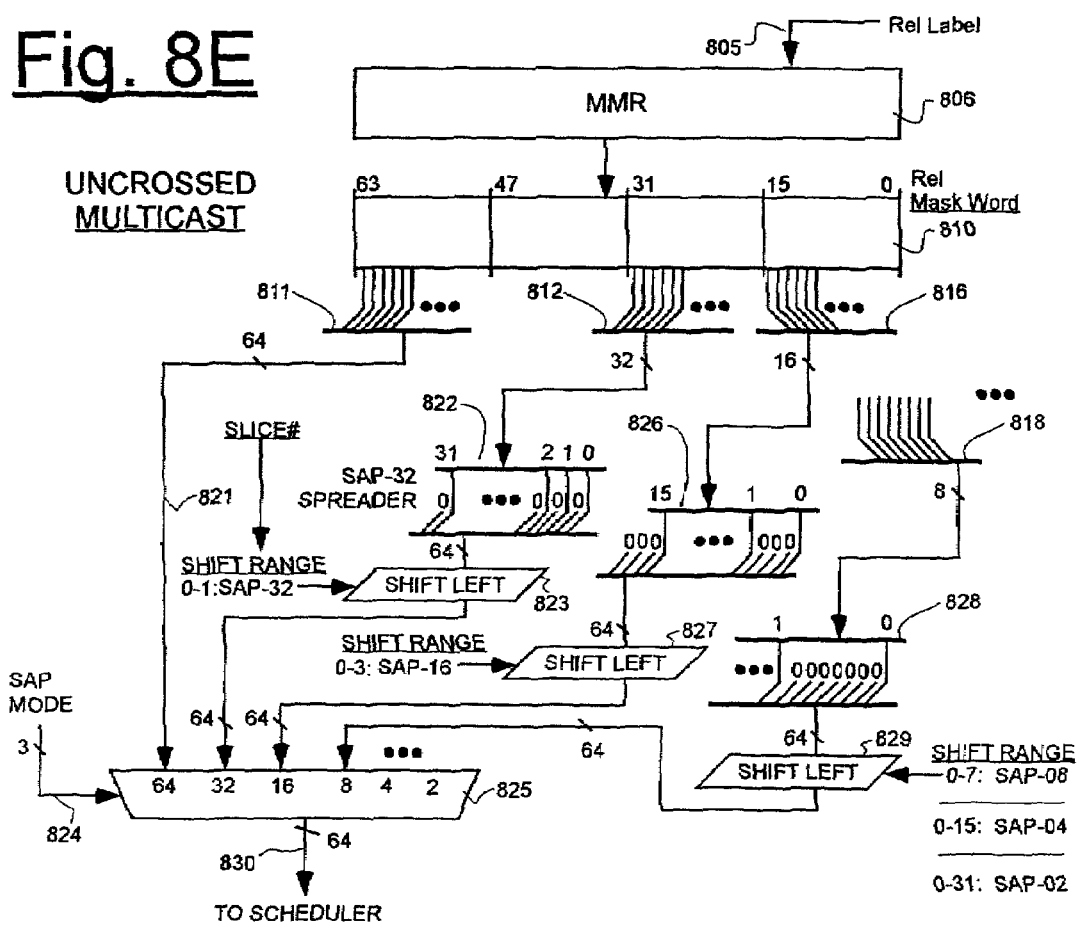
FIG. 8E is a schematic showing how to implement virtual slicing and pinout de-crossing for multicast requests in accordance with the disclosure.

For multicast request formats, a more complicated translation method may need to be used. In FIG. 8E, multicast memory ram (MMR) 806 converts a supplied, relative-egress request label signal 805 into a 64-bit wide, relative mask word 810. If SAP-64 mode is in effect, any or all of the bits in mask word 810 may be variably set to logic "1" to thereby indicate that egress is desired through that respectively-identified relative egress port (0-63). If SAP-32 mode is in effect, then any or all of bits 0-31 of mask word 810 may be variably set to a logic "1" to indicate that egress is desired through that relatively-identified egress port. Bits 32-63 of mask word 810 should all be fixed to logic "0" in SAP-32 mode because the corresponding switch slice has only 32 egress lines that are selectable for multicast egress. If SAP-16 mode is in effect, then the relative request bits that are turned on (logic "1") should be restricted to bits 0-15 of the mask word 810 while the remaining bits 16-63 should all be logic "0". Such field-restrictions continue per the pattern for SAP-8, SAP-4 and SAP-2.

Translation in SAP-64 mode may be carried out as a straight forward one-to-one mapping. Symbol 811 represents a hardwired collection of all 64 variable bits of the relative mask word 810. The corresponding 64-bit wide signal 821 is supplied to a first input of multiplexer 825. If the 3-bit, SAP-mode selecting signal 824 that controls multiplexer 825 indicates SAP-64 mode, then multiplexer 825 will reproduce signal 821 at its output 830. The 64-bit wide output signal 830 is then transmitted to the scheduler for further processing.

Symbol 812 represents a hard wired collecting of bits 0-31 from the relative mask word 810. These 32 variable-bits are sent to a SAP-32 spreading unit 822. In spreading unit 822, the 32 variable-bits output by collector 812 are distributed evenly across a 64-bit space with zeros being padded (conceptually or actually) between the spread-out, input bits. Bit number 31 of the input to spreader 822 effectively becomes bit number 62 at the output of the spreader. A zero is padded (conceptually or actually) to the left of that bit to define bit 63 of the spreader output. (We will see in the embodiments of FIGS. 8F-8G that the zero signal need not be actually generated for certain shifter designs, but instead may be implied. For now, in order to initially grasp the concepts being presented, it may be better to assume that the padding-zero signal is actually created and carried by a wire.) Similarly, variable bit number 1 of the spreader input becomes variable bit number 2 of the spreader output. A zero is padded (conceptually or actually) to the left of that spreader output bit as shown. Bit number 0 of the spreader input remains as bit number 0 of the output of spreader 822. Once again, a zero bit is padded (conceptually or actually) to the left of that position. The pattern repeats for other input and output bits of the SAP-32 spreading unit 822.

The 64-bit wide (conceptually-speaking) output of the SAP-32 spreader 822 is supplied to a left-shifting unit 823. The shift range of left-shifting unit 823 is constrained to 0 or 1 bits to the left. A signal representing the current slice number (which may be derived in accordance with FIG. 8D) is supplied to the shift-amount control input of left-shifting unit 823. A second input of multiplexer 825 receives the output of the SAP-32 left-shifting unit 823. If the SAP-mode selecting signal 824 indicates SAP-32 mode, then that second-input signal is output by multiplexer 825 as the 64-bit wide output signal 830. (It will be seen later, in the embodiment of FIG. 8F; that the bus connecting the output of spreader 822 to the input of left-shifter 823 does not actually have to be 64 bits wide. It can instead be 32 bits wide because the padded-zeroes may be implied rather than real. For now, in order to initially grasp the concepts being presented, it may be better to assume that the illustrated bus is actually 64 bits wide.)

Symbol 816 represents a hard wired collection of bits 0-15 of the relative mask word 810. The 16-bit wide output of collector 816 is supplied to a SAP-16 spreading unit 826. As shown, spreading unit 826 pads three zeros (conceptually or actually) to the left of each input bit. As a result, the sixteen input bits of spreader 826 are uniformly distributed across a 64-bit wide, output space with zeros padded (conceptually or actually) in the remaining bit positions. Input bit 15 of spreading unit 826 becomes output bit 60 of that spreading unit. There are three zeros padded (conceptually or actually) to the left of that output bit. Input bit number 1 of spreader unit 826 becomes output bit number 4 of that spreader unit. Although not shown, it is understood that three zeros are padded (conceptually or actually) to the left of that output bit number 4. Input bit number 0 of spreader unit 826 remains as output bit number 0 of the spreader unit. Once again, there are three zeros padded (conceptually or actually) to the left of that output bit. It is understood that the same pattern repeats for all the other bits of spreader unit 826.

The 64-bit wide (conceptually-speaking) output of the SAP-16 spreader unit 826 is supplied to left-shifting unit 827. This SAP-16 left-shifting unit 827 has a left-shifting range of zero to three bit positions. The current slice number signal is supplied to the shift-amount control terminal of shifting unit 827. The output of left-shifting unit 827 is supplied to a third input of multiplexer 825. If the SAP-mode selecting signal 824 indicates SAP-16 mode, then that third input is reproduced as the 64-bit wide output 830 of multiplexer 825. (Once again, it will be appreciated later from interpolating between the embodiments of FIGS. 8F-8G; that the bus connecting the output of spreader 826 to the input of left-shifter 827 does not actually have to be 64 bits wide. It can instead be 16 bits wide because the padded-zeroes may be implied rather than real. For now, in order to initially grasp the concepts being presented, it may be better to assume that the illustrated bus is actually 64 bits wide.)

Referring briefly back to FIG. 8C, and considering it in conjunction with FIG. 8E; it may now be seen that the combination of collecting unit 816, spreading unit 826 and left-shifting unit 827 provides the appropriate translation for SAP-16 mode as represented by FIG. 8C. The activated "1" bits provided in the 64-bit wide output signal of left-shifting unit 827 represent the absolute egress port numbers of a multicast request of FIG. 8C, where the raw request (805) resulted in an MMR output wherein the active bits originally occupied bit positions 0-15 of the relative mask word 810 in FIG. 8E.

It may be appreciated from the pattern of connections described so far for FIG. 8E that symbol 818 represents the hard wired collector for SAP-8 mode. Collector 818 collects the least significant 8 bits of relative mask word 810 and supplies them to spreading unit 828. The SAP-8 spreading unit 828 pads 7 zeros (conceptually or actually) to the left of each input bit to thereby evenly distribute the 8 input bits across a 64-bit wide output space. The 64-bit wide (conceptually-speaking) output of spreader 828 is then supplied to left-shifting unit 829. The left-shifting range of the SAP-8 shifting unit 829 is restricted to the range 0-7. It is understood that the current slice number signal is applied to the shift-amount control terminal of shifting unit 829 to provide the appropriate amount of shifting. The shifted output of shifter 829 becomes the fourth input of multiplexer 825. When signal 824 indicates SAP-8 mode, the fourth input signal of multiplexer 825 is copied to its output 830 and supplied to the scheduler as a corresponding 64-bit wide, absolute request mask. (Once more, it will be appreciated later from interpolating between the embodiments of FIGS. 8F-8G; that the bus connecting the output of the SAP-8 spreader 828 to the input of left-shifter 829 does not actually have to be 64 bits wide. It can instead be just 8 bits wide because the padded-zeroes may be implied rather than real.)

It may now be understood that the same pattern of collecting signals, spreading their bits and shifting them is carried out for the SAP-4 mode and the SAP-2 mode. The amount of left shift in the SAP-4 mode should be constrained to 0-15 bit places. The amount of left shifting in the SAP-2 mode should be constrained to 0-31 bit places. Multiplexer 825 receives the corresponding 64-bit wide, post-shift signals for the SAP-4 and SAP-2 signal paths and outputs these respective signals as the corresponding absolute mask word 830 when control signal 824 respectively indicates SAP-4 or SAP-2 mode.

An alternate, multicast translation embodiment (not shown) can be carried out with the left shifting operation occurring after a multiplexer corresponding generally to 825 selects one of the outputs of collector 811 or of spreading units 822, 826, 828, etc. Such a post-selection, left shifting operation would have to be a general purpose left shift operation because its 64 input bits can come from any of collector 811 or of spreading units 822, 826, 828, etc. As a result of its general-purpose nature, such an alternate left-shifter (not shown) would be more complex and occupy on more space within the PSSU than might be occupied by judicious and special-purpose designs of left-shifters 823-829 of FIG. 8E.

Figure 8F:
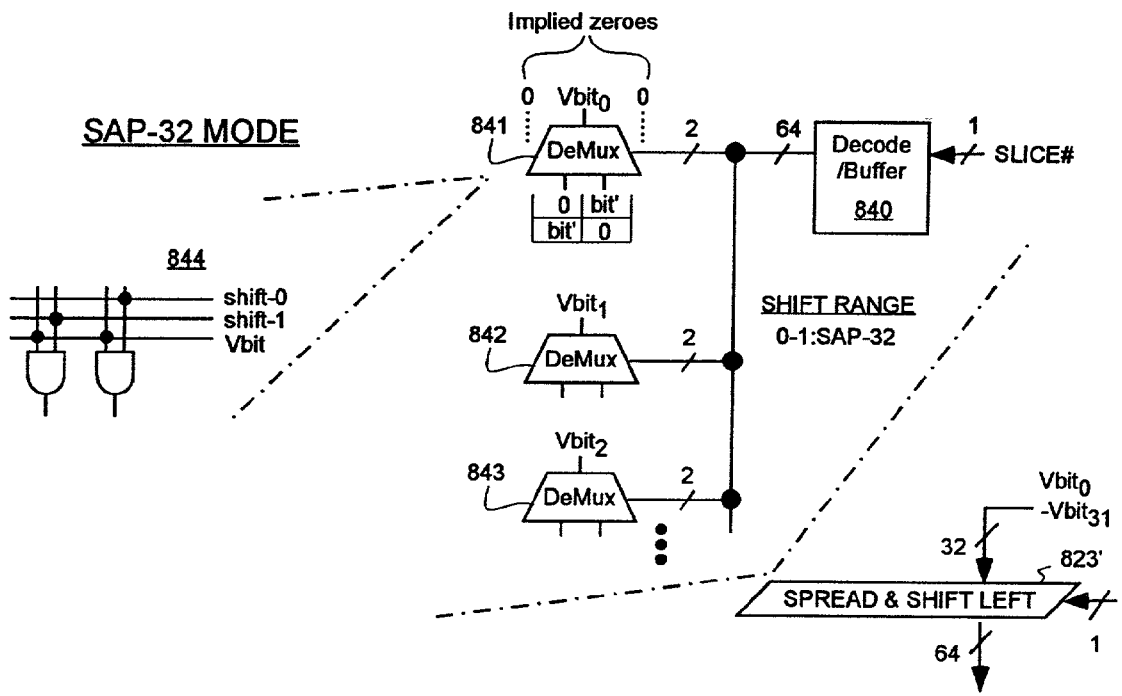
FIGS. 8F-8G are schematics respectively showing how a SAP-32 shifter and a SAP-2 shifter may be implemented in accordance with the disclosure.
Figure 8G:
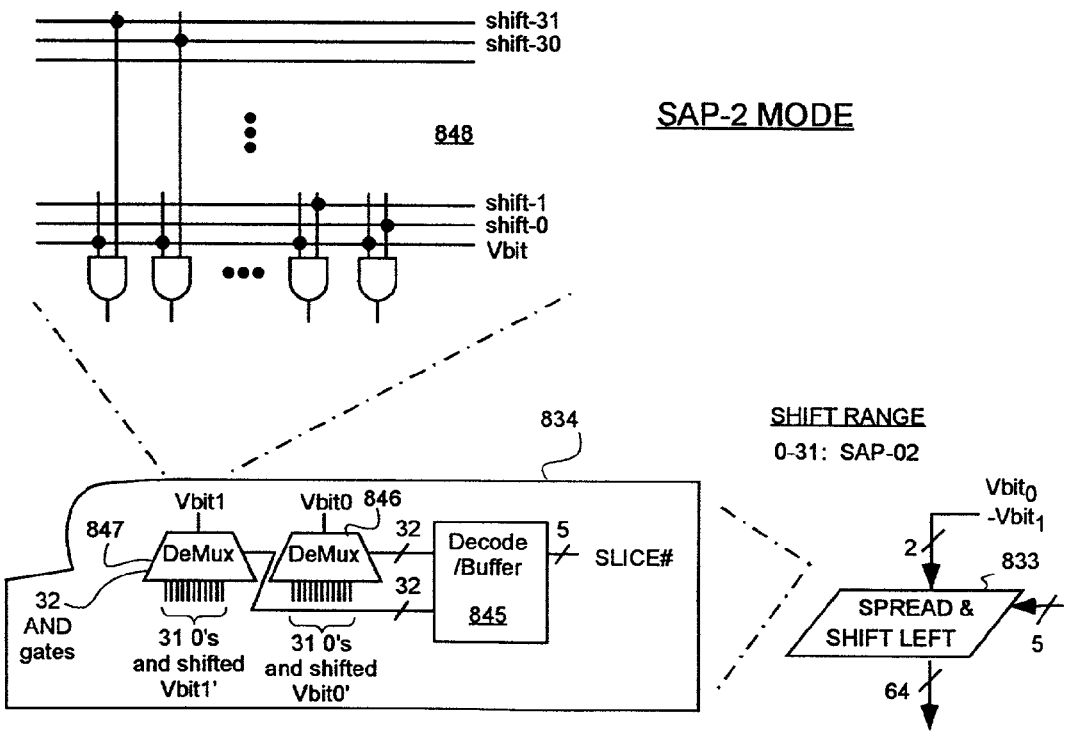

The implementational advantages of carrying out the left-shifting operations (823, 827, 829, etc.) separately in each path as shown in FIG. 8E before carrying out the SAP-mode multiplexing (825) may be appreciated by considering FIGS. 8F, 8G and the spectrum of intermediate or interpolated embodiments that may be understood as existing between them. FIG. 8F shows an example of a left-shifting unit 823' which may be constructed for handling the SAP-32 translation path in FIG. 8E. The illustrated unit 823' (FIG. 8F) for providing combined bit-spreading and left-shifting may be structured to include a slice-number decoding and buffering unit 840 and a plurality of demultiplexers 841, 842, etc. The decode and buffer unit 840 receives a one-bit signal representing the slice number (0 or 1), decodes that input into a copy of itself and its 1's compliment, and outputs the coded signals (slice-0 and slice-0bar, otherwise shown as shift-0 and shift-1 in FIG. 8F) through a buffer for fan-out on a set of 64 wires. Each pair of the 64 wires connects to a respective one of 32 demultiplexers: 841, 842, etc. Demultiplexer 841 is shown in more detail at 844 for purpose of example. It receives one of the variable output bits of spreader 822 (FIG. 8E). That variable output bit (Vbit) is to be shifted to the left by one bit position or not, depending on the decoded slice number (depending on whether shift-0 is true or, alternatively shift-1 is true). Because it is known that there are padded zeros implied to be present to the left and to the right of the input, variable bit (Vbit$_0$) of demultiplexer 841, it's design can be relatively simple. Demultiplexer 841 produces the post-shift results for the input variable bit (Vbit$_0$) and for the bit position to the left of the former. If no shift is indicated by the control signals from decoder 840, then the input bit is copied to the bit position on the right while the left-padding zero is placed to its left, thereby creating the illustrated 0,bit' result. If a one position shift is indicated by the decoder output (shift-1 is true), then the input variable bit (Vbit$_0$) is output in the bit position to the left while the implied zero at its right is placed in the less significant bit position, thereby creating the illustrated bit',0 result. The same simple algorithm is carried out in demultiplexers 842, 843, and so on for their respective variable input bits: Vbit$_1$, Vbit$_2$, etc. A possible, gate-level implementation for each demultiplexer is shown at 844. Structure 844 comprises a simple set of two AND gates whose respective first terminals receive the input variable bit (Vbit) and whose respective second terminals respectively receive the shift-0 and shift-1 activating signals. Shift-0 is true when shift-1 is false and vice versa. The input variable bit (Vbit) is therefore routed to its appropriated bit position while the other output of the demultiplexer 844 produces a "0".

Referring to FIG. 8G, an example of a unit 833 which provides combined bit-spreading and left-shifting is shown to be constructed for handling the SAP-2 translation path of FIG. 8E. The illustrated spreading/left-shifting unit 833 (FIG. 8G) may be structured to include a slice-number decoding and buffering unit 845 and a pair of 1:32 demultiplexers, 846 and 847. The decode and buffer unit 845 receives a five-bit signal representing the slice number (0-31), decodes that input into a set of 32 selection signals (shift-0 through shift-31), and outputs the coded signals through a buffer for fan-out on a set of 64 wires. Each half of the 64 wires connects to a respective one of demultiplexers 846 and 847. Demultiplexer 847 is shown in more detail at 848 for purpose of example. It receives one of the 2 variable output bits of the corresponding SAP-2 spreader. That variable output bit (Vbit$_1$) is to be shifted to the left, or not, by a number of positions indicated by the decoded slice number. Because it is known that there are padded zeros implied to be present to the left and to the right of the input, variable bit (Vbit$_1$) of demultiplexer 847, it's design can be relatively simple. Demultiplexer 847 produces the post-shift results for the input variable bit (Vbit$_1$) and for the 31 input bit positions to the left of the former. If no shift is indicated by the control signals from decoder 845, then the input bit is copied to the bit position on the right while 31 left-padding zeroes are placed to its left. If a one position shift is indicated by the decoder output (shift-1 is true), then the input variable bit (Vbit$_1$) is output to the second bit position from the right while the 31 implied zeroes around it are placed to its left and right; and so on. The same simple algorithm is carried out in demultiplexer 846 which operates on respective variable input bit: Vbit$_0$. A possible, gate-level implementation for each demultiplexer is shown at 848.

Structure 848 comprises a simple set of thirty-two AND gates whose respective first terminals receive the input variable bit (Vbit) and whose respective second terminals respectively receive the shift-0 through shift-31 activating signals. Shift-0 is true when shift-1 through shift-31 are false, shift-1 is true when shift-0 and shift-2 through shift-31 are false, and so on. The input variable bit (Vbit) is therefore routed to its appropriated bit position while the other outputs of the demultiplexer 848 each produces a "0".

From FIGS. 8F-8G it is fairly easy to extrapolate and see how the SAP-4 spreader/left-shifter through SAP-16 spreader/left-shifter (826/827) may be constructed. It may be observed that the complexity of decoding in the decoder/buffer unit (840, . . . 845) increases as the shift range increases (from 0-1 to 0-31) and that, at the same time, the amount of fan-out of shift-control signals to different demultiplexers (e.g., 841-843, 846-847) decreases as the shift range increases. As a result, the implementational die space consumed by each of left shifters 823' through 833 remains about the same. Each of the implementations in the implied series of spreader/left-shifters, 823' through 833 save on wires and circuit space because the padded zeroes are implied rather than being presented as real signals on real wires in buses between the spreaders and shifters.

The concepts presented herein may be expanded for a variety of advantageous uses. By way of one example of an extended use of the here disclosed structures and methods, different parts (e.g., switch fabric boards) of a to-be-manufactured switching system which will use plural PSSU's may be tested on a simple test bed before being installed into a more complicated environment for final testing and bring up. The simple test bed can test switch fabric and interconnect components for their ability to comply with various interconnect protocols and the like. The simple test bed system may be brought up (booted up) in a simple, 2×2 or 4×4 slice mode. In such a case, no more than two or four line card units (respectively) need to be provided within the simple test bed for testing the interconnect and switch fabric layers' ability to properly handle communication protocols. Referring momentarily to FIG. 1B, it can be appreciated that pre-switch resources such as 112/114 and post-switch resources such as 117/118 may be fully exercised irrespective of whether the slicing pattern creates 2×2 slices or 16×16 slices. These resources may be tested inexpensively and without the complications of a larger system before their corresponding switching boards or like circuit-support means are inserted into an ultimately-targeted, larger system (e.g., 100 of FIG. 1A). Because a fewer number of routing permutations need to be exercised in the simpler test bed system (not shown, but understood to use 2×2 or 4×4 or like simple slices), certain defects in the interconnect layer components (e.g., 103) or in components of other layers of the full-function system (e.g., 100) may be uncovered in less time and inexpensively by first using the more simply sliced, and smaller test bed system for components testing.

The present disclosure is to betaken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering the extrapolations.

Given the above disclosure of general concepts and specific embodiments, the scope of protection sought is to be defined by the claims appended hereto.

What is claimed is:

1. A Programmably-Sliceable Switch-fabric Unit (PSSU) having a capability of functioning as an N×N' crossbar, and also having a capability of being programmably sliced to instead function as a plurality of S×S' virtual switch slices, where S<N and S'<N', wherein N does not have to equal N', and S does not have to equal S', said PSSU comprising:

(a) absolute Ingress ports (aI's) and absolute Egress ports (aE's) that are alternatively identifiable as Relative ingress ports (Ri's) and Relative egress ports (Re's) of respective ones of said virtual switch slices; where the aI's can receive routing requests and payloads that are to be routed, and where the aE's can output routed payloads to corresponding destinations; and (b) a request translator, operatively coupled to the aI's for receiving routing requests from the aI's, said request translator having:

(b.1) first means for determining, based on the absolute Ingress port identification ($aI_x$) of an ingress port on which a given request arrived, what virtual switch slice a corresponding payload signal belongs to;

(b.2) second means for determining from a Relative egress port identification (Re) or ports identifications (Re's) specified directly or indirectly in the given request, and from the identification of the virtual switch slice provided by said first means, which absolute Egress port (aE) or absolute Egress ports (aE's) the corresponding payload signal is to egress from in accordance with the given request; and (b.3) third means for altering the given request before the request is submitted to a scheduler so that the altered request asks for egress of the corresponding payload signal from said determined aE or aE's.

2. A machine-implemented method that is carried out in a Programmably-Sliceable Switch-fabric Unit (PSSU) having a capability of functioning as an N×N' crossbar, where said method gives the PSSU a capability of being programmably sliced to instead function as a plurality of S×S' virtual switch slices, where S<N and S'<N', wherein N does not have to equal N', and S does not have to equal S', where the PSSU includes absolute Ingress ports (aI's) and absolute Egress ports (aE's) that are alternatively identifiable as Relative ingress ports (Ri's) and Relative egress ports (Re's) of respective ones of said virtual switch slices; where the aI's can receive routing requests and payloads that are to be routed, and where the aE's can output routed payloads to corresponding destinations; and where said method comprises:

(a) receiving routing requests from the aI's (b) first determining, based on the absolute Ingress port identification ($aI_x$) of an ingress port on which a given request arrived, what virtual switch slice a corresponding payload signal belongs to;

(c) second determining from a Relative egress port identification (Re) or from Relative egress ports identifications (Re's) specified directly or indirectly in the given request, and from the identification of the virtual switch slice provided by said first determining step, which absolute Egress port (aE), or ports (aE's) the corresponding payload signal is to egress from in accordance with the given request; and (d) altering the given request before the request is submitted to a scheduler so that the altered request asks for egress of the corresponding payload signal from said determined aE or aE's.

3. A machine-implemented method for using a Programmably-Sliceable Switch-fabric Unit (PSSU) that has a capability of functioning as an N×N' crossbar, and also has a capability of being programmably sliced to instead function as a plurality of S×S' virtual switch slices, where S<N and S'<N', and where the PSSU includes absolute Ingress ports (aI's) and absolute Egress ports (aE's) that are alternatively identifiable as Relative ingress ports (Ri's) and Relative egress ports (Re's) of respective ones of said virtual switch slices; where the aI's can receive routing requests and payloads that are to be routed, and where the aE's can output routed payloads to corresponding destinations;

said machine-implemented, usage method being carried out when the PSSU is functioning as said plurality of S×S' virtual switch slices, and the method comprising:

(a) determining if an ingress-related error rate exceeding a predefined and corresponding threshold is observed for requests and/or payloads arriving through a given ingress port;

(b) if the exceeding error rate is observed, determining which virtual switch slice is associated with the given ingress port whose ingress-related error rate is exceeding the predefined and corresponding threshold, and disabling that virtual switch slice.

4. A request translation method for use in a system where absolute Ingress ports (aI's) and absolute Egress ports (aE's) are alternatively identifiable as Relative ingress ports (Ri's) and Relative egress ports (Re's) of respective, switch slices, and where the translation method comprises:

(a) determining, based on the absolute Ingress port identification ($aI_x$) of the port on which a given request arrived, what slice a corresponding payload signal belongs to;

(b) determining from a Relative egress port identification (Re) or Relative egress ports identifications (Re's) specified in the given request, which absolute Egress port (aE) or absolute Egress ports (aE's) the corresponding payload signal will egress from; and (c) altering the given request so as to cause the corresponding payload signal to egress from said determined aE or aE's.

5. A monolithically integrated switch-fabric circuit comprising:

(a) a plurality of ingress ports, where each ingress port is adapted to receive ingressing request signals that request switching of a corresponding payload signal, and where each ingress port is further adapted to receive ingressing payloads which are to be switched in accordance with corresponding ones of the request signals;

(b) a plurality of egress ports, where each egress port is adapted to output switched ones of said ingressing payloads, where identification of which egress port is to output which of the ingressing payloads is provided by egress identification indicia included in said ingressing request signals and the egress identification indicia provides said identification by way of at least one of:

(b.1) a direct and absolute identification ($aE_x$) of a respective one or more of the egress ports that are to output corresponding ones of the switched payloads;

(b.2) a direct and relative identification ($Re_x$) of a respective one or more of the egress ports that are to output corresponding ones of the switched payloads, where the direct and relative identification ($Re_x$) is based on a switch slice that is assumed to be coupled to the ingress port through which the corresponding request signal ingressed;

(b.3) an indirect, but nonetheless absolute identification ($aE_x$) of a respective subset of the egress ports that are to multicast out a corresponding one of the switched payloads; and (b.4) an indirect and relative identification of a respective subset of the egress ports that are to multicast out a corresponding one of the switched payloads, where the indirect and relative identification is based on a switch slice that is assumed to be coupled to the ingress port through which the corresponding request signal ingressed;

(c) pre-switch, signal processing resources coupled to the plurality of ingress ports for processing at least said ingressing request and payload signals;

(d) post-switch, signal processing resources coupled to the plurality of egress ports for processing at least said switched and egressing payload signals;

(e) a switch matrix interposed between said pre-switch and post-switch, signal processing resources for switching corresponding ones of ingressing payloads that have been processed by the pre-switch, signal processing resources for egress through the post-switch, signal processing resources and through request-identified ones of said egress ports;

(f) a request translator operatively coupled to the egress ports for receiving the egress identification indicia which represent at least one of said direct and relative identifications ($Re_x$) and said indirect and relative identifications, and for producing translated, egress identification signals that provide absolute identifications of the egress ports through which egress of corresponding payloads is being requested by the corresponding ingressing request signals.

6. The monolithically integrated switch-fabric circuit of claim 5 wherein said pre-switch, signal processing resources provide at least four of the following pre-switch, signal processing functions:

(c.1) level-shifting;
(c.2) bit-detection;
(c.3) clock recovery for asynchronously communicated signals;
(c.4) conversion from a relatively serial format to a more parallel data format;
(c.5) signal framing;
(c.6) error checking and/or correction;
(c.7) ingress-side error logging for identifying ingress links that are currently error-prone;
(c.8) signal decoding or decompression;
(c.9) storage of ingress signal data; and
(c.10) alignment of received ingress signals with internal clocks of the switch-fabric circuit.

7. The monolithically integrated switch-fabric circuit of claim 5 wherein said post-switch, signal processing resources provide at least four of the following post-switch, signal processing functions:

(d.1) encoding and/or compression of egressing payload signals;
(d.2) attachment of error correction and other control signals or framing signals to the egressing payload signals;
(d.3) egress-side error logging for identifying egress links that are currently error-prone;
(d.4) phase-alignment of egressing signals to external output clock signals if synchronous communication is being used;
(d.5) serialization of egressing signals;
(d.6) level-shifting of egressing signals; and
(d.7) transmission of grant and/or protocol signals as may be appropriate in accordance with protocols used by systems with which the switch-fabric circuit communicates.

8. The monolithically integrated switch-fabric circuit of claim 5 wherein said request translator comprises:

(f.1) a resource parser for determining whether received request signals are asking for multicast output of corresponding payloads or unicast output of corresponding payloads and for providing a first mode signal indicating whether a correspondingly-parsed request signal is of the unicast type or multicast type;

(f.2) a multicast lookup table for converting multicast egress codes into corresponding, specific multicast identifications of specific, relative egress ports from which a corresponding payload is to be output;

(f.3) a multicast mode translation block, coupled to the multicast lookup table, for converting the specific multicast identifications of said specific, relative egress ports into absolute multicast identifications; and (f.4) a unicast mode translation block, coupled to the resource parser, for converting unicast type, relative identifications ($Re_x$) into absolute egress identifications.

9. The monolithically integrated switch-fabric circuit of claim 8 wherein said request translator further comprises:

(f.5) a slicing pattern register for indicating what pattern of virtual switch slices is being implemented in the switch matrix; and (f.6) a source port indicator for indicating what absolute ingress port ($aI_x$) a corresponding request signal came from;

wherein each of the multicast mode translation block and the unicast mode translation block is coupled to, and responsive to outputs of the slicing pattern register and of the source port indicator.

10. The monolithically integrated switch-fabric circuit of claim 9 wherein said request translator further comprises:

(f.7) an on-the-fly controlled multiplexer, coupled to outputs of the multicast mode translation block and of the unicast mode translation block, and driven by said first mode signal for selectively outputting on-the-fly, at least one of the outputs of the multicast mode translation block and of the unicast mode translation block.

11. The monolithically integrated switch-fabric circuit of claim 9 wherein said multicast mode translation block performs a variable shift operation dependant on said outputs of the slicing pattern register and of the source port indicator.

12. The monolithically integrated switch-fabric circuit of claim 9 wherein said multicast mode translation block selects amongst a plurality of spread-and-shift operations dependent on said output of the slicing pattern register.

* * * * *